(12) United States Patent
Anderson et al.

(10) Patent No.: US 8,308,901 B2
(45) Date of Patent: Nov. 13, 2012

(54) ENHANCED FIBER ADDITIVE; AND USE

(75) Inventors: Kevin R. Anderson, Cedar Rapids, IA (US); David E. Garlie, Eau Claire, WI (US); Paula R. Krogmann, Center Point, IA (US); John T. McDonald, Edina, MN (US); Jagannadh V. Satyavolu, Cedar Rapids, IA (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 12/903,707

(22) Filed: Oct. 13, 2010

(65) Prior Publication Data

US 2011/0226429 A1 Sep. 22, 2011

Related U.S. Application Data

(60) Division of application No. 11/112,562, filed on Apr. 22, 2005, now Pat. No. 7,837,830, which is a division of application No. 09/689,994, filed on Oct. 13, 2000, now Pat. No. 6,902,649, which is a continuation-in-part of application No. 09/419,438, filed on Oct. 15, 1999, now abandoned.

(51) Int. Cl.
*D21H 11/12* (2006.01)
*D21H 11/14* (2006.01)
*D21H 11/16* (2006.01)

(52) U.S. Cl. ............... 162/148; 162/9; 162/76; 162/97; 162/99; 162/147; 162/149; 162/158; 162/175

(58) Field of Classification Search ............... 162/4–5, 162/9, 70, 72, 87–89, 78, 91–99, 109, 141, 162/147–149, 158, 76, 175; 426/615, 618, 426/626, 629, 648

See application file for complete search history.

(56) References Cited

U.S. PATENT DOCUMENTS

| | | | | |
|---|---|---|---|---|
| 4,011,130 A * | 3/1977 | Worden | | 162/151 |
| 4,181,747 A * | 1/1980 | Kickle et al. | | 426/615 |
| 4,652,341 A * | 3/1987 | Prior | | 162/79 |
| 5,057,334 A * | 10/1991 | Vail | | 426/634 |
| 5,227,024 A * | 7/1993 | Gomez | | 162/142 |
| 5,705,216 A * | 1/1998 | Tyson | | 426/478 |
| 6,174,412 B1 * | 1/2001 | Paterson-Brown et al. | | 162/95 |
| 6,902,649 B1 * | 6/2005 | Satyavolu et al. | | 162/91 |
| 7,837,830 B2 * | 11/2010 | Satyavolu et al. | | 162/141 |
| 2005/0067124 A1 * | 3/2005 | Satyavolu et al. | | 162/99 |
| 2005/0183836 A1 * | 8/2005 | Satyavolu et al. | | 162/141 |
| 2005/0191400 A1 * | 9/2005 | Satyavolu et al. | | 426/629 |
| 2006/0020126 A1 * | 1/2006 | Kopesky et al. | | 536/30 |
| 2008/0110585 A1 * | 5/2008 | Satyavolu et al. | | 162/60 |

OTHER PUBLICATIONS

Buera MP, Chirife J, Resnik SL, and Wetzler G., *Non-enzymic browning in liquid model systems of high water activity: Kinetics of colour changes due to Maillard's reaction between different single sugars and glycine and comparison with caramelization browning*. Journal of Food Science 52(4): 1063-1067 (1987).
Park C Wo0, Kang KO, and Kim WI, *Effects of reaction conditions for improvement of caramelization rate*. Korean Journal of Food Science and Technology 30(4): 983-987 (1998).
Buera MP, Chirife J, Resnik SL, and Lozano RD. *Non-enzymic browning in liquid model systems of high water activity: Kinetics of colour changes due to caramelization of various single sugars*. Journal of Food Science 52(4): 1059-1062,1073 (1987).
Homoki-Farkas P and Orsi F, Kroh LW, *Methylglyoxal determination from different carbohydrates during heat processing*. Food Chemistry 59(1): 157-163 (1997).
Villamiel et al. Chapter 4 *Browning Reactions in Food Biochemistry and Food Processing*, Editor Y. H. Hui, Blackwell Publishing, Oxford OX4 2DQ, UK (2006).
Satyavolu et al.; File History; U.S. Appl. No. 11/112,401; Published Sep. 1, 2005.
Satyavolu et al.; File History; U.S. Appl. No. 11/740,353; Published May 15, 2008.

* cited by examiner

*Primary Examiner* — Jose A Fortuna
(74) *Attorney, Agent, or Firm* — Perkins Coie LLC

(57) ABSTRACT

The disclosure provides a process of modifying a seed based fiber (SBF) to form an enhanced fiber additive (EFA). The process includes an acid treatment step and optionally at least one fiber modification step. Preferred EFA products and uses are described.

14 Claims, 30 Drawing Sheets

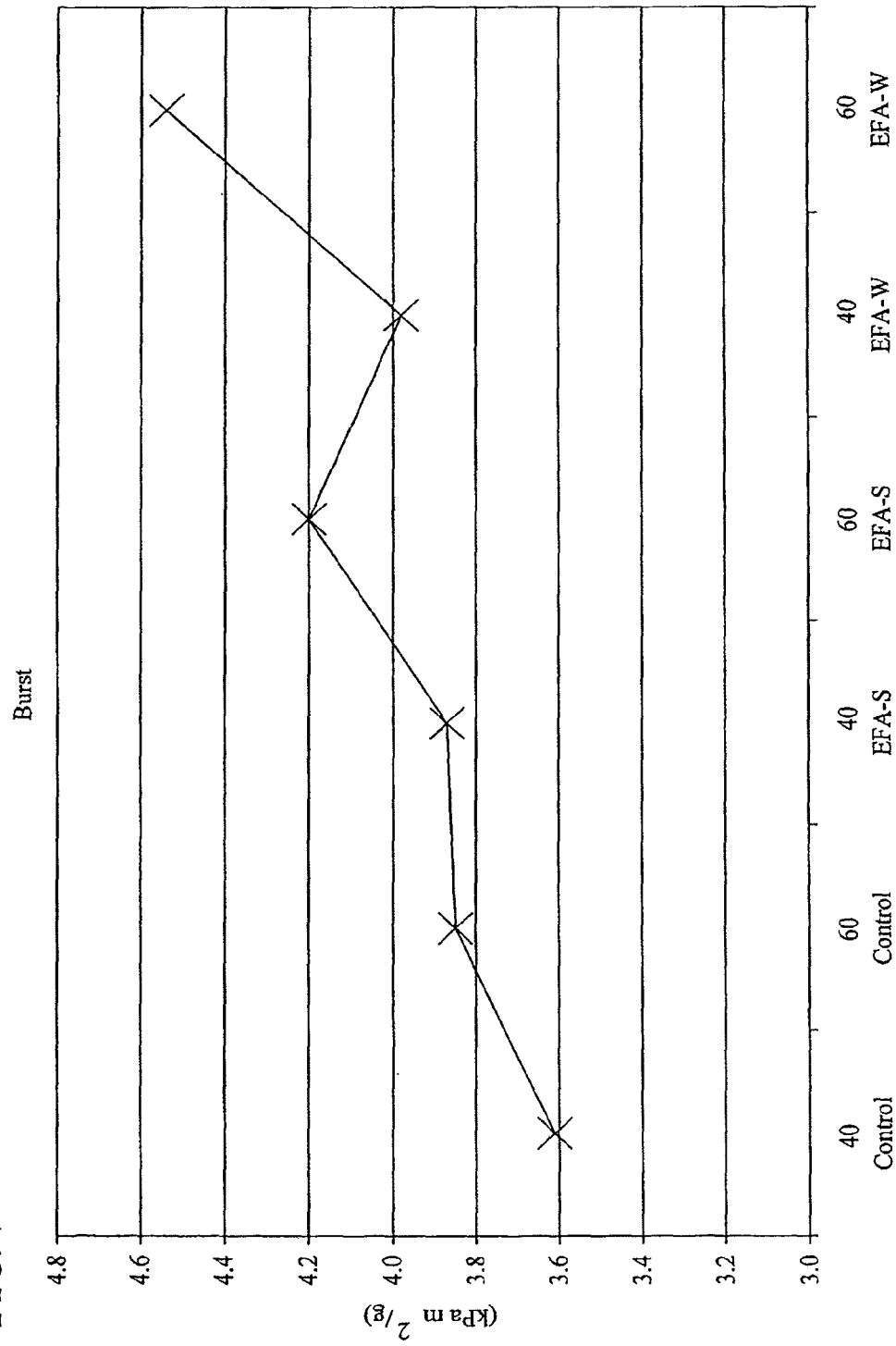

**RGB Color Composite Image
(Paper w/ 1% EFA)**

ENHANCED FIBER ADDITIVE; AND USE

CROSS REFERENCE TO RELATED APPLICATIONS

The present application is a Divisional of U.S. application Ser. No. 11/112,562 filed on Apr. 22, 2005, now U.S. Pat. No. 7,837,830, which is a Divisional of 09/689,994 filed Oct. 13, 2000, now U.S. Pat. No. 6,902,649, which is a Continuation-in-Part of U.S. application Ser. No. 09/419,438 filed Oct. 15, 1999, now abandoned, the complete disclosures of which are incorporated herein by reference.

FIELD OF THE INVENTION

This disclosure relates to a method of processing plant seed based fibers (SBF) to obtain an enhanced fiber additive (EFA); preferred EFA; and uses thereof.

BACKGROUND

Grains such as corn and soybeans are processed to separate out useful components such as protein, oil, starch, and seed fiber. The starch is typically modified to make products that are used in food and industrial applications. The oil is typically refined and used as cooking and/or baking oil. Soybean protein is typically processed as a food additive. Corn gluten protein is typically used as a feed ingredient in the poultry industry. The seed fiber is typically used as a feed ingredient for many pet foods and for bovine feed. However, it would be desirable to obtain a processed seed fiber that is suitable for other uses, for example in papermaking and/or as a food additive for human consumption.

SUMMARY

This disclosure provides, among other things, methodology for processing seed based fiber to obtain an enhanced fiber additive. In typical applications, the method includes treating a seed based fiber with a dilute acid solution. The typical dilute acid solution includes a strong or weak acid and an aqueous liquid or water. Preferably the acid is a strong acid such as hydrochloric acid or sulfuric acid. The seed based fiber is preferably treated with the dilute acid solution for an amount of time sufficient to reduce the lignin content of the seed based fiber. The resulting fiber is sometimes referred to herein as an acid treated fiber. The acid treated fiber can be washed, to remove the residual acid and impurities, and be dried to form an enhanced fiber additive. Herein the term "enhanced fiber additive" refers to a seed based fiber which has been enhanced by acid treatment in any of the general manners characterized herein, regardless of whether other enhancements have been performed.

In preferred processing, the method includes treating an acid treated fiber with a modifying agent. The modifying agent preferably includes an acid chlorite solution or a peroxide solution. A typical, preferred, acid chlorite solution includes an aqueous liquid, a strong acid selected from the group consisting of sulfuric acid and hydrochloric acid and a chlorite salt selected from the group consisting of sodium chlorite, potassium chlorite, magnesium chlorite, and calcium chlorite. The typical, preferred, peroxide solution preferably includes hydrogen peroxide and an aqueous liquid or water. The acid treated fiber can be treated with either the acid chlorite solution or the peroxide solution, or both. The acid treated fiber is typically treated with the modifying agent for an amount of time sufficient to improve the brightness of the fibers. The resulting fiber with improved brightness is also referred to as an enhanced fiber additive or as modified fiber. The modified fiber is typically washed to remove residual chemicals and impurities and dried to form a preferred brightened, enhanced fiber additive. In some instances, the treatments lead to reduction in lignin content, as a percentage.

The disclosure also provides a method of making paper and a paper product. The paper is formed by processing wood to make wood pulp; combining the wood pulp with enhanced fiber additive to form a modified pulp, positioning the modified pulp on a screen; draining the modified pulp; pressing the modified pulp; and drying the modified pulp. The wood pulp can be prepared by either chemical or mechanical pulping. The disclosure also provides a paper product, which includes wood pulp and the enhanced fiber additive. Alternate papers, including alternate fibers from wood, can also be made with the EFA.

The disclosure also provides a method of preparing a food product and the resulting food product, wherein the food product is formed by combining an ingredient (or ingredients) with the enhanced fiber additive.

BRIEF DESCRIPTION OF THE DRAWINGS

FIG. 7 is a graph showing the burst strength of paper hand sheets with and without EFA-S (enhanced fiber additive from soy hulls) and EFA-W (enhanced fiber additive from wheat midds).

DETAILED DESCRIPTION

I. General Comments

The disclosure provides a method for processing fiber obtained from grains, such as corn, oat, wheat, soy and rice to obtain an enhanced fiber additive. The enhanced fiber additive is suitable for a variety of uses, including but not limited to, use as a paper additive or as a food additive.

As used herein the term "Seed Based Fiber" or "SBF" refers to a non-wood fiber obtained from plants. Seed Based Fiber includes a variety of polymers, including cellulose, hemicellulose and lignin. "Cellulose" is a linear polymer of glucose that forms a "backbone" structure of the fiber. Hydrogen bonding between cellulose polymers confers high strength to cellulose fibers. "Hemicellulose" refers to a class of polymers of sugars including the six-carbon sugars mannose, galactose, glucose, and 4-O-methyl-D-glucuronic acid and the five-carbon sugars xylose and arabinose. Hemicellulose polymers are essentially linear, except for single-sugar side chains and acetyl substituents. Hemicellulose polymers are more soluble and labile than cellulose and can be solubilized from plant cell walls using alkali, such as sodium hydroxide. "Holocellulose" is a term that refers to the total cellulose and hemicellulose content of fiber. "Lignin" is a complex polymer of phenoxypropanol units that has an amorphous, three-dimensional structure. Lignin is an adhesive or binder that holds the fibers together.

By way of example, a typical corn kernel contains (by wt. %) about 39-40% hemicellulose (high hemicellulose content, good supplement for commercial pulp); 11-30% cellulose (low cellulose content, not good for paper); 3-6% lignin (low, good); <1% ash (low, good); 22-23% starch; 3-4% fat; and 10-12% protein.

II. Preparing the Enhanced Fiber Additive (EFA)

II. A. Process Steps

Figure 1:
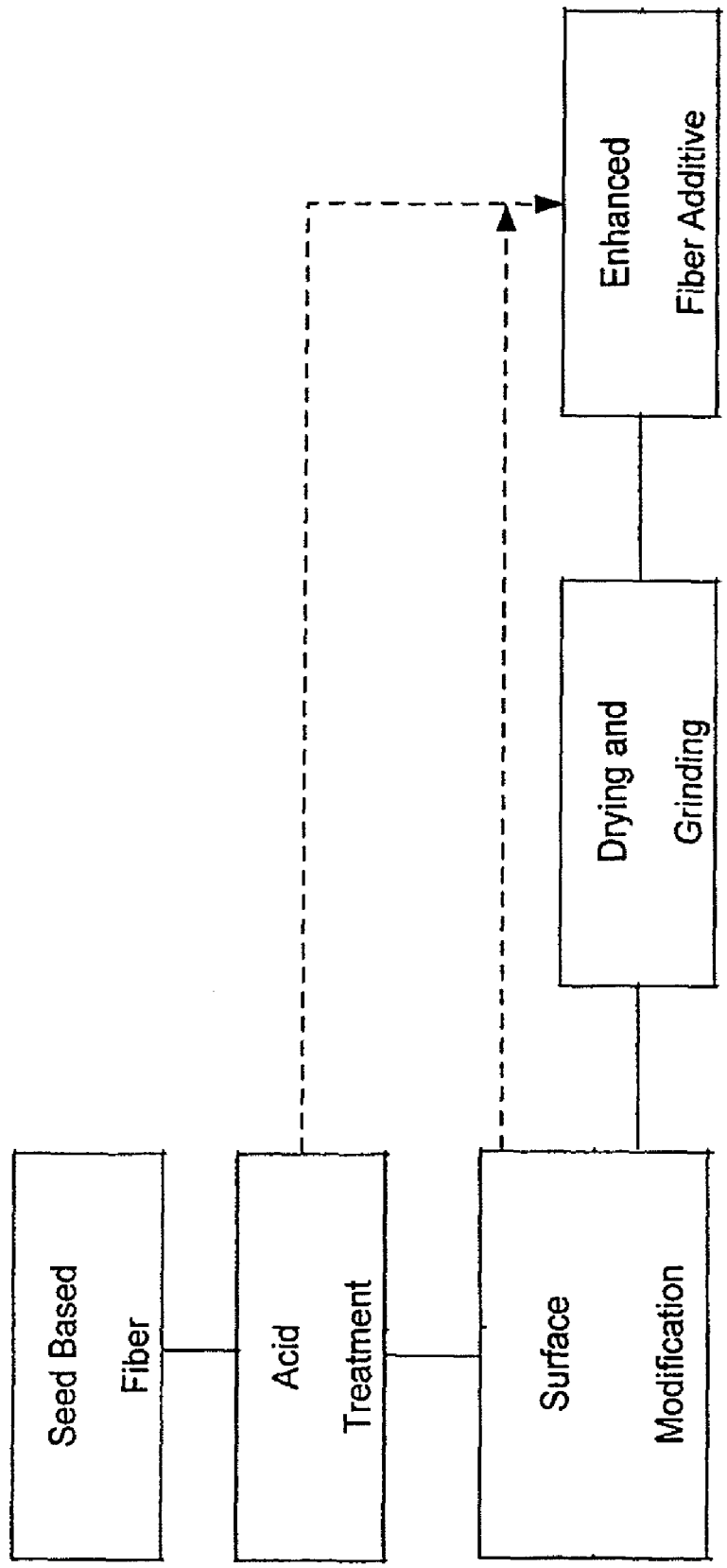
FIG. 1 shows a flow chart of methods for processing seed based fiber in accord with the present disclosure.

The disclosure provides a method of processing seed based fiber material (SBF) to form an enhanced fiber additive (EFA). The process includes treating the SBF with an acid ("acid treatment step") to form an acid treated fiber or modified seed based fiber material. (By "modified" in this context it is meant that the SBF is no longer in its untreated form.) The acid treated fiber can be washed and used as an enhanced fiber additive. In preferred processing, the acid treated fiber is treated with a modifying agent ("a surface modification step") to form a modified fiber. The modified fiber can then be washed and be used as a preferred enhanced fiber additive (EFA). A flow chart of the preferred process and some selected variations is shown in FIG. 1. (Optionally, and preferably the SBF can be washed or otherwise treated prior to the acid treatment step.) Herein the term SBF is generally mount to refer to the fiber material prior to acid treatment, without regard to whether it has been previously washed or otherwise treated.

II. A. 1. Acid Treatment

In the acid treatment step, SBF is treated with an acid for modification. The modification is observed to soften and loosen the fibers. In the acid treatment step, the SBF is mixed with a dilute acid solution to form an acid slurry. The acid slurry is allowed to react for a time sufficient to soften and loosen the fibers. Preferably, the reaction is performed at an elevated temperature; i.e., a temperature above 80° C., typically at 100° C. to 140° C.

The term "dilute acid solution" refers to a solution in which a small amount of acid is combined with a large volume of water. The amount of acid combined with the water can vary depending upon the strength of the acid, the fiber being treated and the desired properties of the enhanced fiber additive. The amount of acid can be calculated based on the weight percent of the SBF dry weight. The dilute acid solution can be prepared by combining either a strong acid or a weak acid with water. Generally, a dilute acid solution prepared using a weak acid tends to contain a larger molar amount of weak acid than a dilute acid solution prepared using a strong acid. Typical useable dilute acid solutions are hydrochloric acid, sulfuric acid, acetic acid, perchloric acid and phosphoric acid compositions. Generally, the acid in the dilute acid solution is included in the amount of about 0.001% to 5% by weight of the dry SBF (e.g., about 0.001 to 5 grams of acid is used for every 100 grams dry weight of fiber), more preferably about 1% to about 4% by weight of the dry SBF, most preferably about 2% to about 3% by weight of the dry SBF. Preferably, the dilute acid solution is combined with the SBF in the ratio of 10:1, more preferably about 6:1, most preferably about 3:1.

Preferably the dilute acid solution has a pH below 5, typically within the range of about 0.5 to about 3, preferably about 1 to about 3, and most preferably about 1 to about 2.

The acid treatment step is preferably performed at an elevated temperature (above 21° C. typically greater than 80° C.) and over range of pressures from atmospheric to 500 psi, typically 10 psi to 30 psi, to facilitate penetration of the acid into the fibers and to decrease the amount of time necessary for the reaction to be completed. If the temperature of the reaction is too high, there can be an undesirable decrease in yield. Therefore, the reaction is preferably performed at a temperature within the range of about 100° C. to about 140° C., more preferably about 110° C. to about 130° C., most preferably about 115° C. to about 120° C. Preferably the acid treatment step is performed in a sealed pressure vessel capable of operating at temperatures greater than 100° C. Examples of suitable pressure vessels include a circulation reactor (e.g., Digester from M/K Systems located in Danvers, Mass.) or a jacketed mixing reactor (e.g., Pandia digester from Beloit Corporation located in Nashua, N.H.). Typical pressures within the reactor will be 10-50 psi. The reactors need not be purged of air.

After the desired temperature is obtained, the reaction is allowed to continue for a suitable amount of time, typically for a time sufficient to observe a significant softening and loosening of the fibers. Generally, the acid treatment reaction is carried out for less than 2.5 hours, for example about 0.5 to about 2 hours will typically suffice. Typical preferred treatments will be about 1 to about 2 hours, for example about 1 to about 1.25 hours. After the reaction has continued for the desired amount of time, the reactor is cooled to room temperature and is vented to atmospheric pressure. Alternately, the hot spent acid solution can be blown out through a condenser under pressure and the solid contents cooled with cold water. The acid treated fiber is then removed from the reaction vessel.

The acid treated fiber can be washed to remove the spent acid solution. As used herein, "spent acid solution" refers to the dilute acid solution after the acid treatment step. The spent acid solution typically contains extracted lignin, starch, residual chemicals and other impurities not found in the dilute acid solution. Preferably, the acid treated fiber is washed with water. More preferably, if the acid treated fiber is to be used as an enhanced fiber additive, the washing step is performed until the filtrate has a neutral pH (e.g., a pH between about 6.0 and 8.0, preferably about 7.0). Typically, a filtrate having a neutral pH can be obtained by exchanging the spent acid solution with 3 to 4 volumes of water. The washed acid treated fiber can then be used as an enhanced fiber additive. Optionally, the washed acid treated fiber can be dried.

In preferred processing, the acid treated fiber is washed and further modified in a surface modification step. When the acid treated fiber is to be further modified in a surface modification step, it is preferable that residual acid from the acid treatment step remain with the acid treated fiber to help maintain an acidic pH during the surface modification step. Thus, when the acid treated fiber is to be further modified in a surface modification step, the wash preferably removes a majority of any extracted lignin, starch and other particulate matter but leaves some of the spent acid solution behind. This can typically be accomplished by exchanging the acid solution with about 1 to 2 volumes of water. It is particularly desirable that residual acid from the acid treatment step remains with the acid treated fiber when the surface modification process includes a mild acid chlorite treatment.

II. A. 2. Surface Modification

The acid treated fiber is preferably treated using one or more surface modification steps. A purpose of the surface modification steps is to improve the brightness of the resulting enhanced fiber additive (EFA) and to improve the hydrophilicity of the EFA. An example of a surface modification step is a bleaching step. Although the SBF can be treated in a surface modification step without a prior acid treatment step, it is preferred that the surface modification step is performed after the SBF has undergone an acid treatment step.

In the surface modification step, the acid treated fiber is contacted with a modifying agent to form the preferred enhanced fiber additive. As used herein, "modifying agent" refers to a composition or solution that is capable of altering the hydrophobicity, hydrophilicity, and/or brightness of the fiber. A modifying agent preferably increases the hydrophilicity (or decreases the hydrophobicity) of the fiber, for example, by adding hydrophilic groups or removing hydrophobic groups from the fiber or by altering the surface area of the fiber such that more hydrophilic groups (or less hydrophobic groups) are exposed. The surface modification agent may also increase the brightness of the fiber, for example, by removing lignin. An example of a surface modification agent is a bleaching agent. Bleaching agents used in the wood pulping industry can be used. A mild acid chlorite solution is a preferred bleaching agent. Peroxide (typically hydrogen peroxide) is another useable bleaching agent. Acid treated fiber can be treated using a mild acid chlorite solution; a peroxide solution; or, a combination of both. The use of an acid chlorite solution in combination with a peroxide solution (in separate steps) as bleaching agents is preferred. The brightness and hydrophilicity of the fibers is typically enhanced when both treatments are used.

During a typical acid chlorite treatment, acid treated fiber is combined with an acid chlorite solution and heated. As used herein, the term "acid chlorite solution" refers to a solution that includes a chlorite salt, a strong or weak acid, and, optionally, an aqueous carrier. Preferably, the acid chlorite solution has a pH below 5, typically within the range of about 2 to about 5, preferably about 2 to about 4, most preferably about 2.5 to about 3.

The acid chlorite solution is combined with acid treated fiber to form a fiber slurry. Water would typically be added to the acid chlorite solution such that the resulting fiber slurry includes about 1 wt % to about 20 wt % solids, more preferably about 5 wt % to about 10 wt % solids. Typically, the slurry includes about 1% to about 5% by weight chlorite, more preferably about 1% to about 3% by weight, most preferably about 1% to about 2% by weight. These weight percentages are relative to the weight of dry fiber. For example, the slurry can include about 1 to 2 grams of chlorite for each 100 grams of fiber (dry weight).

Although the modification step can be performed at room temperature, it is preferably performed at an elevated temperature (>21° C.) to increase the reaction rate. An undesirable decrease in yield may be observed, if the temperature is too high. Typically, the bleaching step is performed at a temperature within the range of about 50° C. to about 80° C., more preferably about 55° C. to about 75° C., most preferably about 65° C. to about 75° C. The reaction is typically conducted in a sealed container, under an air atmosphere, with intermittent mixing of contents. The reaction is performed for about 0.5 hours to about 2 hours, more preferably about 1 hour to about 2 hours, most preferably about 1 hour to about 1.5 hours.

After the acid chlorite treatment is completed, the modified fiber can be washed with water to remove extracted materials and excess chemicals and can then be used without further treatment as an enhanced fiber additive (EFA).

The modification step may be selected to include a peroxide treatment step. Preferably, if conducted, the peroxide is hydrogen peroxide and is combined with the fiber in amount of about 1% to about 10% by weight of dry fiber, more preferably about 2% to about 7% by weight, most preferably about 3% to about 6% by weight. Preferably, the peroxide is included in a solution that includes peroxide and an aqueous solvent such as water. Typically, the peroxide solution has a pH of at least 9, for example between 9 and 11.5, preferably between about 9.5 and 11, most preferably between about 10 and about 10.5. Preferably the peroxide is prepared as a mild alkaline solution by adding a base to the bleaching solution to obtain the desired pH.

As with the acid-chlorite treatment, the peroxide treatment can be performed at room temperature. However, it is again desirable to carry out the reaction at an elevated temperature (>21° C.) to increase the reaction rate and reduce the reaction time. However, the temperature should not be too high or the reaction carried out for too long, or the yield may be undesirably decreased. The peroxide treatment step is typically conducted at a temperature of about 50° C. to 80° C., often 55° C. to 75° C., preferably about 55° C. to about 65° C.; and for about 0.5 to about 2 hours, typically 1 to 2 hours, preferably about 1 to about 1.5 hours. After the peroxide treatment, the fibers are typically washed with water to a pH of about 7.0 to remove excess chemicals and residual extractives and can be used as an enhanced fiber additive (EFA).

If both the acid chlorite and peroxide treatments are used for surface modification, the acid chlorite treatment is preferably performed prior to the peroxide treatment. This is to minimize pH adjustment.

II. A. 3. Additional Process Steps

The enhanced fiber additive (EFA), prepared as described above, can be dried and ground to form a powder. Preferably the EFA is dried at an elevated temperature to decrease drying time. However, if the temperature is too high, brightness may be reduced. Generally, the processed EFA is dried by exposing the fiber to a temperature of at least 35° C., typically between 40° C. and 70° C., preferably 45° C.-65° C., most preferably about 55° C. to 60° C. for up to 8 hours, or until the moisture content of the fiber is less than 6 wt %. The dried EFA can be ground to any suitable size, depending on the intended use. For example, the fiber can be ground to 100-mesh (U.S. Standard) size to provide a starch-like powder additive. (By ground to 100 mesh it is meant that the material is ground, and that fraction which passes through a 100 mesh U.S. Standard screen is used.) A Retsch mill or any other type of disintegrator can be used. Care should be taken not to char or burn the fiber during disintegration.

II. B. Materials Used in Processing

II. B. 1. Acid Treatment Step

Either a strong or weak acid can be used in the acid treatment step. Examples of suitable strong acids include hydrochloric acid, nitric acid and sulfuric acid. Acetic acid ($CH_3COOH$), citric acid, sulfurous acid and carbonic acid ($H_2CO_3$) are examples of suitable weak acids. Preferably, the acid is a strong acid. Most preferably, the acid is sulfuric acid or hydrochloric acid.

II. B. 2. Surface Treatment Step

Bleaching agents are known. "Handbook for Pulp & Paper Technologists," by G. A. Smook, published by TAPPI (1989) provides a discussion of a variety of bleaching protocols which are useful and is hereby incorporated by reference herein. Examples of suitable bleaching treatments include reacting fibers with elemental chlorine in acidic medium; alkaline extraction of reaction products with sodium hydroxide; reacting fibers with hypochlorite in alkaline solution; reacting fibers with chlorine dioxide in acidic medium; reacting fibers with peroxides in alkaline medium; reacting fibers with elemental oxygen at high pressure in alkaline medium; and reacting fibers with ozone.

A mild acid chlorite solution is a preferred modifying agent. Examples of suitable chlorites include sodium chlorite, calcium chlorite, magnesium chlorite and potassium chlorite. A preferred chlorite is sodium chlorite. Preferably, the chlorite is combined with a strong acid such as hydrochloric acid or sulfuric acid and an aqueous carrier such as water. For example, the acid chlorite solution include a 1:1 molar ratio of sodium chlorite and hydrochloric acid. Alternately, the acid chlorite solution can include a 2:1 ratio of potassium chlorite and sulfuric acid.

Another preferred modifying agent includes peroxide. Hydrogen peroxide is an example of a suitable peroxide. Preferably, the peroxide is prepared as a mild alkaline solution by combining the peroxide with an aqueous carrier (water) and a basic material. Sodium hydroxide and potassium hydroxide are examples of suitable basic materials.

Optionally, a chelating agent can be included in the peroxide solution. Chelating agents are known. An example of a suitable chelating agent is sodium metasilicate. The chelating agent will bind various metal ions in the system.

III. Selected Properties of the Enhanced Fiber Additive (EFA)

The process provides a modified, processed fiber, referred to as an enhanced fiber additive (EFA). If the EFA has not been modified by bleaching, it typically has a brightness of the same color as the starting material. The preferred EFA is generally white to light tan in color and typically has a brightness of at least about 50 ISO, preferably at least about 70 ISO, and most preferably is the result of lightening to at least about 80 ISO. The brightness or whiteness of fiber can be measured by its ability to reflect blue light in comparison to a known standard of magnesium oxide at a specific detection wavelength and reflectance angle (TAPPI Test Methods T 452 om-87).

The EFA can be characterized by significant water and oil holding capacity as measured by a modification of AACC (American Association of Cereal Chemists) Method 56-20. The method is described in Example 7. Typically, the EFA has a water holding capacity of at least 200 wt. %, generally at least about 300 wt. %, and, when prepared in accord with preferred processing described herein, about 500 wt. %. The oil holding capacity of the EFA typically is at least 150 wt. %, generally at least 200 wt. %, and, when prepared in accord with preferred processing described herein, about 300%.

The EFA also exhibits viscosity building characteristics in aqueous solutions under high shear or homogenizing conditions. A homogenized aqueous solution which includes 1.5 wt % EFA typically exhibits a viscosity of at least 10 cP using a Brookfield Corporation viscometer, generally at least about 100 cP, and, when prepared with EFA made in accord with preferred processing herein, has a viscosity of at least about 400 cP.

The EFA, when prepared from corn, typically is at least about 70% to 100% by weight carbohydrate (including cellulose and hemicellulose), more typically about 80% to about 95% by weight, and in some instances about 85% to about 95% by weight. The majority of the carbohydrate fraction, about 75% by weight to about 95% by weight is insoluble dietary fiber. More typically, when prepared from corn the EFA is about 85% to about 90% by weight insoluble dietary fiber.

EFA derived from oats is typically at least 80% to 100% by wt. carbohydrate (including hemicellulose and cellulose), more typically 80% to 90%, by wt.; and, in some instances, about 85% to 90% by wt. EFA derived from soy is typically 70% to 100% by wt. carbohydrate (including cellulose and hemicellulose), more typically about 80% to 95% by wt.; and, in some instances, about 80% to 85% by wt.

The desirable characteristics of the enhanced fiber additive are believed to result from chemical modifications leading to changes in the holocellulose, hemicellulose and cellulose nature of the material. This is described in section VIII below. In general, the processing is observed to lead to a greater cellulose character, versus hemicellulose character, in the fiber material (when comparing the fiber material before and after processing). In addition, many of the observations relating to the structure, color, and exposure of the cellulose character are believed to relate to lignin modification at least at the surface, as a result of the physical and chemical modifications.

When examined using a Scanning Electron Microscope, the structure of the ground enhanced fiber additive (EFA) tends to have an increased surface area when compared to unprocessed fiber, such as ground corn fiber (SBF-C). Whereas the SBF-C typically has a structured, jagged and rock-like appearance, the EFA tends to have a lighter feathery, bloomed appearance. The increased surface is believed to be responsible, in part, for many of the desirable properties of the EFA.

IV. Uses for the EFA

IV. A. General Comments on Use

The EFA can be used to modify adhesive or rheological properties of a variety of commercial products. For example, the EFA can be used in paper coating formulations and paints. The EFA can also be used in food formulations. Additionally, the EFA is suitable for enhancing strength properties of paper.

IV. B. Papermaking

In the paper industry, additives are frequently used to modify the properties of paper. For example wet end starches are added for internal sizing; and, inorganic fillers (e.g., calcium carbonate, titanium dioxide, and clays) are added for optical enhancement properties and as fiber replacement materials. Other synthetic strength enhancing additives are also known.

The EFA is also suitable for use in papermaking, preferably as a fiber replacement material. The EFA is natural, low in ash content and light in weight. In contrast to inorganic fillers, the EFA can be used in a manner that does not significantly add to the weight of the paper sheet. Indeed, EFA made as described herein has been found to maintain or increase paper strength properties in applications wherein the basis weight of the paper is decreased by more than 10%, for example up to 33%. The ability of the EFA to increase paper strength in applications without concomitant increase in basis weight is attractive for both the paper manufacturing facility and the paper customer. The paper manufacturer can benefit by application to achieve lower material and operational costs, while the paper customer can benefit from application to achieve lower shipping and mailing costs. In particular, newsprint and LWC (Light Weight Coated) papers could well benefit from the reduced paper basis weight due to use of the EFA.

For some papermaking applications there is less concern with wood fiber reduction, and more concern with paper strength enhancement. The EFA has been found to enhance paper strength properties even at catalytic addition levels. As used herein, the term "catalytic addition levels" means the EFA is added to the paper in a minor amount, typically at a level of less than 10 weight %, usually at a concentration of 0.1 weight % to 10 weight %, based on the papermaking pulp content; more generally about 0.5 weight % to 3.0 weight %, and preferably, about 0.5 weight % to 2.0 weight %. Markets that benefit from strength enhancement include liquid packaging, bleached board, fine paper, linerboard, and corrugated board.

Additionally, EFA is an environmentally friendly papermaking additive. Wood fiber use can be reduced by, for example, 5% up to 33% (weight %) while using only catalytic amounts of EFA. The reduction in wood fiber consumption not only preserves the wood fiber supply, but also subsequently reduces the amount of pulping and/or bleaching chemicals, sewer B.O.D. (Biological Oxygen Demand), energy consumption (e.g., electrical and/or fossil fuel power), and product shipping/transportation costs.

IV. B. 1. The Papermaking Process

Paper is basically formed from a web of pulp fibers. Pulp is a fibrous raw material for papermaking and is usually of vegetable origin. However, animal, mineral or synthetic fibers may be included. The pulp used in papermaking is most commonly derived from wood sources. Non-wood sources such as cereal straws or such materials as linen/flax; hemp; and synthetic fibers (e.g., polyethylene fibers) are usable of coarse mixtures can be used. In the paper product, the result of these materials is referenced herein as "paper fiber". Typically such non-wood sources are used in significantly lower quantities. Pulp can also be derived from secondary or recycled fibers.

Paper is typically formed from an aqueous slurry of pulp or other fibers, which is filtered through a wire or screen and dried. The paper manufacturer typically obtains pulp from raw materials such as wood chips, boards, straw, jute, clothe or recycled paper by wetting and beating the raw material to separate the paper fibers and to form a fiber slurry. The fiber slurry is then refined, in a refining machine, to make the surface of the fibers more rough.

Once a pulp is obtained, paper can be formed by hand or by machine. The same basic steps are involved for either hand- or machine-made paper: (1) forming; applying the pulp slurry to a screen; (2) draining; allowing water to drain by means of a force such as gravity or a pressure difference developed by a water column; (3) pressing; further dewatering by squeezing water from the sheet; and (4) drying; air drying or drying the sheet over a hot surface. Importantly, the pulp should be applied to the screen at a low consistency (e.g., about 0.1% to about 1.0% solids) to provide an even distribution of fibers and paper uniformity (G. A. Smook; $2^{nd}$ Edition Handbook for Pulp and Paper Technologists; Angus Wilde Publications Inc. 1994).

The pulp making process can be chemical, mechanical, or chemi-mechanical—depending on the desired amount of lignin removal. Pulps produced using chemical means are usually stronger and easily bleached to increase brightness. Mechanical pulps, on the other hand, tend to retain more lignin. Mechanical pulps thus tend to be weaker and more difficult to bleach. Chemi-mechanical pulps generally have strength properties somewhat in between of chemical and mechanical pulps. Different grades of paper are made with different types of pulp. For example, newsprint grades typically use mechanical pulps. High quality writing and printing grade papers typically use bleached chemical pulps.

As indicated above, chemicals are typically added during pulping to remove lignin. However, the chemicals also tend to remove hemicellulose from fibers as well. It is generally desirable to retain some hemicellulose content because hemicellulose is a natural binding agent which provides additional tensile and bursting strength to paper pulp. Therefore, it may be desirable to replace the lost hemicellulose with a hemicellulose containing additive, such as EFA (Enhanced Fiber Additive) made in accord with process described herein.

IV. B. 2. Use of the EFA in Papermaking—General Comments

Preferably a papermaking fiber additive is low in fats, proteins, lignin and ash but high in holocellulose and inclusive of hemicellulose. Hemicellulose is hydrophilic and thus promotes hydrogen bonding between the individual paper fibers. Thus, hemicellulose functions as a binder and improves paper strength. Because lignin is hydrophobic and adds a yellowish color to the resulting paper, it is generally desirable to minimize the amount of lignin in a paper additive. Lignin also acts as a glue, which holds the individual fibers together. In contrast, it is preferred that the individual fibers are easily dispersible.

Although other fibers (with higher lignin content) can be used as a strength additive, corn fiber is of particular interest as a paper additive because corn fiber has an adequate hemicellulose content and relatively low lignin and ash contents.

For example, whereas corn fiber has about 3-6% lignin, soft wood contains about 25-31% lignin and hardwood contains about 16-24% lignin.

Processing according to the present invention, as will be apparent from the discussion in section VIII below can be conducted to lead to a modified or enhanced fiber additive which has particularly desirable change of characteristic with respect to holocellulose character, hemicellulose character, and cellulose character, versus the SBF raw material from which it is made. The relatively high cellulose character means that the fibrous material will behave in a manner similar to wood fibers, in dispersability and alignment, within the paper. The defined hemicellulose character in part means that desirable strength enhancement will occur. The overall total holocellulose content, means that other undesirable effects are reduced to an acceptable level. In addition, it is believed that the modifications of surface characteristics and lignin characteristics also facilitate the operation of the material as a paper additive.

IV. B. 3. Processing

Figure 8A:
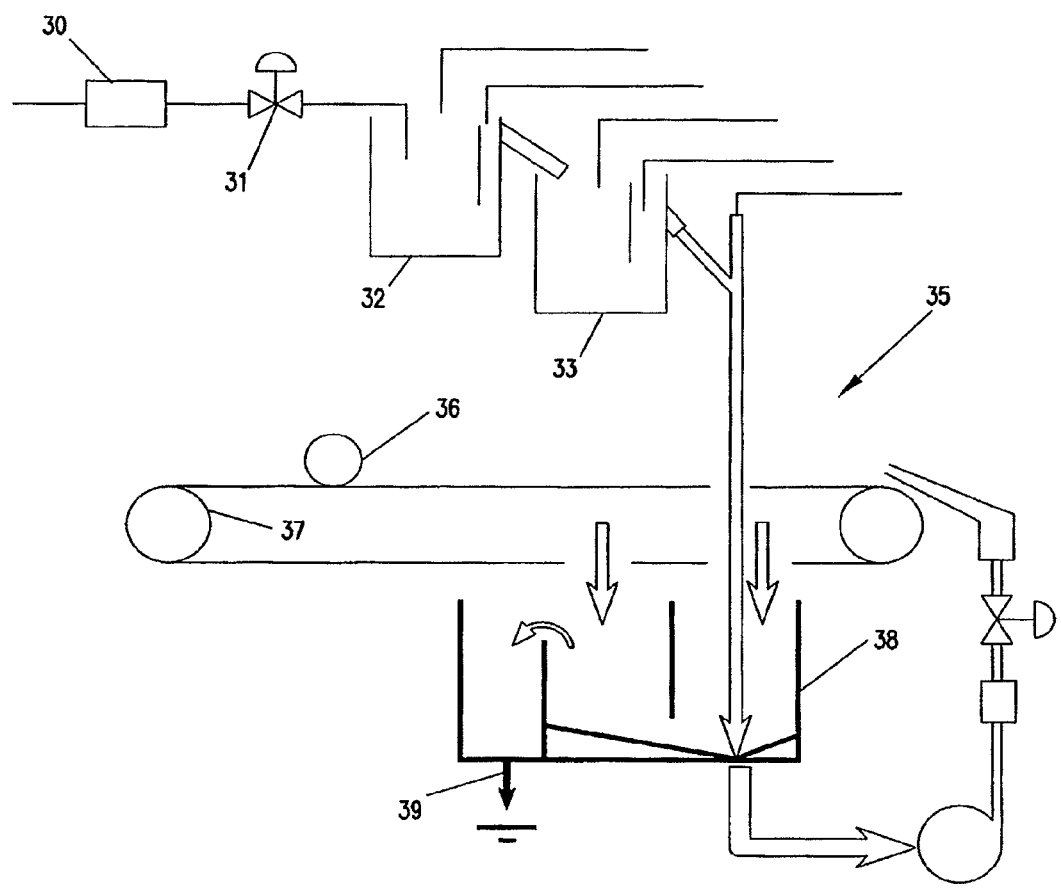
FIG. 8A shows a schematic of a WMU pilot paper machine.
Figure 8B:
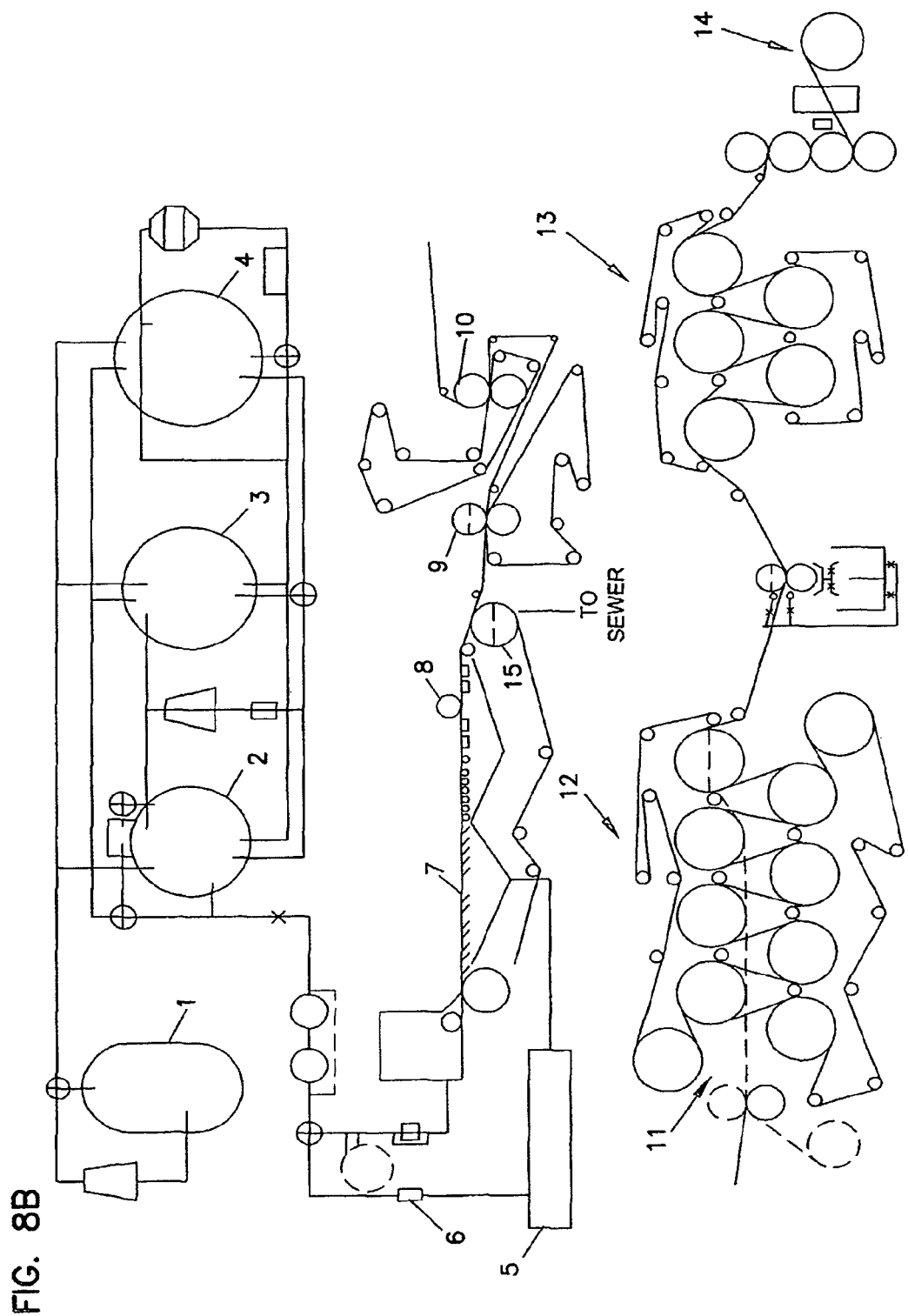
FIG. 8B shows a typical paper machine.

The EFA can be added to papermaking pulp slurry prior to or during the refining or beating stage of the paper making process (FIG. 8B). Preferably, the EFA is refined along with the paper making pulp slurry to enhance mixing and contact between the EFA and the paper making pulp fibers. The EFA is preferably added in an amount that is sufficient to enhance the properties of the resultant paper, but not so high that it undesirably inhibits drainage of the papermaking pulp or adversely affects operation of equipment. Preferably, the EFA is added to the papermaking pulp at a concentration of about 0.1 weight % to about 10 weight % based on the papermaking pulp content, more preferably about 0.5 weight % to about 3.0 weight %, most preferably about 0.5 weight % to about 2.0 weight %.

Optionally in addition to the EFA, a cationic starch can be added to the paper slurry system to provide flocculation for the fiber, aid in drainage of the water, and retain fibers and filler material. Cationic starches are produced by a chemical reaction of starch with reagents containing amino, imino, ammonium, sulfonium, or phosphonium groups, all of which can carry a positive charge. Currently, the commercially significant derivatives are the tertiary amino and quaternary ammonium starch ethers. A key factor in their usefulness is an affinity for negatively charged substrates (O. B. Wurzburg; Modified Starches: Properties and Uses; CRC Press Inc., 1986).

The EFA provides for the option of reduction in papermaking pulp, for example, up to 33%, while maintaining the burst and tensile strength properties of the paper. Additionally, the EFA increases wet strength and runability during the papermaking process such that machine speeds can be increased and web breaks for lightweight paper grades are reduced.

Referring to FIG. 8A, Lou Calder paper machine operation is shown. Such a machine could be used to achieve production with a machine speed of 6 fpm to 150 fpm, to produce 75 lbs per hour to 200 lbs per hour of paper having a basis weight of 18 lbs to 400 lbs.

Referring to FIG. 8B, at reference No. 1, a Hollander feeder is depicted. The machine chest is indicated at 2, the beater chest at 3 and the back chest at 4. The tray water box is indicated at 5, with pH control at 6, the table rolls at 7, the dandy roll at S, the first press at 9, the second press at 10, the size press at 11, the first dryer at 12, the second dryer at 13 and the takeup roll at 14. The suction couch is indicated at 15.

Such equipment is standard papermaking equipment, and useable in papermaking processes according to the descriptions herein.

IV. B. 4. Product

This disclosure also provides a paper product which includes the EFA. The EFA may be used to improve many properties of paper, for example, the internal bond strength of the paper such as burst, Scott bond, and tensile; and bulking/packaging properties such as bulk density. All of these paper properties can be measured using published TAPPI test methods.

The EFA is suitable for use in a variety of paper materials. Paper materials are classified as paper (newsprint, stationary, tissue, bags, towels, napkins, etc.) or paperboard (linerboard, corrugated media, tubes, drums, milk cartons, recycled board used in shoe and cereal boxes, roofing felt, fiberboard, etc.). The industry typically divides paper into broad categories based on the types of fibers used in the paper and the weight of the paper. The EFA is suitable for use in all classes of papers. However, it will typically be used to enhance the properties of high-grade papers such as bond papers, fine papers, and paperboard such as linerboard or corrugating medium.

Bond papers are a broad category of high quality printing or writing papers. They are made from bleached chemical pulps and cotton fibers and may be watermarked. Fine papers are intended for writing, typing and printing purposes. They may be white or colored, are made from bleached Kraft or sulfite softwood pulps, and may contain hardwood pulps for smoothness and opacity. Linerboard is an unbleached Kraft softwood sheet of southern pine or Douglas fir made in various weights. Frequently, linerboard is a two-ply sheet. The compression strength and burst strength of the linerboard is important. Corrugating medium is made from unbleached, semi-chemical pulp. It is formed into a wavy structure and sandwiched between plies of linerboard to form a corrugated structure. Corrugating medium is usually used to make boxes.

C.

IV. B. 5. Additional Observations

In general, for material to have good property as an additive for papermaking, in the manner of the EFA use as an additive, the material should provide the following:

(A) The good hydrophilicity of hemicellulose;

(B) A cellulose-like fiber property; and (C) A fiber structure capable of forming bridging microfibrils in the paper.

The hemicellulose hydrophilicity helps with the dispersion capabilities of the materials, as well as hydrogen bonding to the cellulose material in the pulp. Cellulose-like fiber properties provide for good intermingling with the other cellulose fibers in the pulp. An appropriate microfiber structure allows for the formation of microfibrils which can add to overall strength of the paper by forming a bridging network between pulp (cellulose) fibers.

As indicated above and through the following experiments, enhanced fiber additive (EFA) made according to the present invention, provides such a material. In general, as a result of the modification: (a) the percent cellulose character in the overall fiber material is typically higher than it was prior to treatment; (b) the ratio of cellulose character to hemicellulose character is typically increased relative to the starting fiber; and (c) the holocellulose character is typically increased. The material has a distinctive, observable, micro structure, and provides the formation of a microfibril structure in the paper product, as indicated by the examples below and depicted in the comparisons of FIGS. 19 and 20. The observable cellulose-like structure allows the materials to align with cellulose pulp materials, as characterized below in connection with the Examples.

IV. C. Use of EFA as a Food Additive

Dietary fiber is important for the digestive process and has a role in the prevention of diseases such as colon cancer. Dietary fiber is also thought to reduce serum cholesterol levels, which is important in the prevention of heart disease. "Dietary fiber" includes soluble and insoluble components of plant cell walls that are not digested by endogenous (non-bacterial) enzymes of a human digestive tract. Dietary fiber is not absorbed in the small intestine and thus enters the large intestine (colon). "Insoluble fiber" includes oligo- and polysaccharides such as cellulose and hemicellulose. "Soluble fiber" is used to denote fiber that is at least 50% soluble according to the method described by L. Prosky et al., *J. Assoc. Off. Anal. Chem.*, 71, 1017-1023 (1988). Examples of soluble fiber include pectin, beta-glucans (small cellulose-type branched glucose polymers), and gums such as xanthan gum. Uses of fiber additives in foods are reported as dietary fiber under the Nutrition Labeling and Education Act (NLEA) of 1990.

It is common for food manufacturers to use a combination of insoluble and soluble fiber in food formulation. The insoluble fiber products are used largely for fortification, and the soluble fiber products for functionality. Functionality includes appearance, viscosity building capability, water holding capacity, and oil holding capacity.

Because the EFA has both a significant water holding capacity (i.e., hydrophilic character) and a significant oil holding capacity (i.e., lipophilic character), not only can it be used as an emulsifier, viscosity builder or for similar reasons, but also it can be enhanced or fortified with other materials, and used as part of the delivery vehicle, for example to deliver a nutraceutical. Thus, it can be fortified with various nutrients, dietary supplements, etc., prior to incorporation into food products or prior to direct ingestion.

The EFA is suitable for use as a dietary fiber supplement. Unlike many commercially available fiber additives, the EFA provides both fortification and functionality. More specifically texture, thickening, and mouthfeel are improved due to its absorbency.

Typically, the EFA will be used in an amount of at least about 0.5%, for example, about 1% by wt. of the total contents of a food preparation mix before processing, whether solid or liquid, from which the food is prepared. In baked goods, at least 0.5%, for example, 1% or more, typically at least 3% by wt. on the basis of flour components, is useable.

IV. C. 1. Processing

EFA can be included in a food formulation or nutritional supplement. It can be used in any current food formulation that incorporates insoluble fiber, and, due to its viscosity-building properties, may replace, in whole or in part, soluble fiber products in current food formulations.

IV. C. 2. Food Products

This disclosure also provides a food product that includes EFA. Because of its viscosity building characteristics, EFA is suitable for use in nutrition beverages to impart a thick, creamy mouthfeel, to help suspend fine solids like cocoa powder and minerals, and to help stabilize the emulsion. It can also be used as a clouding agent, in juices. Due to its viscosity building characteristic, EFA is also suitable for use to achieve a desirable texture and cling in salad dressing or similar dressings, sauces, and fillings.

The water holding capacity of the EFA makes it suitable for use as an additive to prevent staling in baked goods such as bread and bagels. Advantageously, EFA is suitable for use in baked goods and bakery items that are generally consumed for fiber fortification. Furthermore, the water holding capacity of EFA makes it suitable as a component to provide freeze/thaw stability in frozen foods, and to increase cooking yield in meats like ground beef.

In general, for flour containing food products, the EFA will typically be useable in any acceptable amount. For example, at least 0.5% or more by wt. of flour ingredient. In food preparations generally, including beverages and solid food mixes, the EFA will typically be useable in any acceptable amounts, for example, at least 0.5% by wt. based on total ingredient weight before processing such as any cooking.

IV. D. Other Uses of EFA

The EFA can also be used in adhesive formulations to improve binding strength and water holding characteristics. The EFA can be used to improve rheological properties of paint formulations without contributing to VOC's (Volatile Organic Compounds). Paper coating formulations often contain compounds (e.g., CMC (Carboxymethylcellulose)) to modify the water holding ability of the coating color. Due to its high water holding capacity, EFA can be beneficial in paper coating applications.

V. Examples

Example 1

Acid Treatment

EFA can be prepared using corn fiber, for example, SBF from corn wet milling operations. Corn fiber (SBF-C) was obtained from Cargill Corn Milling, Cedar Rapids, Iowa. The corn fiber (SBF-C) was washed on a 70-mesh screen using a fine spray of water to remove fiber fines, free starch and protein. The moisture content of the resulting washed fiber was determined to be 50%. Approximately 1200 grams (600 grams on dry basis) of the fiber was then loaded in the screened basket (having a 100-mesh screened bottom) of an M/K digester and inserted in the pressure vessel.

A dilute acid solution containing 2% sulfuric acid (based on fiber dry weight) was combined with the SBF at a ratio of dilute acid solution to SBF of 10:1 (weight basis). The dilute acid solution contained 12 grams of 100% sulfuric acid (or 12.5 grams of the acid purchased at 96% concentration) and 5387.5 grams of water. The amount of sulfuric acid and water in the dilute acid solution was determined as shown below:

Total weight of the dilute acid solution: 600 g×10=6000 g
Amount of water needed: 6000−600 g (from wet fiber)−12.5 g of $H_2SO_4$=5387.5 g of water The dilute acid solution was slowly added to the corn fiber in the digester and the circulation pump was turned on. After confirming that the dilute acid solution was being circulated in the reactor, the reactor lid was sealed. The reaction temperature was set at 120° C. and time to reach reaction temperature was set at 45 minutes and then was set to be maintained for 1 hour. The heater in the reaction vessel was turned on. The temperature and pressure inside the reactor were recorded as a function of time. After reaching the target temperature of 120° C., the reaction was continued for 1 hour. After 1 hour, the cooling water supply to the reactor was turned on to cool the reactor contents. The spent dilute acid solution was drained from the reactor by opening a drain valve on the reactor. The fiber content in the reactor basket was carefully removed and washed using two washing batches of 6 liters of water each. The washing was continued further until the wash water had a neutral pH (e.g., between 6.0 and 8.0, typically about 7.0).

Example 2

First Surface Modification: Acid Chlorite Treatment

The acid treated fiber from Example 1 was then treated in a surface modification step. The acid treated fiber was combined with an acid chlorite solution to form a fiber slurry that included 10% fiber and 90% acid chlorite solution. The acid chlorite solution included 1.5% by weight (based on dry fiber) of sodium chlorite and 0.6% by weight (of dry fiber) of hydrochloric acid. The reaction was carried out in a sealed plastic bag at a temperature of 65-75° C. for 1 hour at a pH between about 2 and 3. After treatment with the acid chlorite solution, the fiber slurry was diluted with 2 liters of water and filtered in a Buchner type funnel. This step was repeated until the resulting filtrate was clear and at neutral pH (e.g., pH 6.0 to 8.0, preferably about 7.0).

Example 3

Second Surface Modification: Peroxide Treatment

The acid chlorite treated fibers from Example 2 were then treated with an alkaline peroxide solution. The fibers were combined with 3-8% by weight (of the dry fiber) of hydrogen peroxide and 2% by weight (of the dry fiber) sodium hydroxide at a pH between about 10-10.5 and at a solids concentration of 10-20%. Sodium metasilicate was added (3% by weight of dry fiber) as a chelating agent. The peroxide treatment step was conducted in a sealed plastic bag at 60-65° C. for 1 hour. After the reaction, the fiber slurry was diluted with 2 liters of water and filtered in a Buchner funnel. This step was repeated until the resulting filtrate was clear and at neutral pH. The bleached processed fiber was dried in an air-circulated oven at a temperature of 35-60° C. and then ground to 100-mesh size (e.g., 150-250 micron) using a Retsch mill.

Example 4

Structure: Scanning Electron Microscope

Figure 2:
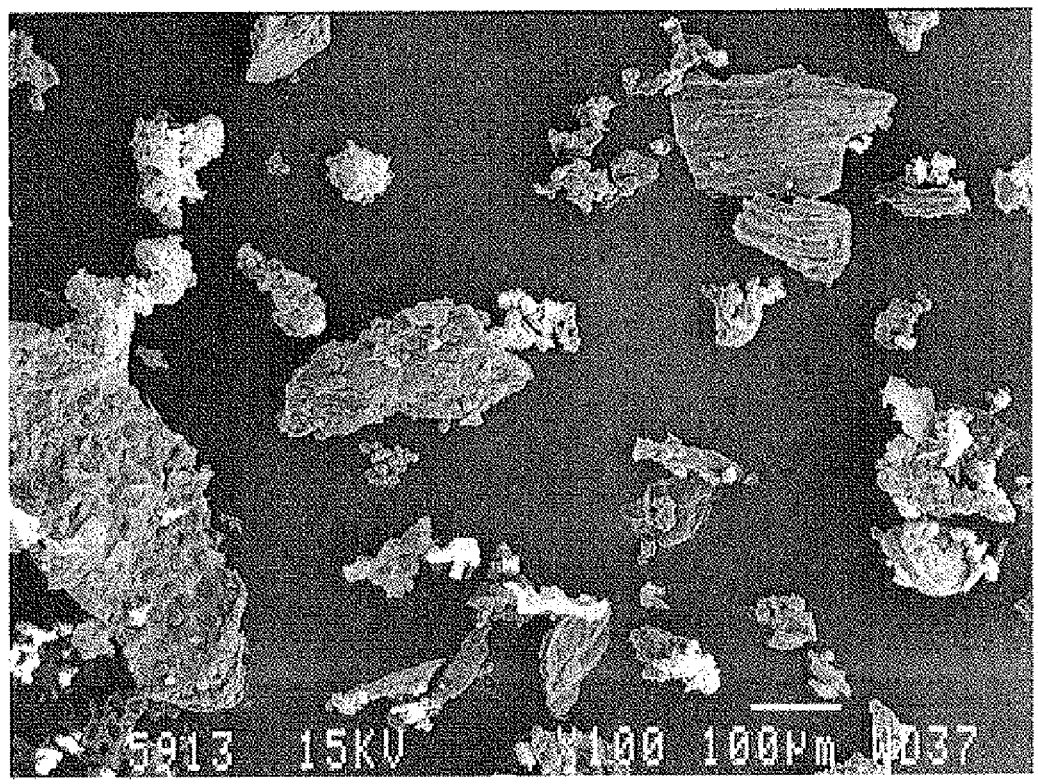
FIG. 2 shows a digital printout of Scanning Electron Micrograph (SEM) taken at 100× of ground corn fiber (SBF-C) from a corn wet milling process.
Figure 3:
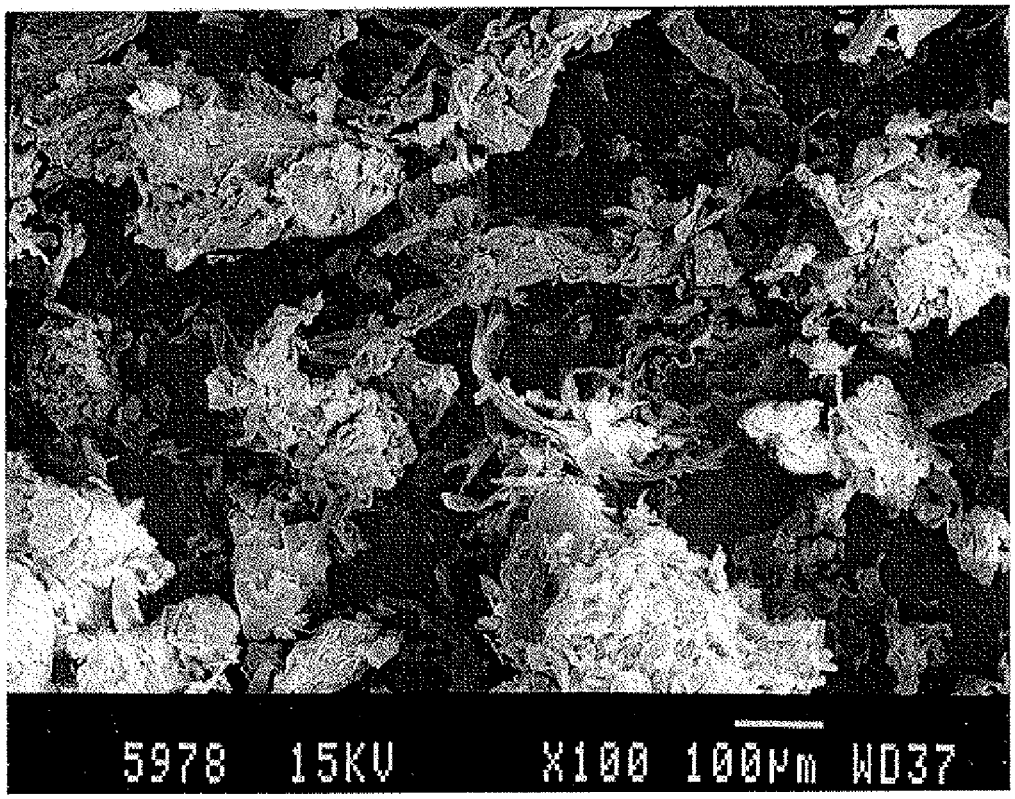
FIG. 3 shows a digital printout of Scanning Electron Micrograph at 100× of the ground enhanced fiber additive from corn fiber (EFA-C) made in accord with the present disclosure.

The structure of ground corn fiber (SBF-C) from the corn wet milling process and the structure of the ground enhanced fiber additive (EFA-C) from Example 3 were examined at 100× using a Scanning Electron Microscope (SEM). Samples were dried and prepared using standard SEM sample preparation techniques. FIGS. 2 and 3 show the Scanning Electron Micrographs for ground corn fiber (SBF-C) and enhanced fiber additive (EFA-C), respectively. The ground corn fiber (SBF-C) has a jagged and rock-like appearance. The unprocessed fiber is very structured (in bundles) (FIG. 2). The structure of the ground enhanced fiber additive is substantially different when compared with SBF-C. Whereas the SBF-C has a jagged and rock-like appearance, the EFA-C has a lighter, more wispy, feathery or bloomed appearance. As a result, the EFA-C has an increased surface area when compared to the untreated fiber.

Herein, the type of structure observed for EFA under a Scanning Electron Microscope (SEM) at 100×, and exemplified in FIG. 3 (by comparison to FIG. 2) will be referred to as a feathery, bloomed structure. It is a characteristic of typical enhanced fiber additives according to the present invention, that when viewed in accord with the experiment characterized above, that such an appearance is noted, in at least a portion of the particles. Generally, the appearance is most noted in the larger particles of the sampling, especially those exhibiting a particle dimension in the SEM of 100 micrometers or larger.

Example 5

Composition: Raman Spectra

Figure 4:
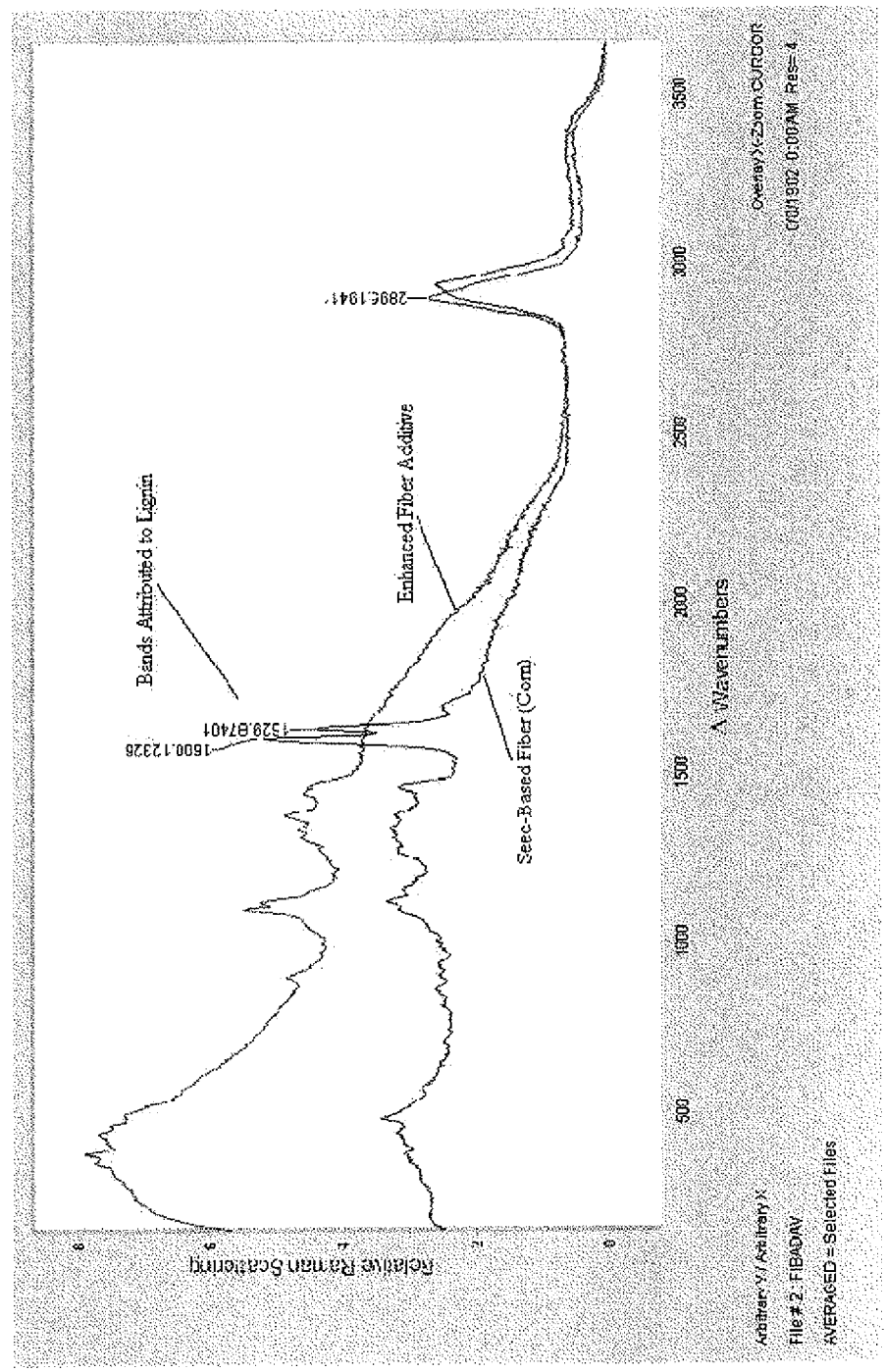
FIG. 4 is a Fourier Transform Raman Spectral comparison of SBF-C and the EFA-C.

The Raman scattering spectra of the SBF-C and EFA-C were compared. A Fourier transform Raman spectral comparison of the two fibers is shown in FIG. 4. The most prominent difference between the two spectra is in the disappearance of the bands associated with lignin at 1600 cm$^{-1}$ and 1630 cm$^{-1}$ (U. P. Agarwal and Sally A. Ralph, Appl. Spectrosc, 51, 1648, 1997).

Example 6

Composition: Effect on Lignin Content

The Kappa number and % Klason for the SBF-C and EFA-C were determined using the methods described in Tappi Test method T236 cm-85, published by Tappi and incorporated herein by reference. The results are shown in Table 1. As can be seen from Table 1, almost 90% of the lignin from the SBF-C was removed by the modification process. This corroborates the data seen in the FT-Raman reflectance analysis of example 5.

TABLE 1

Comparison of Kappa Number (KN) of SBF-C and EFA-C

| Sample | KN | Calc. % Klason | Normalized % Klason | % Lignin Removed |
|---|---|---|---|---|
| SBF-C | 72.7 | 10.9 | 10 | 0 |
| EFA-C | 15.3 | 2.3 | 1 | 89 |

EFA-C in this Example was prepared in accord with Examples 1, 2 and 3; i.e., with acid, chlorite and peroxide treatment.

Example 7

Chemical and Dietary Fiber Analysis

Samples of the EFA-C were submitted to Medallion Labs (Minneapolis, Minn.) for proximate chemical analysis and dietary fiber analysis consistent with NLEA (Nutritional Labeling and Education Act) methods. Results of the proximate chemical and nutritional analyses of the bleached processed fiber are summarized in Table 2. References to the official methods, published by AOAC International, are included in the table.

TABLE 2

Composition and Properties of EFA-C

| Component | Percent dry solids basis (%) | Method Reference |
|---|---|---|
| Total carbohydrates | 88.3 | Calculated by difference |
| Total dietary fiber (insoluble) | 87.2 | AOAC 991.43 |
| Total fat | 6.39 | AOAC 996.06 |
| Moisture | 2.5 | AOAC 926.08 |
| Protein | 2.38 | AOAC 968.06 |
| Ash | 0.44 | AOAC 923.03 |
| Oil holding capacity % | 300% | See below |
| Water capacity % | 540% | See below |

The analysis shows that the enhanced fiber additive is largely insoluble fiber, or dietary fiber according to NLEA guidelines. This is a desirable component for a fiber food additive.

The percent water holding capacities (WHC) of the fibers were determined using a modification of AACC (American Association of Cereal Chemists) Method 56-20. In the water holding capacity test, 1.25 g of fiber was mixed with an excess of water (12.5 mL) in a pre-weighed 50 mL centrifuge tube. The pH of the mixture was adjusted to 7.0 and the sample was allowed to hydrate at room temperature with intermittent mixing for 60 minutes. The sample was then centrifuged at 6000×g for 25 minutes. Excess water was removed by inverting the tube at a 45-degree angle for 30 seconds. The percent WHC was determined by dividing the final weight of the tube contents by the initial weight of the fiber sample and multiplying by 100. The percent WHC is interpreted as the maximum amount of water that 1 gram of fiber will retain under low speed centrifugation.

The oil holding capacity (OHC) was determined using the same approach as the water holding capacity, except that the pH was not adjusted and corn oil was substituted for the deionized water.

Example 8

Papermaking: Laboratory Investigation of EFA-C

Papermaking Furnish Preparation: Hardwood and softwood bleached Kraft commercially available market pulp was received from Georgia Pacific. A 50% hardwood and 50% softwood blend was slurred with distilled water to 1.2% by weight consistency in a 5-gallon container. 0.5% by weight of EFA-C (Enhanced Fiber Additive made from Corn Fiber) was added to the 1.2% consistency hardwood/softwood papermaking slurry.

Refining: Tappi Method T-200 describes the procedure used for laboratory beating of pulp using a valley beater. The hardwood/softwood papermaking pulp furnish containing the EFA-C was refined using a valley beater. The furnish was refined to 450 mL CSF (Canadian Standard Freeness). The freeness of the pulp was determined using the TAPPI test method T-227. Once 450 mL CSF was obtained, the furnish was diluted to 0.3% consistency with distilled water and gently stirred with a Lightning mixer to keep the fibers in the papermaking furnish suspended.

Making Handsheets Paper was made using the following handsheet procedure according to TAPPI Test Method T-205. Basis weights of 1.2 gram handsheets (40 lb sheet or 40 lb/3300 ft$^2$ or 60 g/m$^2$) and 1.8 gram handsheets (60 lb sheet or 60 lb/3300 ft$^2$ or 90 g/m$^2$) were for comparison. In some instances, 20 lb/ton of a cationic dent corn starch (Charge+ 110 from Cargill) was added to the handsheet mold to aid in drainage and retention.

Handsheet Testing: The paper handsheets were submitted to Integrated Paper Services (IPS, Appleton, Wis.). The paper handsheets were conditioned and tested in accordance to TAPPI test method T-220 Physical Testing of Pulp handsheets. Instruments used: Caliper—Emveco Electronic Microguage 200A; Burst—Mullen Burst Test Model "C"; Tear—Elmendorf Tear Tester; Tensile—SinTech.

Results: Table 3 represents the paper properties from the handsheet evaluation with and without the EFA-C.

TABLE 3

Handsheet Paper Test Results

| | | Caliper (mils) | | Basis Wt (g/m$^2$) | | Burst Index (kPA m$^2$/g) | | Tear Index (mN m$^2$/g) | | Tensile Index (N-M/g) | |
|---|---|---|---|---|---|---|---|---|---|---|---|
| Handsheet | (g) | No Starch | 20 lb/t CH + 110 | No Starch | 20 lb/t CH + 110 | No Starch | 20 lb/t CH + 110 | No Starch | 20 lb/t CH + 110 | No Starch | 20 lb/t Ch + 110 |
| Control | 40 lb | 20.25 | 21.00 | 63.22 | 64.72 | 3.38 | 3.70 | 12.81 | 13.00 | 46.96 | 52.33 |
| Control | 60 lb | 29.39 | 29.46 | 97.75 | 95.21 | 3.76 | 4.20 | 14.64 | 13.25 | 51.49 | 55.34 |
| EFA-C | 40 lb | 20.00 | 21.41 | 66.01 | 69.42 | 3.80 | 4.33 | 11.60 | 11.21 | 51.54 | 58.59 |
| EFA-C | 60 lb | 28.91 | 29.59 | 101.65 | 102.35 | 4.05 | 4.67 | 13.58 | 12.39 | 57.78 | 59.14 |

Figure 5:
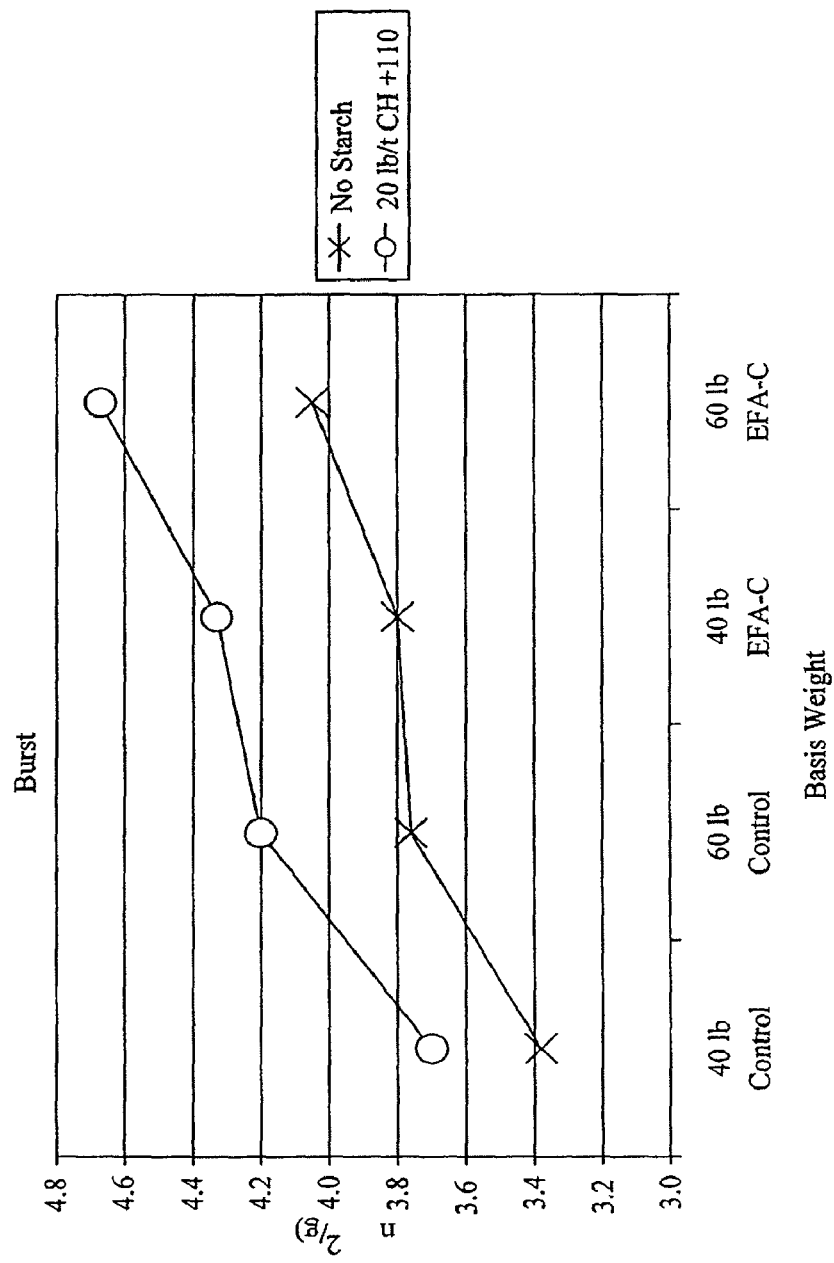
FIG. 5 is a graph showing the burst strength of paper hand sheets with and without EFA-C (enhanced fiber additive from corn hulls).

The burst strength of paper handsheets with and without EFA-C is shown in FIG. 5. The Figure also demonstrates the enhanced burst strength with the addition of 20 lb/ton of cationic starch. Note the 60 lb sheet without the EFA-C (control) has equivalent burst strength to the 40 lb sheet with 0.5% EFA-C.

Figure 6:
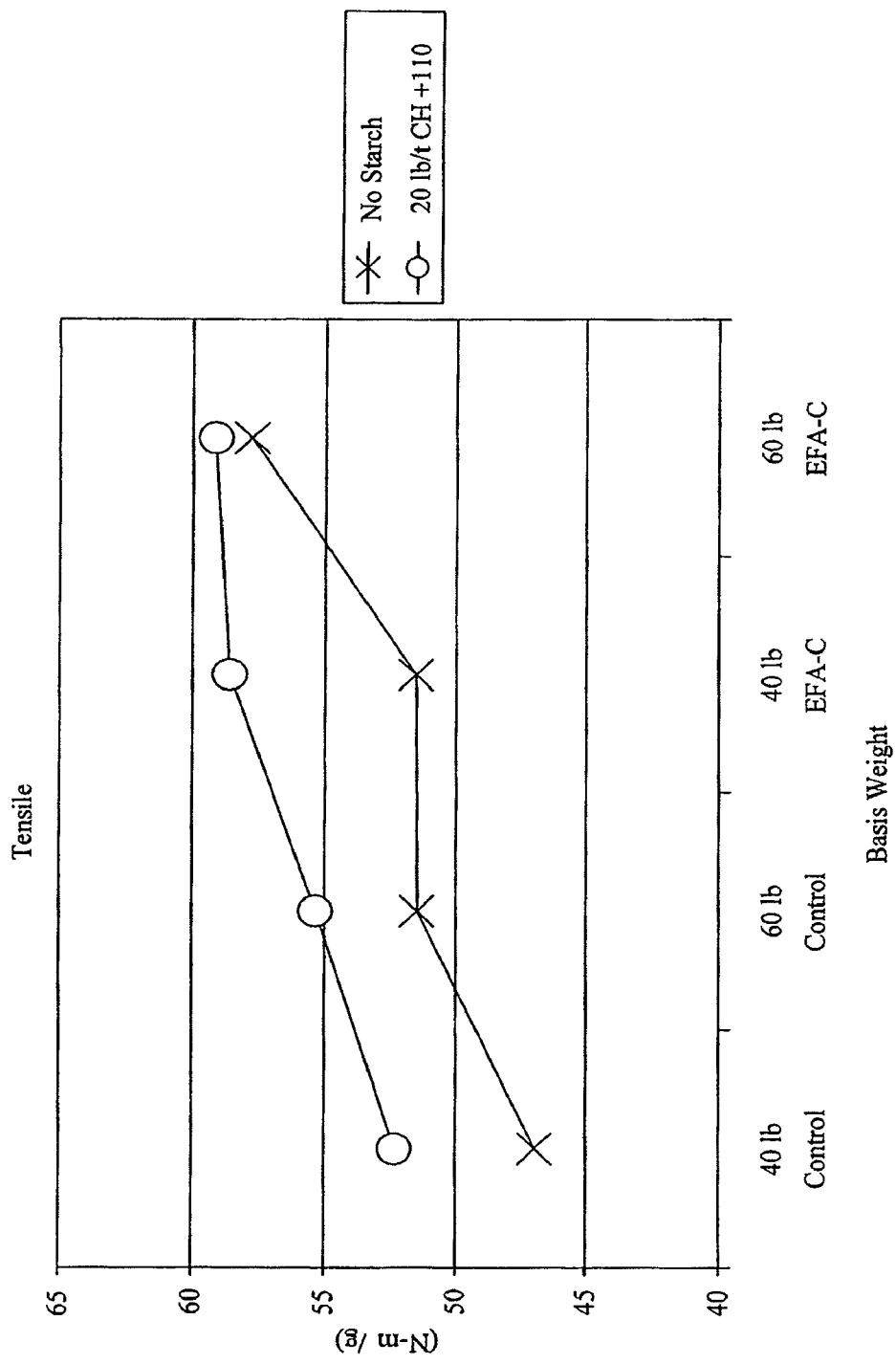
FIG. 6 is a graph showing the tensile strength exhibited by paper hand sheets with and without EFA-C.

The tensile strength exhibited by the paper handsheets with and without the EFA-C is shown in FIG. 6. The Figure also demonstrates the enhanced tensile strength with the addition of 20 lbs/ton of cationic starch. Note the 60 lb sheet without EFA-C (control) has at least equivalent tensile strength to the 40 lb sheet with 0.5% EFA-C.

Conclusion: A 40 lb sheet made in the laboratory with 0.5% EFA-C retains equivalent burst and tensile strengths as a 60 lb sheet without EFA-C. A catalytic amount of EFA-C (0.5%) replaced 33% of the Kraft wood fiber in a standard 60 lb sheet without sacrificing burst and tensile strengths. The addition of 20 lb/ton of cationic starch also elevated burst and tensile properties.

Example 9

Papermaking: Laboratory Investigation of EFA-Soy and EFA-Wheat

Papermaking Furnish Preparation: Hardwood and softwood bleached Kraft commercially available market pulp was received from Georgia Pacific. A 50% hardwood and 50% softwood blend was slurried with distilled water to 1.2% by weight consistency in a 5-gallon container. 0.5% by weight of EFA-S (Enhanced Fiber Additive made from Soy Hulls) was added to the hardwood/softwood slurry blend. Another hardwood/softwood blend was prepared as described above, with 0.5% by weight EFA-W (Enhanced Fiber Additive made from wheat midds).

Refining: Tappi Method T-200 describes the procedure used for laboratory beating of pulp using a valley beater. The hardwood/softwood papermaking pulp furnish containing the EFA-S and EFA-W were refined using a valley beater. The furnishes were refined to 450 mL CSF (Canadian Standard Freeness). The freeness of the pulps were determined using the TAPPI test method T-227. Once a 450 mL CSF was obtained, the furnishes were diluted to 0.3% consistency with distilled water and gently stirred with a Lightening mixer to keep the fibers of the papermaking furnish in suspension.

Making Handsheets: Paper was made using the following handsheet procedure according to TAPPI Test Method T-205. Basis weights of 1.2 gram handsheets (40 lb sheet or 40 lb/3300 ft$^2$ or 60 g/m$^2$) and 1.8 gram handsheets (60 lb sheet or 60 lb/3300 ft$^2$ or 90 g/m$^2$) were chosen for comparative reasons. 20 lb/ton of a cationic wet end starch (AltraCharge+ 130 from Cargill) was added to the handsheet mold to aid in drainage and retention.

Handsheet Testing: The paper handsheets were submitted to Integrated Paper Services (IPS, Appleton, Wis.) for evaluation. The paper handsheets were conditioned and tested in accordance to TAPPI test method T-220 Physical Testing of Pulp handsheets. Instruments used: Caliper—Emveco Electronic Microguage 200A; Burst—Mullen Burst Test Model "C"; Tear—Elmendorf Tear Tester; Tensile—SinTech.

Results: The results of the handsheet evaluation with and without the EFA-S and EFA-W are recorded in Table 4.

TABLE 4

Handsheet Paper Test Results

| Sample | Target Basis Wt (lb/3300 ft$^2$) | Basis Wt (lb/3300 ft$^2$) | Burst Index (kPa m2/g) | Tear Index (mN m$^2$/g) | Tensile Index (N M/g) |
|---|---|---|---|---|---|
| Control | 40 | 44.70 | 3.61 | 9.86 | 56.30 |
| Control | 60 | 68.06 | 3.85 | 11.77 | 59.12 |
| EFA-S | 40 | 43.72 | 3.87 | 11.15 | 55.32 |
| EFA-S | 60 | 68.08 | 4.20 | 10.89 | 57.72 |
| EFA-W | 40 | 41.89 | 3.98 | 8.60 | 55.95 |
| EFA-W | 60 | 63.27 | 4.54 | 10.25 | 59.61 |

The burst strength exhibited by the paper handsheets with and without the EFA-S and EFA-W is shown in FIG. 7. Note that the 60-lb control sheet without EFA-S or EFA-W has equivalent burst strength as a 40-lb. sheet with 0.5% EFA-S or EFA-W.

Conclusion: A 40 lb sheet made in the laboratory with 0.5% EFA-S and EFA-W retains equivalent burst strength as a 60 lb sheet without EFA-S or EFA-W. No tensile enhancement with EFA-S or EFA-W was measured in the laboratory as previously seen with the EFA-C.

Example 10

Papermaking: Pilot Paper Machine Investigation of EFA-C

A pilot paper machine trial was performed at Western Michigan University in the Paper Science & Engineering Department. Production capabilities were as follows: Production rate: 75 lb/hr to 200 lb/hr, Trim basis weight 18 lb/3300 ft$^2$ to 400 lb/3300 ft$^2$, Machine speeds 6 μm to 150 fpm. FIG. 8A shows a schematic of the pilot papermaking plant.

Referring to FIG. 8A, the thick stockflow is indicated at 30, the basis weight control valve at 31, mixing-and-addition tanks at 32 and 33, the head box system at 35, the dandy roll at 36, the couch roll at 37 with the drainage box at 38, the drain to the sewer line at 39. The equipment could be used to obtain a production of about 160 lbs per hour.

Papermaking Furnish Preparation: Hardwood and softwood bleached Kraft commercially available market pulp was supplied by Western Michigan University. Two different batches of a 60% hardwood and 40% softwood furnish were prepared for the study. One batch contained no EFA-C and was labeled "Control". The other batch contained 0.5% EFA-C and was labeled "EFA-C" batch. Each batch was prepared as follows: A 5% by weight consistency of 60% hardwood and 40% softwood was blended and mixed together in the Hollander Beater. Tap water was used to achieve the 5% consistency. Once the pulp was blended and re-hydrated with water, the pulp slurry was transferred to a Back Chest and diluted to a 1.5% by weight consistency with tap water. The pH of the slurry was adjusted to 7.5 buy the addition of $H_2SO_4$. From the Back Chest, the pulp slurry was sent through a single disc Jordon refiner until a freeness of 450 mL CSF was achieved. The freeness was determined by TAPPI Test Method T-227. A load weight of 40 lbs and a flow rate of 60 gpm were the operation parameters on the Jordon refiner. The refining time of each batch was kept constant (12 minutes). The EFA-C material was added to the Back Chest prior to refining at a dosing level of 0.5% by weight. Once refining was completed, the pulp slurry was transferred to the Machine Chest and diluted to 0.5% by weight consistency.

Making Paper: Two different basis weight grades of paper were targeted, a 36 lb/3300 ft$^2$ and a 73 lb/3300 ft$^2$. Basis weights were achieved by controlling the machine speed. When called for during the experiment, 10 lb/ton of cationic starch (Charge+110) was added at the Stuffbox. The 0.5% (by weight) slurry was transferred from the Machine Chest to the Headbox. From the Headbox, the slurry was transferred to the Fourdrinier where the first stages of dewatering took place. The wet paper web passed through the Dandy roll and suction boxes where more water was removed from the web. The web proceeded to the Couch roll where it was transferred to the felts and into the First Press Section. From the First Press section, the web was transferred to another set of felts into the second press section and from there into the First Dryer Section. The Size Press and Second Dryer sections were by-passed. The final stage of the web passed through the Calender Stack and onto to the Reel.

Paper Testing: All the paper testing was performed by Western Michigan University-Paper Science & Engineering. Table 5 represents the references to the TAPPI Test Procedures and number of replications performed on each test.

TABLE 5

TAPPI Test Methods

| Test Identification | TAPPI Method | Replications |
|---|---|---|
| Basis Weight | T-410 om-93 | 5 |
| Ash Content | T-413-om-93 | 3 |
| Bulk | T-220 sp-96 14.3.2 | 10 |
| Gurley Porosity | T-460 om-96 | 10 |
| Caliper | T-411 om-89 | 10 |
| Tensile Strength | T-494 om-88 | 10 MD/10 CD |
| Opacity | T-425 om-91 | 5 |
| Tearing Force | T-414 om-88 | 5 |
| Scott Bond | T-541 om-89 | 5 |
| Burst Strength | T-403 om-91 | 10 wire side/10 felt side |
| Gurley Stiffness | T-543 om-94 | 5 MD/5 CD |
| Folding Endurance | T-511 om-96 | 10 MD/10 CD |
| Sheffield Roughness | T-538 om-96 | 10 wire side/10 felt side |

Results: The paper testing results are shown in Table 6.

TABLE 6

Western Michigan University Pilot Paper Machine Trial

| ID | Grade (lb/3300 ft$^2$) | Actual B.W. (lb/3300 ft$^2$) | Bulk (cm$^3$/g) | Gurley Porosity (sec/100 mL) | Caliper (mil) | Tensile Strength (kN/m) MD | Tensile Strength (kN/m) CD | Scott Bond (ft lb/1000 in$^2$) |
|---|---|---|---|---|---|---|---|---|
| Control | 36 | 24.9 | 2.79 | 3.04 | 3.36 | 1.99 | 1.17 | 157 |
| EFA-C | 36 | 26.9 | 2.58 | 3.90 | 3.37 | 3.06 | 1.24 | 162 |
| Control | 73 | 49.7 | 2.84 | 6.33 | 6.83 | 5.62 | 2.70 | 143 |
| EFA-C | 73 | 51.6 | 2.61 | 7.74 | 6.54 | 6.19 | 3.02 | 159 |

| ID | Grade (lb/3300 ft$^2$) | Tensile Index (Nm/g) MD | Tensile Index (Nm/g) CD | Folding Endurance (log10 MIT) MD | Folding Endurance (log10 MIT) CD | Opacity (%) | Tearing Force (gf) MD | Tearing Force (gf) CD |
|---|---|---|---|---|---|---|---|---|
| Control | 36 | 6.19 | 3.64 | 1.62 | 0.90 | 76.18 | 65 | 81 |
| EFA-C | 36 | 8.78 | 3.55 | 1.80 | 1.06 | 79.12 | 74 | 88 |
| Control | 73 | 8.75 | 4.20 | 2.17 | 1.48 | 88.26 | 157 | 167 |
| EFA-C | 73 | 9.27 | 4.51 | 2.33 | 1.49 | 88.52 | 173 | 185 |

Figure 9:
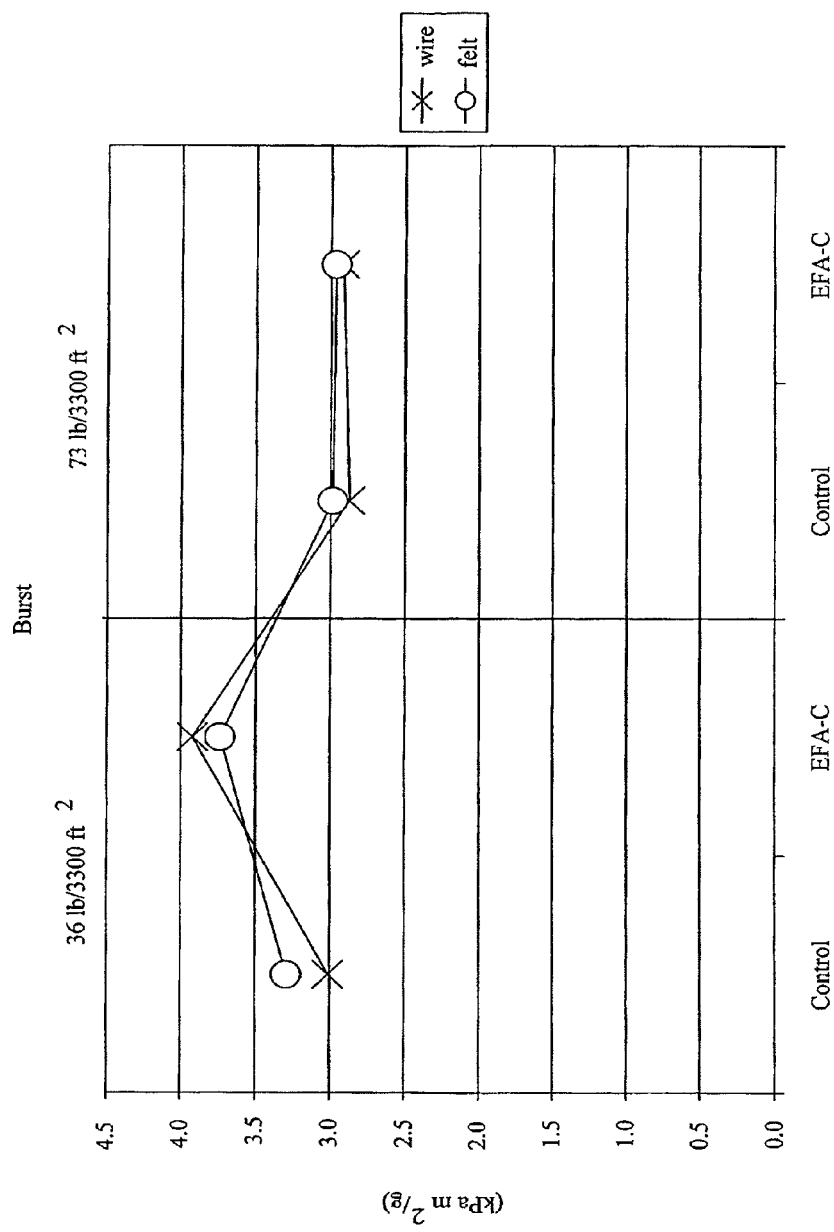
FIG. 9 is a graph showing the burst strength of paper at two different basis weights made with and without the EFA-C.

FIG. 9 shows the Burst strength of the paper at two different basis weights made with and without the EFA-C. A statistically significant improvement was to measured at the 36 lb sheet, but not at the 73 lb sheet.

Figure 10:
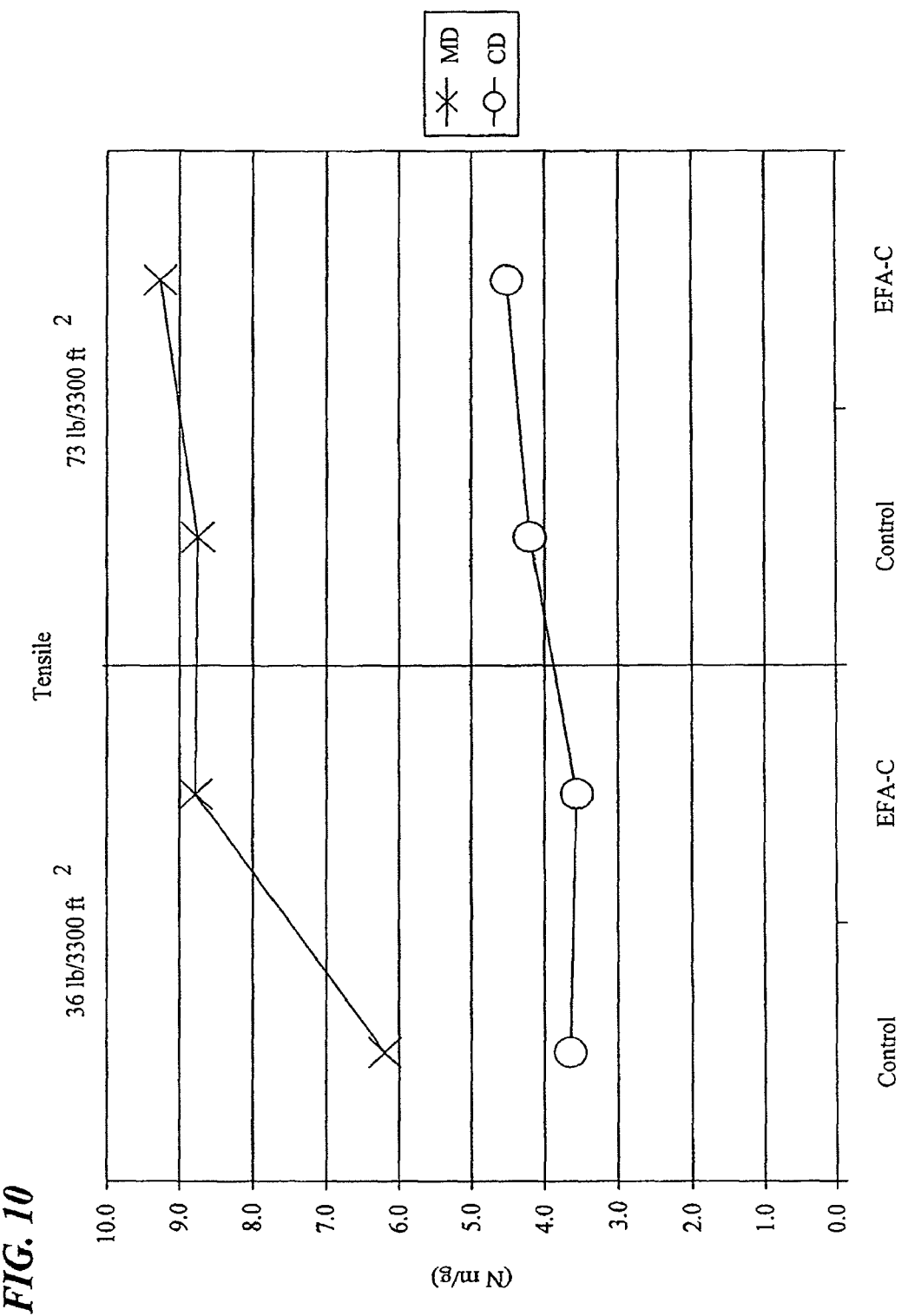
FIG. 10 shows the Tensile strength of the paper at two different basis weights made with and without the EFA-C.

FIG. 10 shows the Tensile strength of the paper at two different basis weights made with and without the EFA-C. A statistically significant improvement in tensile strength was measured in the machine direction for both 36 lb and 73 lb sheets, but only for the 73 lb sheet in the cross-machine direction.

Figure 11:
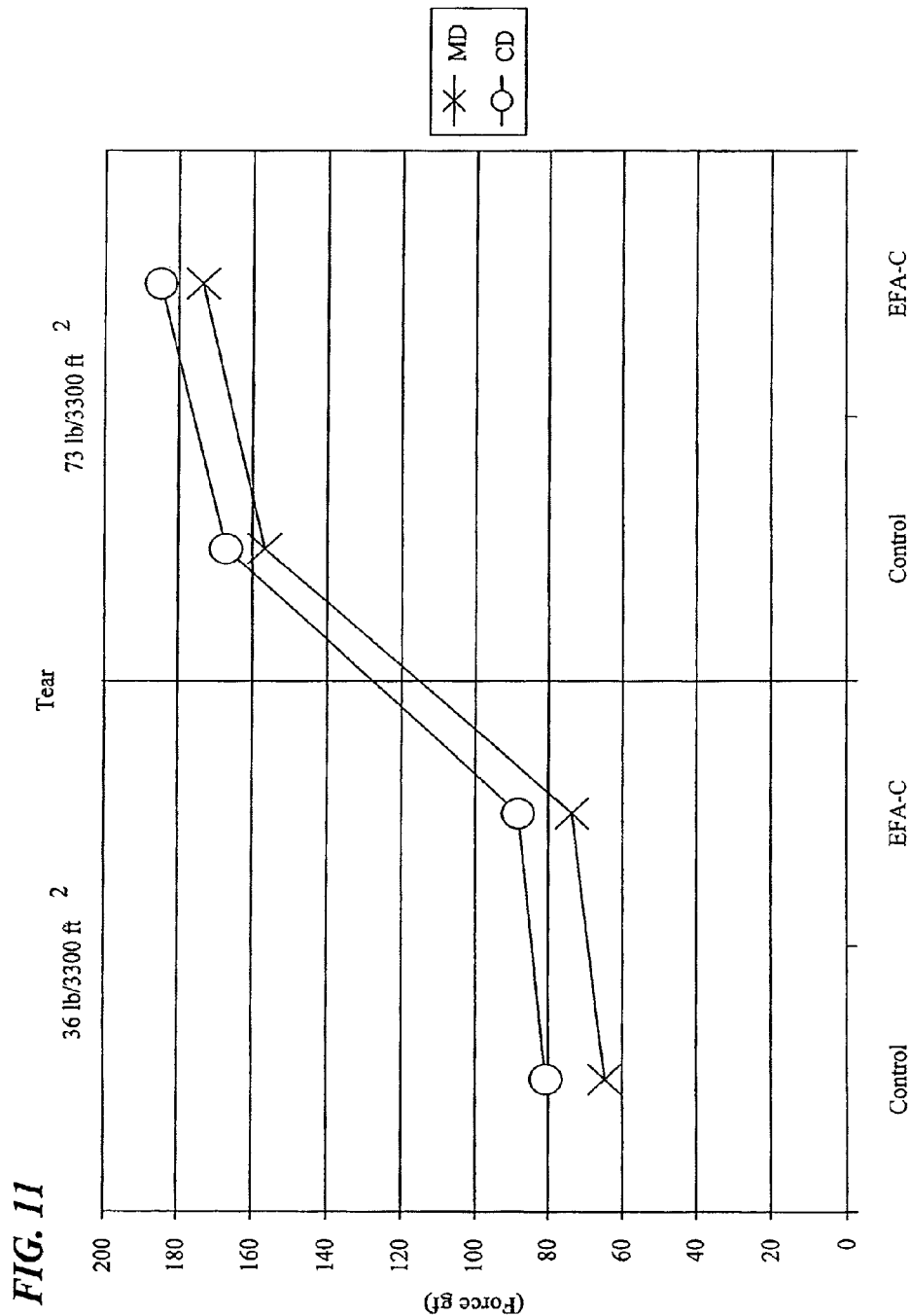
FIG. 11 shows the Tear strength of the paper at two different basis weights made with and without the EFA-C.

FIG. 11 shows the Tear strength of the paper at two different basis weights made with and without the EFA-C. A statistically significant improvement in tear strength was measured for both 36 lb and 73 lb sheets.

Figure 12:
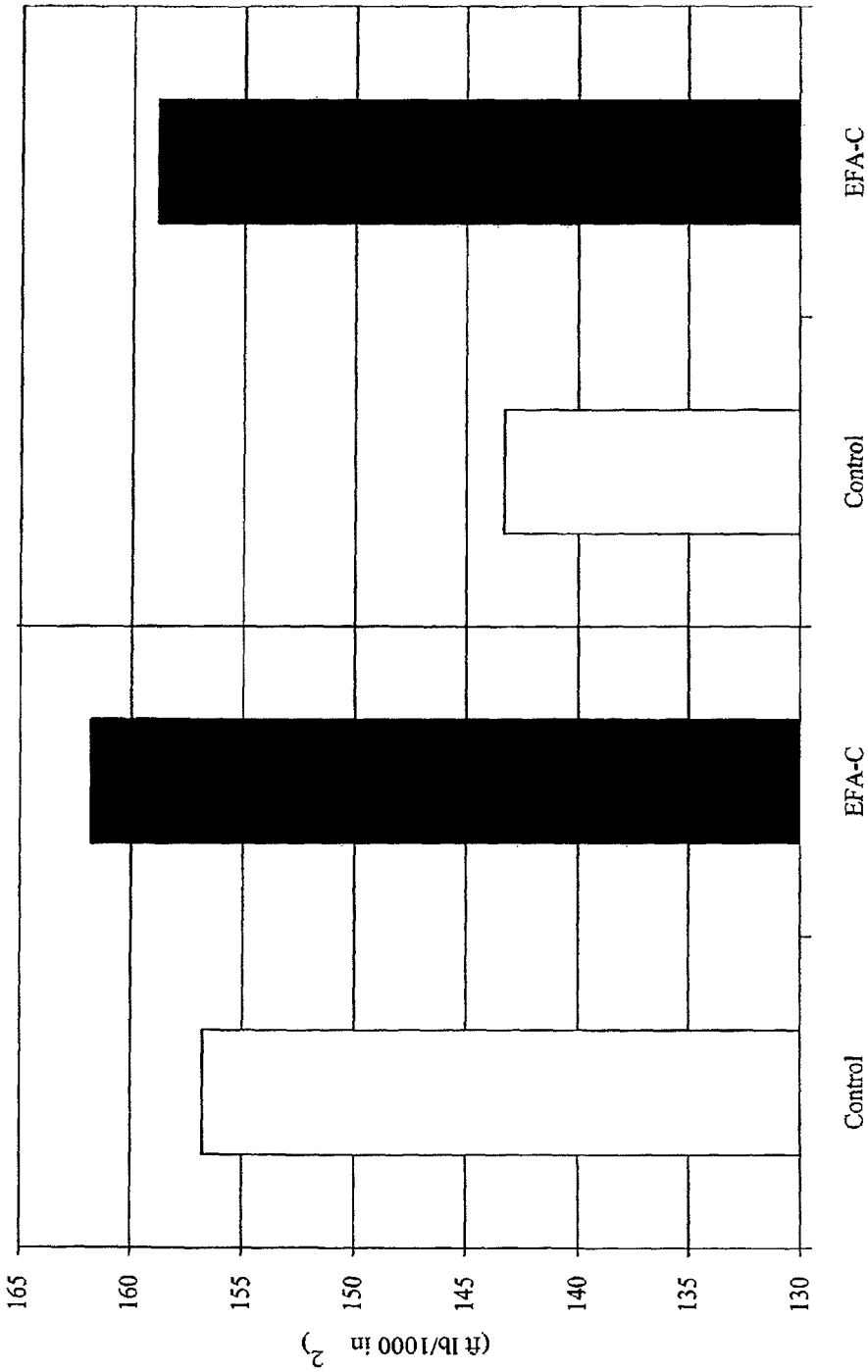
FIG. 12 represents the Scott Bond strength of the paper at two different basis weights made with and without the EFA-C.

FIG. 12 represents the Scott Bond strength of the paper at two different basis weights made with and without the EFA-C. Statistically significant improvement in Scott Bond occurred for both the 36 lb and 73 lb sheets.

Figure 13:
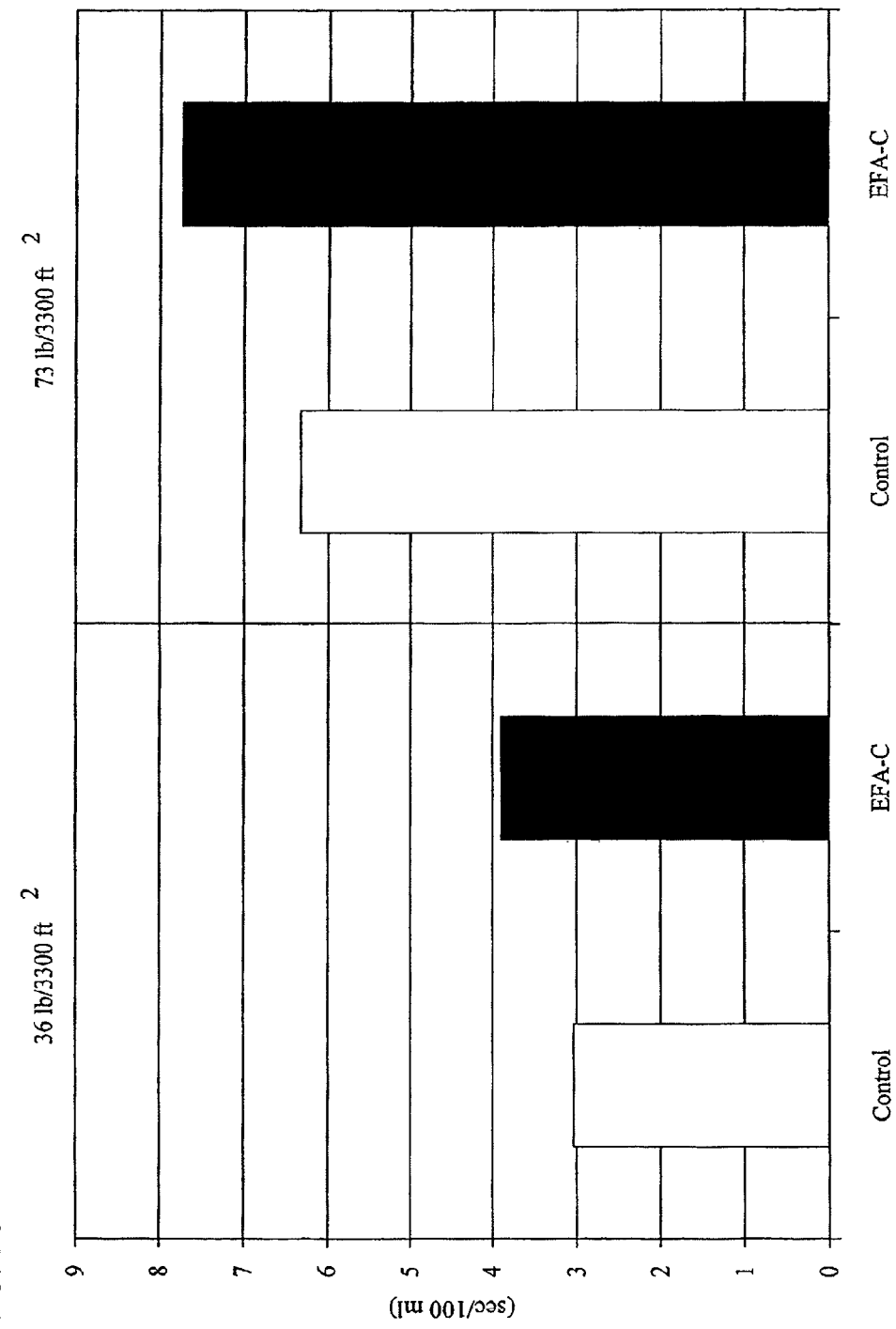
FIG. 13 shows the Porosity of the paper at two different basis weights made with and without the EFA-C.

FIG. 13 shows the Porosity of the paper at two different basis weights made with and without the EFA-C. Statistically significant improvement in porosity occurred for both the 36 lb and 73 lb sheets.

Figure 14:
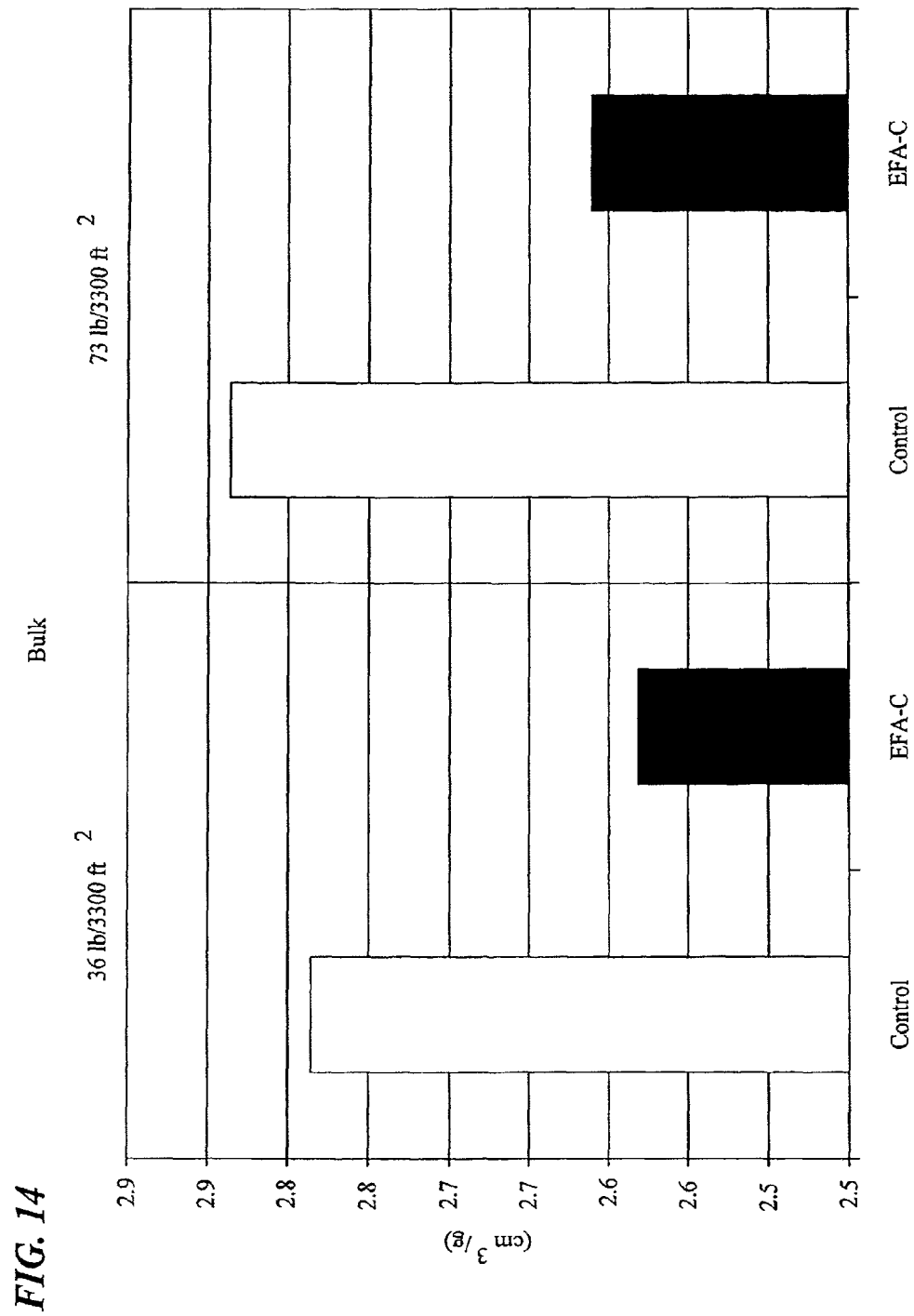
FIG. 14 shows the Bulk density of the paper at two different basis weights made with and without the EFA-C.

FIG. 14 shows the Bulk density of the paper at two different basis weights made with and without the EFA-C. Statistically significant improvement in bulk density occurred for both the 36-lb and 73 lb sheets.

Figure 15:
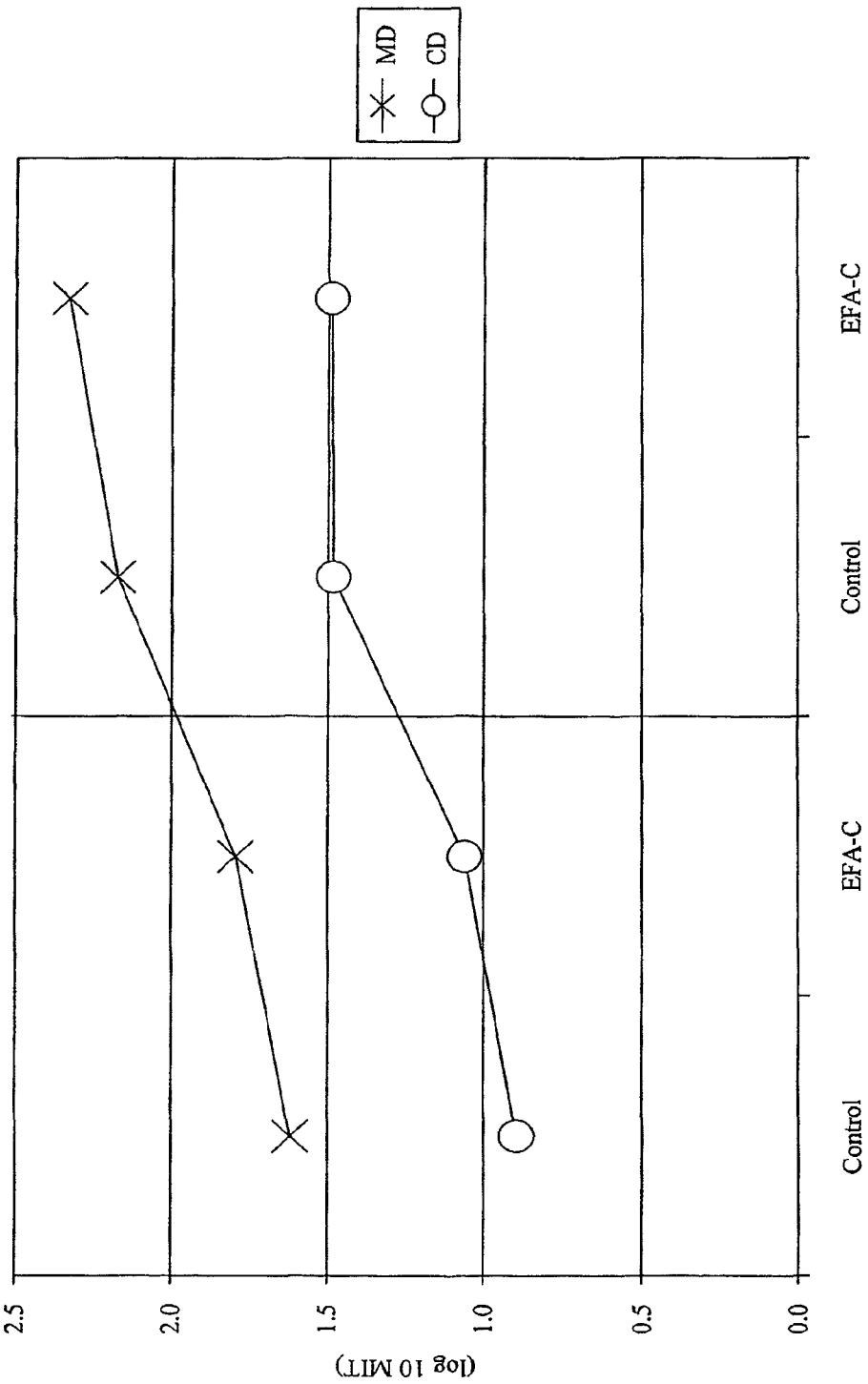
FIG. 15 shows the Fold Endurance strength of the paper at two different basis weights made with and without the EFA-C.

FIG. 15 shows the Fold Endurance strength of the paper at two different basis weights made with and without the EFA-C. Statistically significant improvement occurred for both the 36 lb and 73 lb sheets, except for the 73 lb sheet in the cross-machine direction.

Conclusions: The pilot paper machine trial at Western Michigan University (WMU) statistically validated the laboratory observations that 0.5% of the EFA-C statistically enhanced the Burst and Tensile strength paper properties. In addition, the pilot study also statistically validated the enhancement of the following paper properties when 0.5% EFA-C was added to a standard hardwood-softwood bleached papermaking furnish: Scott Bond, Tear, Fold, Porosity, and Bulk.

Example 11

Papermaking: Pilot Investigation of EFA and Cationic Starch

A pilot paper machine trial was performed at Western Michigan University in the Paper Science & Engineering Department. The objective of the trial was to determine if the paper strength enhancement properties of the EFA-C would be changed by the addition of cationic starch.

Papermaking Furnish Preparation: Hardwood and softwood bleached Kraft commercially available market pulp was supplied by Western Michigan University. Two different batches of a 60% hardwood and 40% softwood furnish were prepared for the study. One batch contained no EFA-C and was labeled "Control." The other batch contained 2.0% EFA-C and was labeled "EFA-C" batch. Each batch was prepared as follows: A 5% by weight consistency of 60% hardwood and 40% softwood was blended and mixed together in the Hollander Beater. Tap water was used to achieve the 5% consistency. Once the pulp was blended and re-hydrated with water, the pulp slurry was transferred to the Back Chest and diluted to 1.5% with tap water. The pH of the slurry was adjusted to a pH of 7.5 with $H_2SO_4$. From the Back Chest, the pulp slurry was sent through a single disc Jordon refiner until a freeness of 450 mL CSF was achieved. The freeness was determined by TAPPI Test Method T-227. A load weight of 40 lbs and flow rate of 60 gpm were the operation parameters assigned to the Jordon refiner. The refining time of each batch was kept constant (12 minutes). The EFA-C material was added to the Back Chest prior to refining at a dosing level of 2.0% by weight of the EFA-C. Once refining was completed, the pulp slurry was transferred to the Machine Chest and diluted to 0.5% consistency.

Making Paper: Two different basis weight grades of paper were targeted, a 36 lb/3300 ft$^2$ and a 73 lb/3300 ft$^2$. Basis weights were achieved by controlling the machine speed. When called for during the experiment, 10 lb/ton of cationic starch (Charge+110) was added at the Stuffbox. The 0.5% slurry was transferred from the Machine Chest to the Headbox. From the Headbox the slurry was transferred to the Fourdrinier as described previously. The Size Press and Second Dryer sections were by-passed as before. The final stage of the web passed through the Calender Stack and onto to the Reel.

Paper Testing: All the paper testing was performed by Western Michigan University-Paper Science & Engineering. Table 7 represents the references to the TAPPI Test Procedures and number of replications performed on each test.

TABLE 7

TAPPI Test Methods

| Test Identification | TAPPI Method | Replications |
|---|---|---|
| Basis Weight | T-410 om-93 | 5 |
| Ash Content | T-413-om-93 | 3 |
| Bulk | T-220 sp-96 14.3.2 | 10 |
| Gurley Porosity | T-460 om-96 | 10 |
| Caliper | T-411 om-89 | 10 |
| Tensile Strength | T-494 om-88 | 10 MD/10 CD |
| Opacity | T-425 om-91 | 5 |
| Tearing Force | T-414 om-88 | 5 |
| Scott Bond | T-541 om-89 | 5 |
| Burst Strength | T-403 om-91 | 10 wire side/10 felt side |
| Gurley Stiffness | T-543 om-94 | 5 MD/5 CD |
| Folding Endurance | T-511 om-96 | 10 MD/10 CD |
| Sheffield Roughness | T-538 om-96 | 10 wire side/10 felt side |

Results: The results of the paper testing are shown in Table 8.

TABLE 8

Western Michigan University Pilot Paper Machine Trial

| Grade | EFA-C | Cationic Starch | Actual Basis Weight | Bulk | Gurley Porosity | Caliper | Tensile Index (N m/g) | |
|---|---|---|---|---|---|---|---|---|
| (lb/3300 ft2) | (%) | (lb/ton) | (lb/3300 ft²) | (cm³/g) | (sec/100 mL) | (mils) | MD | CD |
| 36 | 0 | 0 | 37.61 | 2.82 | 3.28 | 3.47 | 29 | 13 |
| 36 | 0 | 10 | 36.82 | 2.79 | 3.04 | 3.36 | 54 | 32 |
| 36 | 2 | 0 | 37.46 | 2.63 | 3.54 | 3.23 | 29 | 12 |
| 36 | 2 | 10 | 37.27 | 2.69 | 4.10 | 3.29 | 37 | 15 |
| 73 | 0 | 0 | 69.63 | 2.78 | 6.02 | 6.34 | 58 | 31 |
| 73 | 0 | 10 | 73.52 | 2.84 | 6.33 | 6.83 | 76 | 37 |
| 73 | 2 | 0 | 73.46 | 2.62 | 7.72 | 6.31 | 60 | 29 |
| 73 | 2 | 10 | 72.41 | 2.71 | 8.52 | 6.18 | 78 | 37 |

| Grade | EFA-C | Cationic Starch | Opacity | Tearing Force (gf) | | Scott Bond | Burst Index (kPa g/m²) | |
|---|---|---|---|---|---|---|---|---|
| (lb/3300 ft2) | (%) | (lb/ton) | (%) | MD | CD | (ft lb/1000 in²) | Wire | Felt |
| 36 | 0 | 0 | 77 | 67 | 67 | 106 | 1.17 | 0.97 |
| 36 | 0 | 10 | 76 | 65 | 81 | 143 | 2.87 | 2.99 |
| 36 | 2 | 0 | 74 | 54 | 68 | 126 | 1.03 | 1.00 |
| 36 | 2 | 10 | 74 | 61 | 69 | 173 | 1.37 | 1.35 |
| 73 | 0 | 0 | 89 | 143 | 132 | 109 | 2.37 | 2.39 |
| 73 | 0 | 10 | 88 | 157 | 167 | 157 | 3.01 | 3.29 |
| 73 | 2 | 0 | 86 | 126 | 128 | 126 | 2.45 | 2.30 |
| 73 | 2 | 10 | 85 | 136 | 143 | 160 | 3.24 | 3.10 |

| Grade | EFA-C | Cationic Starch | Gurley Stiffness (gurley units) | | Folding Endurance (log10 MIT) | | Sheffield Roughness (mL/min) | |
|---|---|---|---|---|---|---|---|---|
| (lb/3300 ft2) | (%) | (lb/ton) | MD | CD | MD | CD | Wire | Felt |
| 36 | 0 | 0 | 225 | 71 | 1.22 | 0.58 | 202 | 230 |
| 36 | 0 | 10 | 204 | 98 | 1.62 | 0.90 | 192 | 230 |
| 36 | 2 | 0 | 215 | 68 | 1.12 | 0.54 | 177 | 207 |
| 36 | 2 | 10 | 185 | 38 | 1.53 | 0.88 | 180 | 213 |
| 73 | 0 | 0 | 390 | 164 | 1.73 | 1.11 | 232 | 284 |
| 73 | 0 | 10 | 420 | 194 | 2.17 | 1.48 | 237 | 287 |
| 73 | 2 | 0 | 330 | 158 | 1.55 | 0.90 | 222 | 279 |
| 73 | 2 | 10 | 376 | 165 | 1.99 | 1.29 | 223 | 264 |

Figure 16:
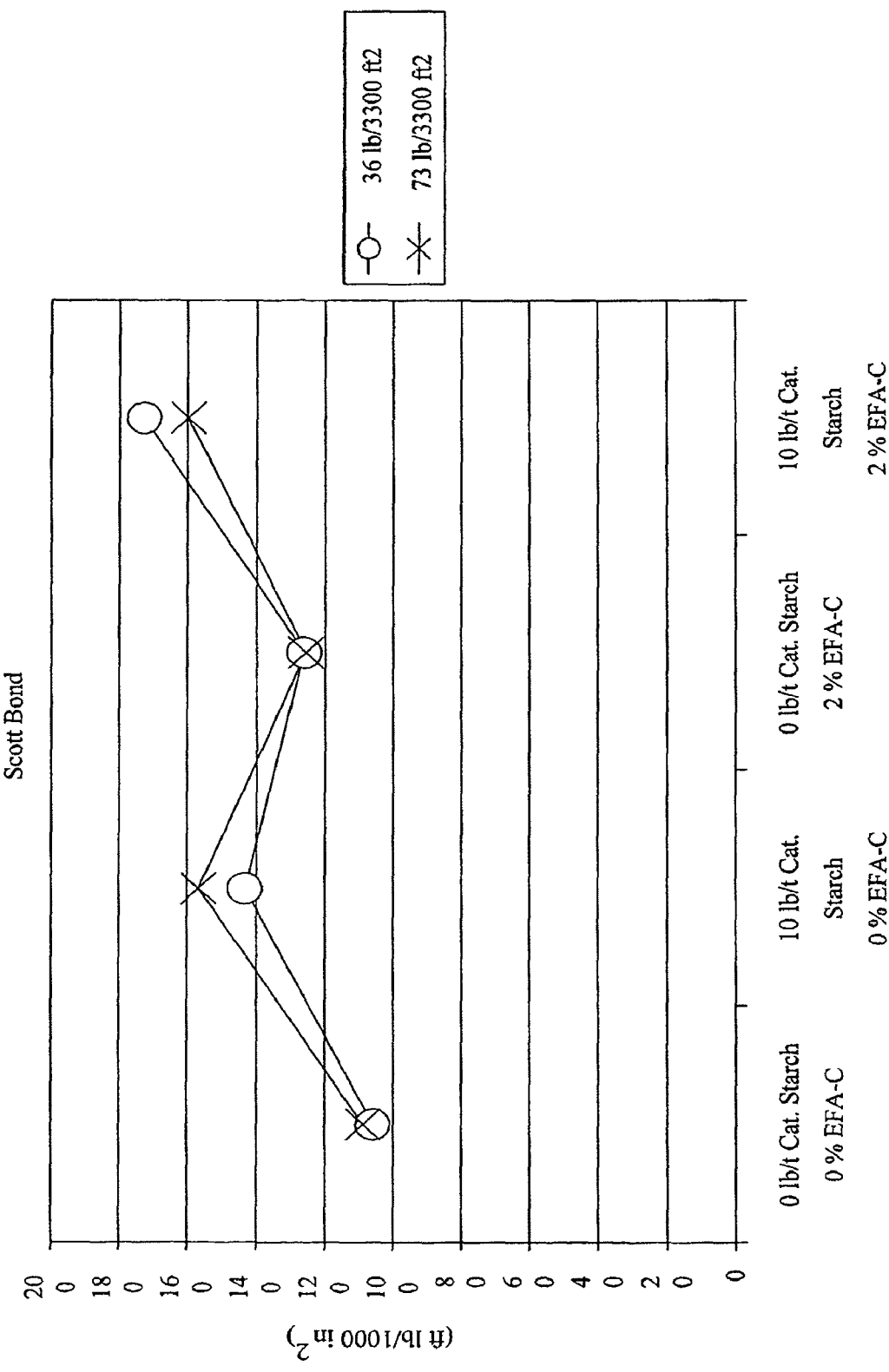
FIG. 16 shows the enhancement of Scott Bond internal paper strength with the addition of 2.0% EFA-C.

FIG. 16 shows the enhancement of Scott Bond internal paper strength with the addition of 2.0% EFA-C. An additional increase was measured when 10 lb/ton of a cationic starch was added.

Figure 17:
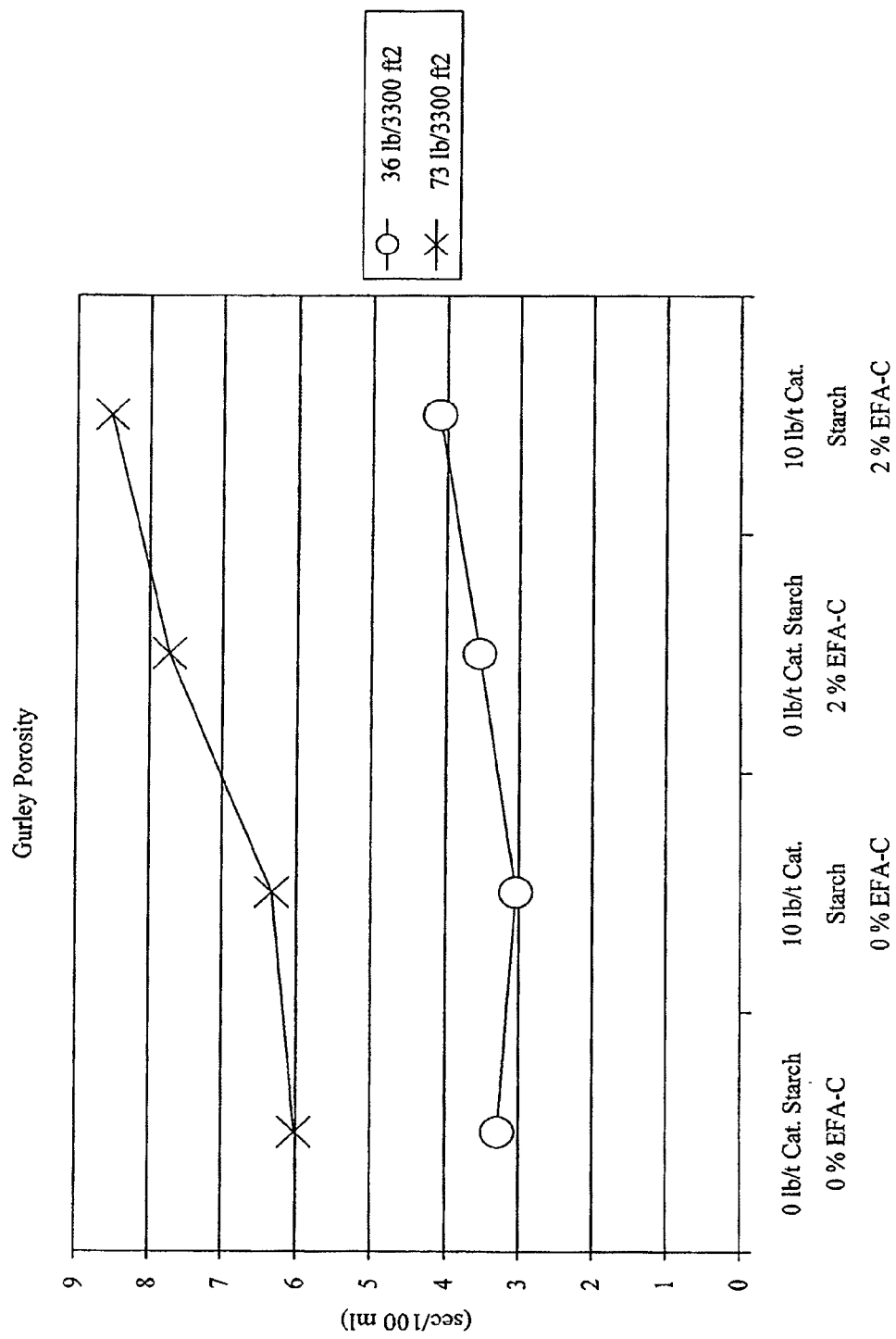
FIG. 17 shows porosity of sheets made with and without EFA-C.

FIG. 17 shows the ability of EFA-C to make the sheet less porous. Porosity, as measured by the TAPPI test method Gurley Porosity, was measured by the amount of time it takes to pass 100 mL of air through a given area of the sheet. The longer it takes the air to pass through the sheet, the less porous the sheet. The higher the Gurley Porosity, the greater the coating holdout.

Figure 18:
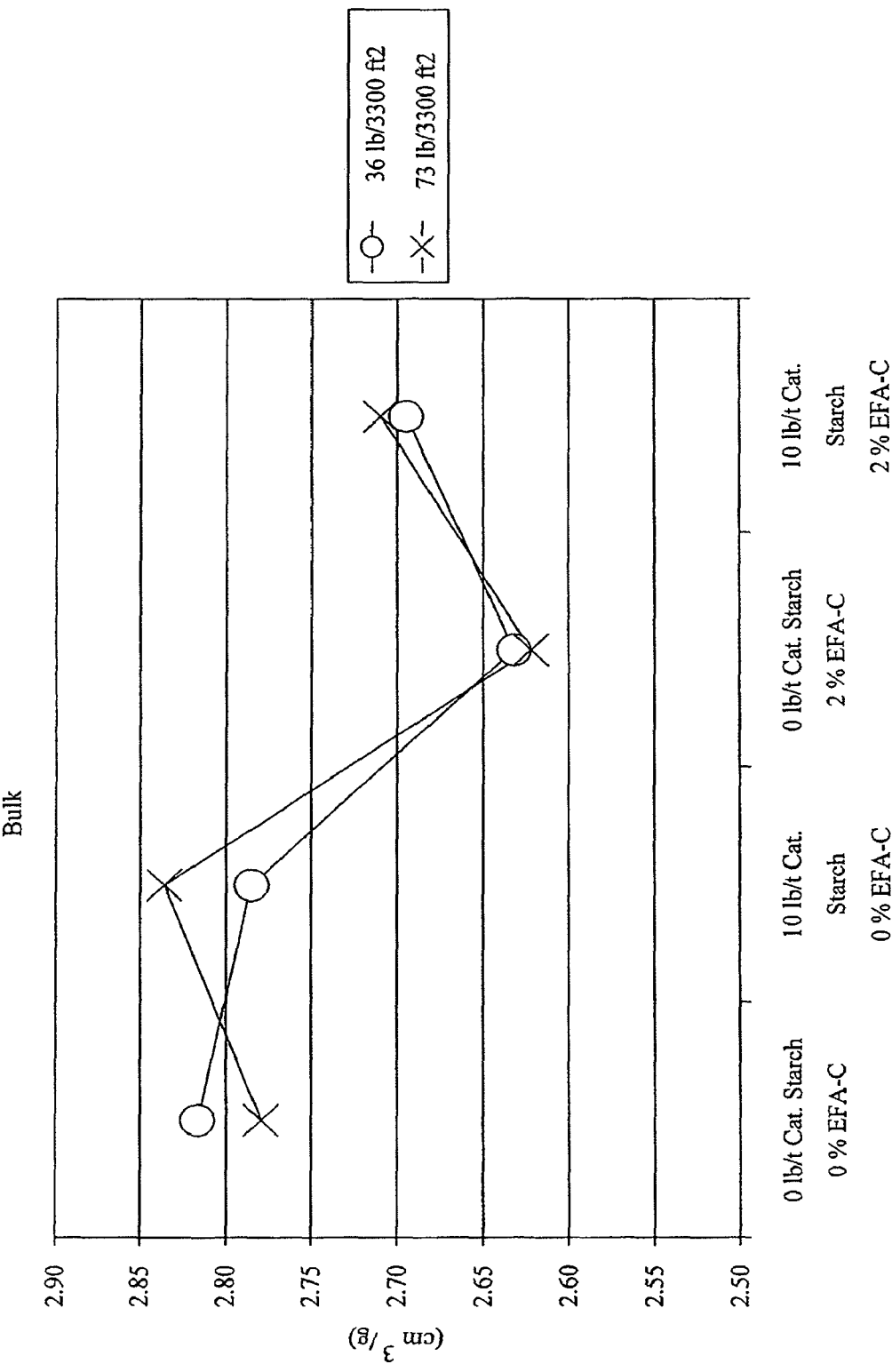
FIG. 18 shows the densification of paper with the addition of 2.0% EFA-C.

FIG. 18 shows the densification of the paper with the addition of 2.0% EFA-C.

Conclusions: The addition of 2.0% EFA-C increased the internal bond strength of paper as measured by the Scott Bond TAPPI test method. When 2.0% EFA-C was incorporated into the paper, the sheet became less porous. The Bulk density of the paper increased with the addition of 2.0% EFA-C. Incorporation of a cationic starch with the 2.0% EFA-C into the paper enhances the properties described above. The pilot paper machine study also indicated that there is a synergistic effect of using the EFA in conjunction with a cationic starch with respect to machine runnability parameters of drainage and retention.

Example 12

Papermaking: Analysis of EFA-C in Paper Products

The objective of the study was to determine whether a test method could be developed which identified the EFA technology in a paper product using either a microscopic and/or spectroscopic technique. Paper was made with different concentrations of EFA-C on the pilot paper machine at Western Michigan University Paper Science & Engineering Department.

Papermaking Furnish Preparation: Hardwood and softwood bleached Kraft commercially available market pulp was supplied by Western Michigan University. Different batches of a 60% hardwood and 40% softwood were prepared for the study. Each batch contained one of the following levels of EFA-C: 0%, 0.5%, 1.0%, and 2.0%. Each batch was prepared as follows: A 5% by weight consistency of 60% hardwood and 40% softwood was blended and mixed together in the Hollander Beater. Tap water was used to achieve the 5% consistency. Once the pulp was blended and re-hydrated with water, the pulp slurry was transferred to the Back Chest and diluted to 1.5% with tap water. The pH of the slurry was adjusted to a pH of 7.5 with $H_2SO_4$. From the Back Chest, all of the pulp slurry was sent through a single disc Jordon refiner three times. A freeness of 480 mL CSF (TAPPI Test Method T-227) was measured. A load weight of 20 lbs and flow rate of 60 gpm were the operation parameters of the Jordon refiner. The refining time of each batch was kept constant. The furnish was drawn from the Back Chest through the single disc Jordon refiner and onto the Machine Chest. Once the Back Chest was drawn empty, the Jordon refiner was turned off. The batch was then transferred from the Machine Chest back to the Back Chest. This process was repeated three times for each batch containing different levels of EFA-C. Once refining was completed, the pulp slurry was transferred to the Machine Chest and diluted to 0.5% consistency.

Making Paper: Three different basis weight grades of paper were targeted at 20, 40, and 60 lb/3300 ft$^2$. Basis weights were achieved by controlling the machine speed. For runability purposes, 10 lb/ton of cationic starch (Charge+110) was added at the Stuffbox. The 0.5% slurry was transferred from the Machine Chest to the Headbox. From the Headbox the slurry was transferred to the Fourdrinier as described previously. The Size Press and Second Dryer sections were bypassed as before. The final stage of the web passed through the Calender Stack and onto to the Reel.

Example 13

Paper Properties: Microscopic Examination

Figure 19:
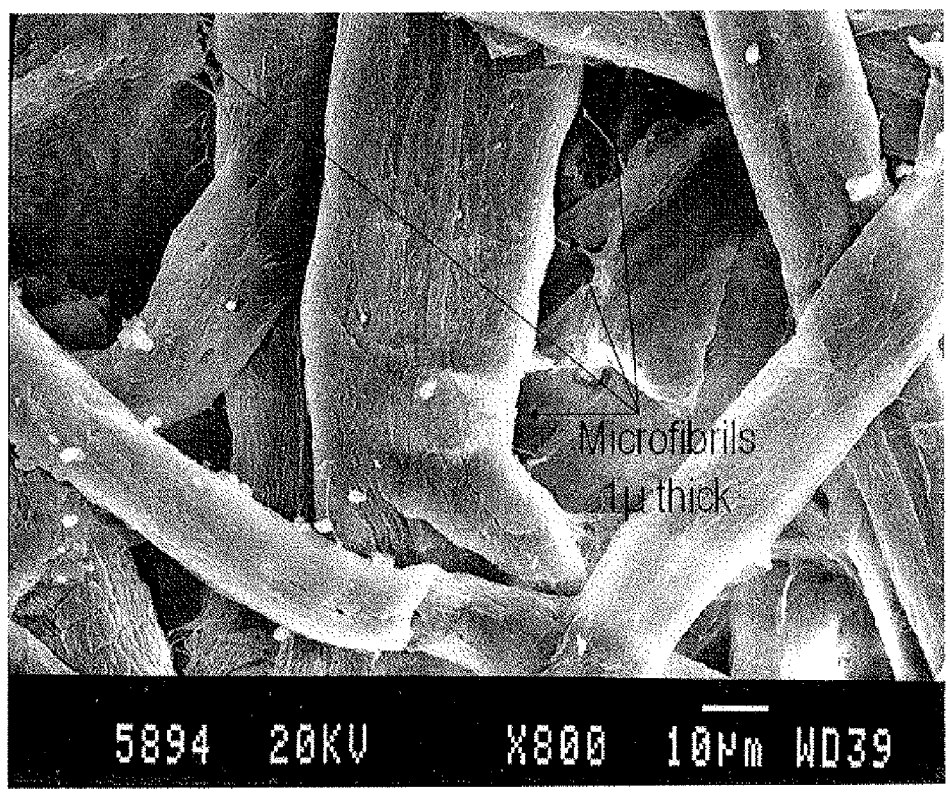
FIG. 19 shows a SEM image at 800× of a 40 lb paper sheet without EFA.
Figure 20:
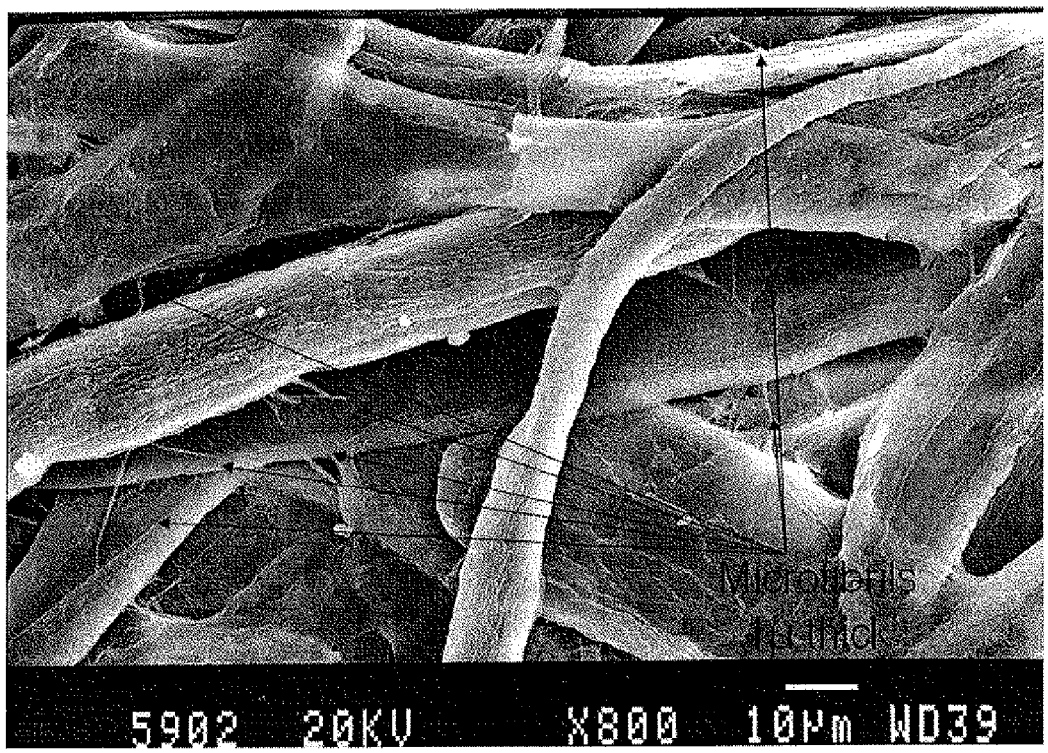
FIG. 20 shows an SEM image at 800× of a 40 lb sheet made with 1% EFA-C added before the refining step.

The paper samples from Example 12 were subjected to standard Scanning Electron Microscopy examination in order to determine if any structural changes were occurring as a result of the usage of the EFA-C in the paper making process. FIG. 19 shows a SEM image at 800× of a 40 lb sheet made in the manner described above. Note the small micro-fibrils that connect the fibers as well as the large void spaces as the fibers were overlaid to make the paper surface. The presence of micro-fibrils is known to increase the strength of the paper sheet (T. E. Conners and S. Banerjee in *Surface Analysis of Paper*, CRC Press, 1995). FIG. 20 shows an SEM image at 800× of a 40 lb sheet made with 1% EFA added before the refining step. Note the increase in micro-fibril production in this example. Also note that the void spaces observed in FIG. 19 are now reduced, indicating a better formation of the paper sheet.

In total, a 23% increase in micro-fibril production was noted in the above paper sheets. Calculations were performed on 20 SEM field images of paper without EFA addition and 20 SEM field images of paper with 1% EFA-C addition. Paper without EFA averaged 13 micro-fibrils per micrograph field and paper with 1% EFA-C averaged 16.5 micro-fibrils per micrograph field, thus an increase of 23% over non-EFA paper.

Example 14

Paper Properties: Fourier Transform Infrared Spectral Analysis

Figure 21:
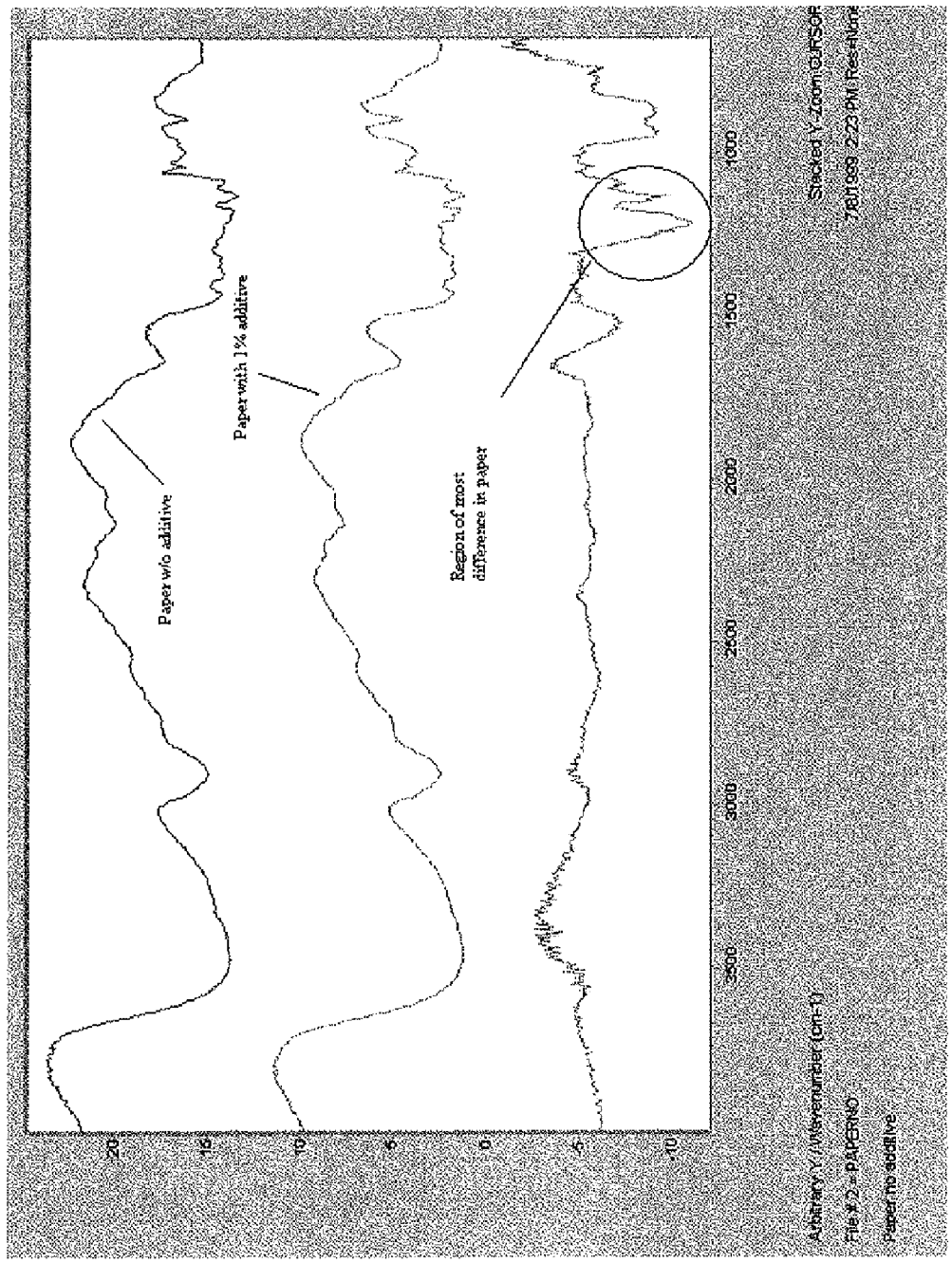
FIG. 21 shows Fourier Transform Infrared Reflectance Spectra of paper with and without EFA.

Infrared spectral analyses of paper handsheets were performed to determine whether a method of detection of EFA usage in paper could be developed. Fourier transform infrared reflectance spectra of 40-lb sheet with no EFA-C added and of 40-lb sheet with 1% EFA-C were scanned. FIG. 21 shows the results of the test. The top spectrum is from paper with no EFA-C added, the middle spectrum is paper with 1% additive, and the bottom spectrum is the residual after spectral subtraction using a simple 1:1 ratio factor. The region of most difference in the two spectra are circled in the figure.

Example 15

Paper Properties: Near Infrared Reflectance Analysis

While FTIR reflectance analysis is suitable for qualitative work, it less suitable for quantification, particularly in samples with high or variable moisture content. Since the FTIR analysis shows that there are regions of difference, near Infrared reflectance analysis was used for quantification studies.

A set of paper handsheets were subjected to near infrared reflectance analysis. In total, six different handsheets sets were used, a 20 lb, 40 lb, and 60 lb sheets with no EFA-C added, and a 20 lb, 40 lb, and 60 lb sheets with 1% EFA-C added. Representative samples were cut out of multiple handsheets and the near infrared reflectance spectra were scanned. Three regions of each paper were used, giving a total of 18 samples that were analyzed.

Figure 22:
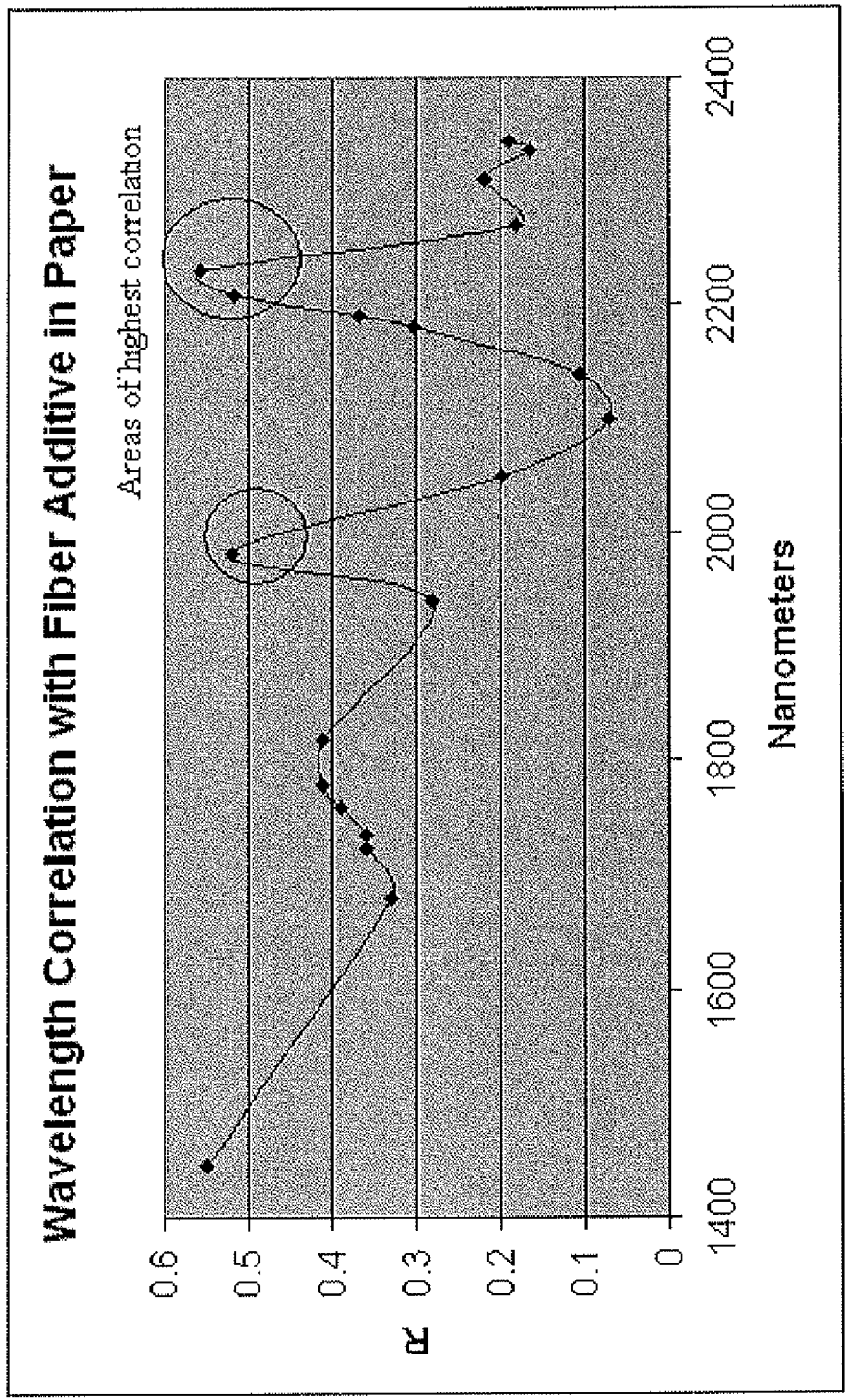
FIG. 22 shows Near Infrared Correlation Spectrum of paper.

FIG. 22 was generated using a simple correlation analysis a common method for viewing near infrared data for quantitative analysis. The simple correlation coefficient (degree of linearity) at each wavelength is given. This is useful in determining which wavelengths are more suitable for developing a quantitative calibration model.

Note the two regions of highest correlation. If we apply a multiple linear regression algorithm to the data, a linear relationship can be developed using these two wavelengths. The linear relationship developed from this data has a correlation coefficient of 0.96 and a standard error at 95% confidence of 0.14. This is definitive evidence that the EFA content in paper can be determined by independent analysis.

Example 16

Comparison of EFA-C to Commercially Available Fiber Additives

The EFA was compared with other commercially available sources of insoluble dietary fiber, including solka floc, microcrystalline cellulose, oat fiber, corn bran, and wheat bran. A comparison is provided in Table 9.

TABLE 9

Comparison of EFA-C to Commercially-Available Insoluble Fiber Products

|  | EFA-C | Microcrystalline Cellulose | Solka Floc | Corn Bran | Wheat Bran | Oat Fiber |
|---|---|---|---|---|---|---|
| % TDF (dry basis) | 87.2 | 93-97 | 100 | 81 | 38-50 | 93 |
| % soluble | 0 | 0-9 | 0 | 2 | 4 | 0 |
| % insoluble | 87.2 | 84-97 | 100 | 79 | 34-46 | 93 |

The total dietary fiber (TDF) content of the commercially-available products ranged from about 81% to 100%, except wheat bran which contains only 38-50% TDF. All of these products are used in food fortification as concentrated sources of dietary fiber. The proximate analysis described in Example 7 confirmed that EFA-C contains about 87.2% of insoluble dietary fiber, comparable to other commercial fiber products.

Example 17

Functionality

It is common for food manufacturers to use a combination of insoluble and soluble fiber in food formulation. The insoluble fiber products are used largely for fortification, and the soluble fiber products for functionality. Basic functionality tests were conducted to assess viscosity building, water holding capacity, and oil holding capacity of the various products. The test protocols are described in Example 7.

Preliminary screening revealed that EFA has greater viscosity building, water holding capacity, and oil holding capacity than some other commercially available insoluble fiber products including microcrystalline cellulose, solka floc, and corn bran. The observed functionality of EFA suggests that it can provide improved organoleptic properties, such as mouthfeel, plus desirable product properties such as emulsion stabilization, cling, clouding, anti-staling, freeze/thaw stability, and cook yield in foods. The results of the functionality tests are summarized in Table 10.

TABLE 10

Functionality Screening of Several Insoluble Fiber Products

|  | 24 Hour Viscosities (cP) | | | Water | Oil |
|---|---|---|---|---|---|
|  | Stirred | Sheared | Homogenized | Capacity %* | capacity %@ |
| EFA-C | 10 | 20 | 440 | 550 b | 300 b |
| Avicel CL-611F | 130 | 130 | 130 | 480 c | 80 g |
| Avicel RC-581F | 212 | 1,330 | 680 | 1360 a | 80 g |
| Avicel FD-100 | <10 | <10 | <10 | 180 f | 100 e |
| Solka Floc 40 FCC | <10 | <10 | <10 | 530 bc | 340 a |
| Solka Floc 200 FCC | <10 | <10 | <10 | 350 d | 220 c |
| Solka Floc 300 FCC | <10 | <10 | <10 | 310 d | 200 d |
| Corn Bran Ultra | <10 | <10 | <10 | 210 d, f | 100 e |
| Corn Bran Fine | <10 | <10 | <10 | 170 e | 100 e |
| Corn Bran Medium | <10 | <10 | <10 | 250 e | 95 e |

*values with the same letter are not significantly different at the 95% confidence limit.
@values with the same letter are not significantly different at the 95% confidence limit.

Example 18

Viscosity Building

Samples were prepared for viscosity building analysis by dispersing 3 g of fiber into 200 g of deionized water using one of the following three procedures:
1. stirring for one minute on magnetic stir plate ("stirred")
2. shearing on high speed in a Warring blender for 1 minute ("sheared")
3. single pass homogenization at 5000 psi in a Gaulin Homogenizer ("homogenized").

The viscosities of the samples, in 250 mL beakers, were measured after 24 hours at room temperature using a Brookfield RV viscometer, Spindle #2 at 20 rpm.

Two of the Avicel MCC products showed the greatest viscosity building ability of all the fibers. Avicel RC581F reached over 1000 cP and Avicel CL-611F reached 130 cP with high shear. However, these products also contain 59% carboxymethylcellulose (CMC) which is a soluble fiber that could be responsible for the viscosity building. These samples appeared milky white, opaque suspensions that precipitated slightly after 24 hours. Avicel FD-100, solka floc and corn bran, which contain no soluble fiber, did not build viscosity under any of the mixing/shearing conditions and rapidly precipitated to the bottom of the beaker.

The viscosity of EFA-C reached more than 400 cP with homogenization and had a white, translucent, suspended flocked appearance that did not precipitate out of solution. This is a good functionality for a purely insoluble fiber product. Due to the viscosity building characteristic of EFA, it is suitable for use in nutrition beverages to impart a thick, creamy mouthfeel, to help suspend fine solids like cocoa powder and minerals, and to help stabilize the emulsion. The flocked appearance of the additive resembles fruit pulp. Thus, the additive can be used as a clouding agent in juice drinks or sport beverages.

Example 19

Food Application Example of Water Holding Properties of EFA

The ability of EFA to bind up to 5 times its weight in water leads to significant improvements in the shelf life of bakery products and an opportunity to enrich such products with low to moderate levels of insoluble fiber.

Five home made breads were prepared with the following ingredients in this Example:

| Bread flour | 40.8 |
|---|---|
| Water | 23.1 |
| Whole wheat flour | 13.0 |
| Egg | 8.9 |
| Honey | 7.9 |
| Nonfat Dry Milk | 1.9 |
| Unsalted Butter | 1.4 |
| Salt | 1.2 |
| Lemon juice | 0.9 |
| Active dry yeast | 0.9 |
|  | 100% |

The yeast was dissolved in water and set aside. Wet ingredients were combined and added to the dry ingredients and mixed for 1 minute using a Hobart mixer and dough hook. Dough was allowed to rise twice before it was baked at 375° F. for 50 minutes To Sample A, 1% EFA (flour basis) was added to the bread mix. Samples B, C and D contained 3%, 5% and 7% EFA (flour basis), respectively, The fifth sample contained no EFA and served as the control. No additional water or other ingredients were added to the formulations, nor were processing changes made for any of the breads. Final products were analyzed by Medallion Laboratories for percent moisture and soluble, insoluble and total dietary fiber. Results were as follows:

|  | % Moisture | % Total Dietary Fiber | % Insoluble Dietary Fiber | % Soluble Dietary Fiber |
| --- | --- | --- | --- | --- |
| Control | 33.2 | 3.9 | 2.9 | 1.0 |
| Sample A | 33.0 | 4.3 | 3.3 | 1.0 |
| Sample B | 34.0 | 5.1 | 4.2 | 0.9 |
| Sample C | 33.6 | 5.7 | 4.6 | 1.1 |
| Sample D | 34.4 | 5.8 | 5.5 | 0.3 |

As can be seen in the table above, the moisture levels were higher in bread containing 3-7% EFA. The data also show it is possible to moderately increase the insoluble fiber content of breads by adding a relatively small amount of EFA. A similar observation was seen in yellow cake and soft-type oatmeal cookies.

To further illustrate the water binding properties of EFA, batters were prepared with the following ingredients in Example 2:

| | |
| --- | --- |
| Milk | 52.3 |
| Flour | 35.2 |
| Egg | 11.4 |
| Baking powder | 0.9 |
| Salt | 0.2 |
| | 100% |

Figure 28:
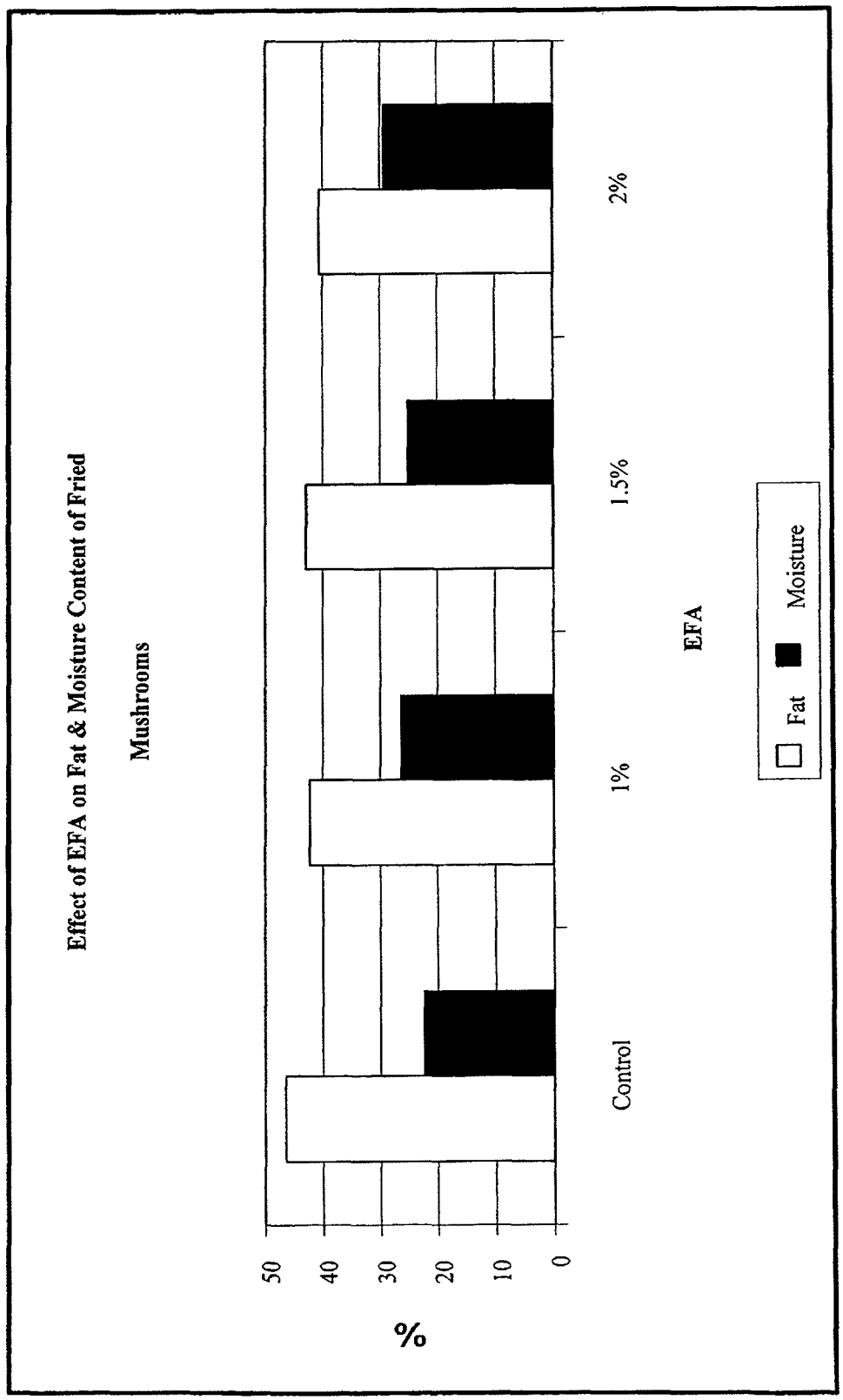
FIG. 28 shows the results of a study to evaluate the effect of EFA on fat and moisture content of fried mushrooms.
Figure 29:
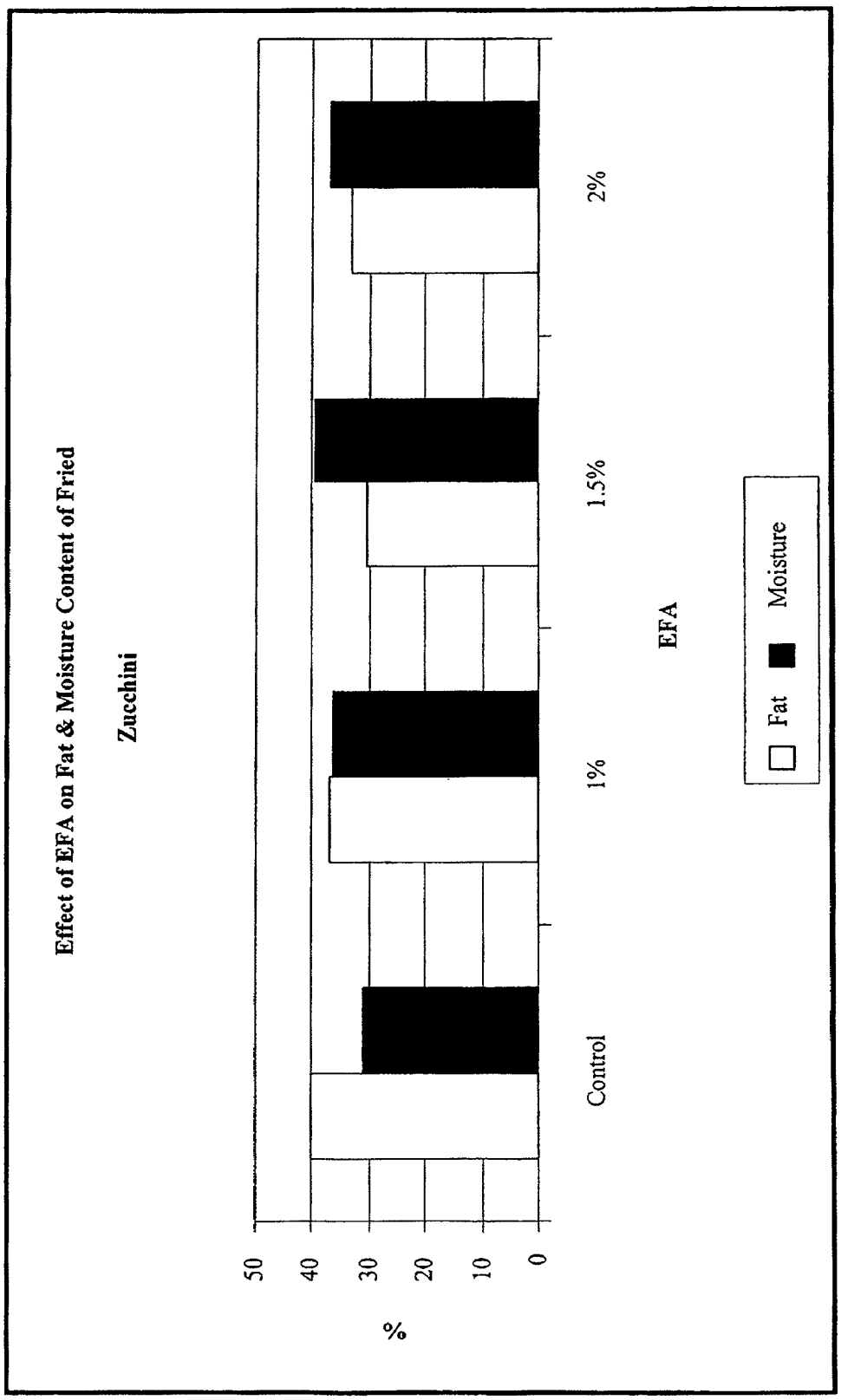
FIG. 29 shows the results of a study to evaluate the effect of EFA on fat and moisture content of fried zucchini.

Sample A contained 1% of EFA, sample B contained 1.5% EFA, and Sample C contained 2% EFA on a total batter weight basis. Batters were mixed together until smooth and allowed to rest for 10 minutes. Onions, mushrooms, zucchini and chicken were coated with batter and deep fat fried in liquid vegetable oil at 375° F. for 4 minutes. The fried products were removed from the hot oil and placed on paper towels to cool. The fried batter was then removed and analyzed for percent fat (acid hydrolysis) and percent moisture (vacuum oven). Results for mushrooms and zucchini are shown in FIGS. 28 and 29.

Since EFA is more hydrophilic than lipophilic, a reduction in the fat content of fried food products containing EFA was seen. Moreover, EFA addition may provide additional strength to fried products due to its fibrous nature, resulting in less breakage during flying and shipping.

Example 20

Food Application Example Utilizing Oil Holding Properties of EFA

Since EFA is capable of binding up to 3 times its weight in fat and 5 times its weight in water, the addition of EFA to processed meat products leads to direct increases in cooking yield and improvements in the moisture and fat contents of such products when EFA is present at levels of 1% to 3% based on the total weight of the meat mixture.

Four samples using 80% lean ground check with no additives or preservatives were used as the basis for the tests conducted in this Example. To Sample A, exactly 1% (w/w) ground EFA was added to 500 grams of ground chuck. Similarly, 2% and 3% (w/w) ground EFA was added to ground chuck Samples B and C, respectively. The fourth sample contained no added EFA, and served as the control. All sample mixtures were blended on low speed using a Hobart mixer with paddle attachment for 10 minutes to ensure that each sample was well mixed. No additional water or other ingredients were added to the mixtures. The meat mixtures were then formed into 125 gram patties. The patties were kept in cold storage to ensure that all samples would have the same initial cooking temperature. Four meat patties of each type were fried at 350° F. for 6 minutes on each side. The fried patties were placed on wire racks and allowed to cool to room temperature prior to weighing each patty to determine the change in cooking yield. The samples were also analyzed for moisture (AOAC method 960.39) and fat (AOAC method 950.46). The results of the analyses are shown below.

|  | % Decrease in Cook Yield | % Fat | % Moisture |
| --- | --- | --- | --- |
| Control | 38.3 | 18.0 | 51.8 |
| Sample A | 33.9 | 18.4 | 53.8 |
| Sample B | 29.8 | 18.3 | 54.0 |
| Sample C | 29.7 | 18.8 | 54.2 |

As can be seen in the above results, the addition of EFA to ground chuck led to improvements in cooking yield. The addition of EFA also increased the lipid and moisture content of the patties. Moreover, all meat patties that contained EFA appeared more juicy and appealing than the control.

VI. Mode of Action of the Enhanced Fiber Additive in Paper Production

As indicated by Examples 8 and 9, it has been found that a 40 pound (40#) handsheet with 0.5% EFA retains the same tensile and burst strength as a 60 pound (60#) handsheet without any EFA; and, thus, 0.5% enhanced corn fiber (EFA-C) has the potential to replace 33% of the wood fiber in a standard 60# sheet without loss of strength, at the same CSF. Thus, the EFA material has a significant potential as a high value added paper additive product. In this section, analysis is made of the possible mode of action of the strength enhancement properties of the EFA material and its possible interactions with the paper fiber.

VI. A. Surface Properties

Figure 23:
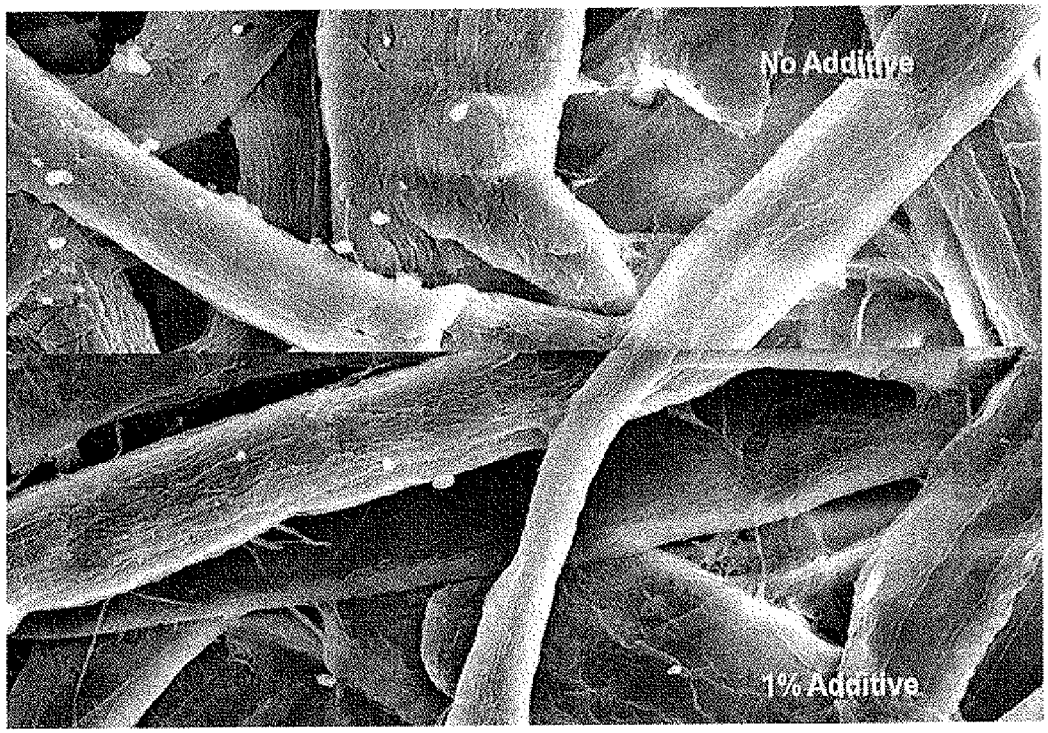
FIG. 23 is a digital printout of a Scanning Electron Micrograph (SEM) images of paper enhanced with EFA and paper without EFA.

FIG. 23 shows a Scanning Electron Micrograph (SEM) image of paper enhanced with EFA and paper without EFA. All of the papers in this study were generated during a pilot paper machine trial at Western Michigan University, as characterized above in connection with Example 10. At first glance at 100× magnification, there is no apparent difference in surface morphology.

However, under more intense magnification, a striking property emerges. This was discussed above in connection with Example 13, and is apparent by comparison of FIGS. 19 and 20. FIG. 19 shows an 800× magnification SEM of non-EFA paper. Micro-fibrils that join the larger fibers together, are observed. Such fibers are well known and documented in paper manufacturing processes and are attributed to strength building properties. These microfibrils are laid down during sheet formation, thus increasing hydrogen bonding effects.

FIG. 20 shows the SEM image of the 1% EFA enhanced paper. There is an observable increase in microfibril formation. To determine if the formation is a consistent effect, multiple SEM fields and multiple sheets of paper were imaged and the microfibrils counted. The papers made with the EFA material had a microfibril production increase of more than 10% (typically>15%, for example, about 23%) over the non-EFA papers. It is reasonable to conclude that this increase in microfibril production plays a significant role in the strength enhancing properties of the EFA, generally by providing a bridging network of microfibrils between larger pulp (cellulose) fibers.

VI. B. Depth Properties

While SEM is a powerful surface technique, it is limited in its ability to determine structural details, particularly details that are not visible on the surface. Another technique for paper analysis is Laser Confocal Scanning Microscopy (CLSM or LCSM). This technique not only allows the viewing of surface details, but it can also scan into the material in the Z direction to reconstruct three-dimensional representations of the structure.

An experiment was conducted to generate LCSM fluorescence images of paper with no EFA and paper with 1% EFA. Two excitation wavelengths were used. The first was from a 542-nanometer laser, and the second was from a 488-nanometer laser. By combining the two images, a composite image was generated. Different colors were used to present the imaging from the different nanometer lasers. Up to 20 Z series slices were taken and then added to the composites to enhance the depth of field.

When the morphological differences in the pictures were examined, no striking features appeared. Both the EFA and the non-EFA paper were observed to have similar structural features, fiber packing and densities. That is, the gross morphology of the EFA and the non-EFA paper were so similar as to be undetectable by this type of observation. This is significant for many paper applications, since it indicates that the EFA additive will likely not cause significant gross structural changes in the paper, although as indicated above, it will cause modifications in microfibril effect. Indeed, as will be apparent from the discussions in the next section, a reason that gross morphological differences are not observed is because the EFA operates by partially coating the cellulose fibers of the paper (i.e., aligning with the large cellulose fibers), and then, due in part to the hemicellulose content of the EFA, forming bridging microfibrils.

VI. C. Chemical Detection

While undetectable morphological features are a positive observation with respect to assessing whether the EFA additive causes any significant morphological changes in the paper, chemical detection of EFA in paper is important to understanding its chemical interactions, as well as providing a mechanism for determining the presence of, and location of, EFA additive in papers.

Spectroscopic examination of the paper material provides a means of determining the chemical differences and similarities of EFA and non-EFA paper. As discussed in connection with Example 14, FIG. 21 shows FUR reflectance spectra of paper: (a) with EFA additive;
(b) without EFA additive; and, (c) at the bottom line of FIG. 21, differences between the two spectra. In one region indicated in the bottom line, the two spectra are quite different. This is the 1200-1300 cm$^{-1}$ region. The differences appear are due to chemical differences, not merely gross reflectance difference.

In the bottom line of FIG. 21, which depicts the differences, note the major bands of difference at 1137 cm$^{-1}$ and 1220 cm$^{-1}$. These differences can be used in various ways. For example:

1. By using these wavelengths in conjunction with a chemical imaging system, a chemical mapping of the EFA distribution in the paper can be generated; and
2. A quantitative analytical method can be developed to directly measure the EFA content of the manufactured paper.

VI. D. Chemical Imaging

Chemical imaging is a technology that can be used to visualize chemical composition interactions in materials. Both Raman and Infrared imaging systems are available. Since paper samples tend to have high fluorescence backgrounds (hence the ability to perform CLSM), Raman imaging is not practical. However, infrared imaging can provide a very detailed map of the chemical morphology of the surface.

Figure 24:
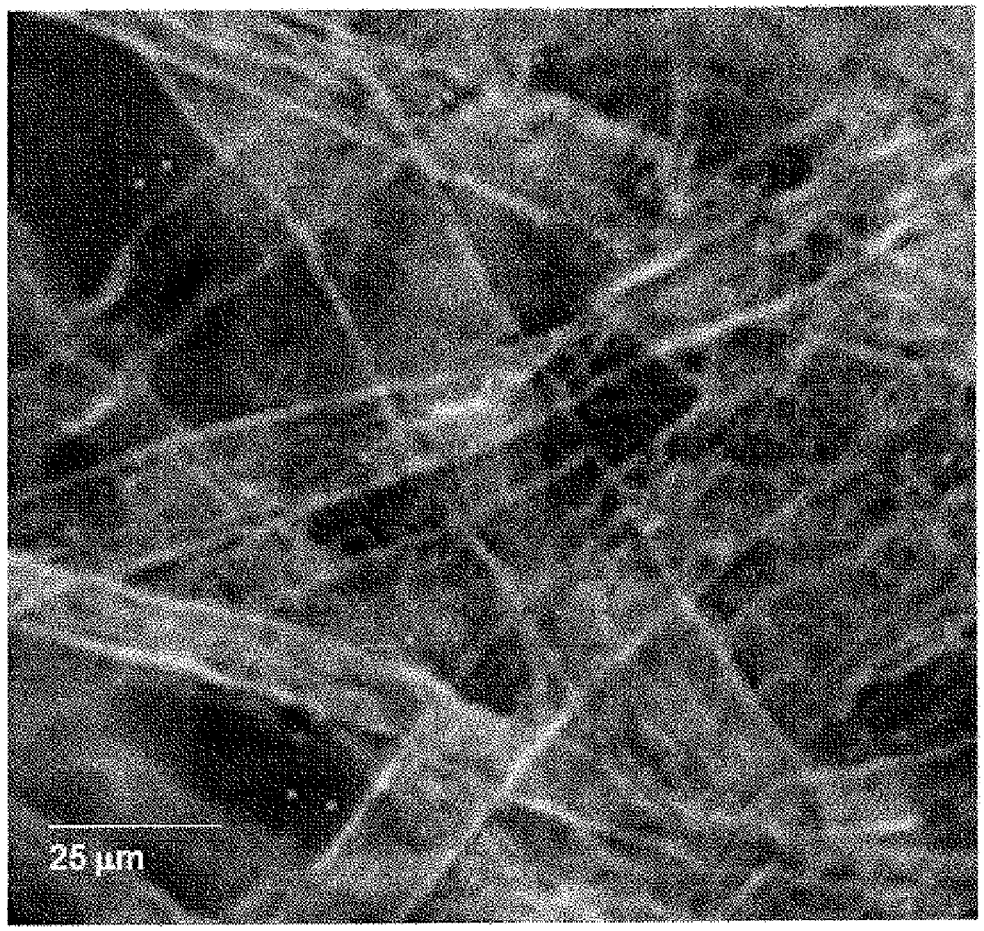
FIG. 24 shows a black and white digital printout of an infrared chemical image taken of EFA paper.

FIG. 24 shows an infrared chemical image taken of EFA paper. The images were generated by using a chemometric technique called principal component analysis (PCA). This type of technique enhances the chemical differences found in the "principal components" of the variations in the material examined. The image shown in FIG. 24 is of the third principal component of the paper image. In chemical imaging the contrast generated in the image are from chemical, rather than morphological, differences. The measurements used, and imaging analysis, were performed by ChemIcon, Inc. at Pittsburgh, Pa., using that company's facilities and software, under the supervision of Cargill, Inc., the assignee of the present application.

The image of the EFA added paper (FIG. 24) shows marked contrasts. That is, there are localized chemical differences across this image. In fact, on close examination of the EFA image, one can see that the chemical changes generated by the presence of the EFA material is localized or ordered to follow (or to align and define) individual paper (in this case pulp or cellulose) fiber strands. That is, the EFA is located such that it coats, or at least partially coats, various paper fibers (i.e., cellulose or pulp fibers in this instance). Since the EFA material has a significant holocellulose character, it readily interacts with the wood (cellulose) fibers. Because of its hemicellulose character, the EFA acts as "glue" in paper manufacturing. Thus, it can be concluded that the EFA additive effectively coats (or partially coats) each paper (holocellulose) fiber with a thin film of hemicellulosic "glue" and in this manner add to the overall strength of the paper.

In order to ensure that the PCA 3 image contrast is from EFA, a small piece of ground EFA material was placed upon the paper and imaged in principal component space.

It is noted that when the experiment was performed, and the differences were plotted by the researchers, the chemical differences were plotted in color, to enhance contrast in the image generated. A black and white image is provided in the current figures.

VI. E. Quantitative Analysis

Once it was observed that EFA could be detected spectrally, and even imaged spectrally, it was concluded that a quantitative spectral model could be developed. Such a model would enable one to determine not only if EFA material were present in the paper, but to determine how much EFA is present.

A calibration data set was put together with 0% and 1% EFA additive to demonstrate that a quantitative spectra model could be developed. By recording the reflectance near infrared spectrum of each paper sample, a spectra correlation plot was developed.

FIG. 22, discussed in Example 15 above, shows the correlation plot generated. Note the two areas of highest correlation with EFA. These two wavelengths directly correlate to the third overtones of the fundamental bands of difference in the FTIR spectral subtraction (from FIG. 21).

Figure 25:
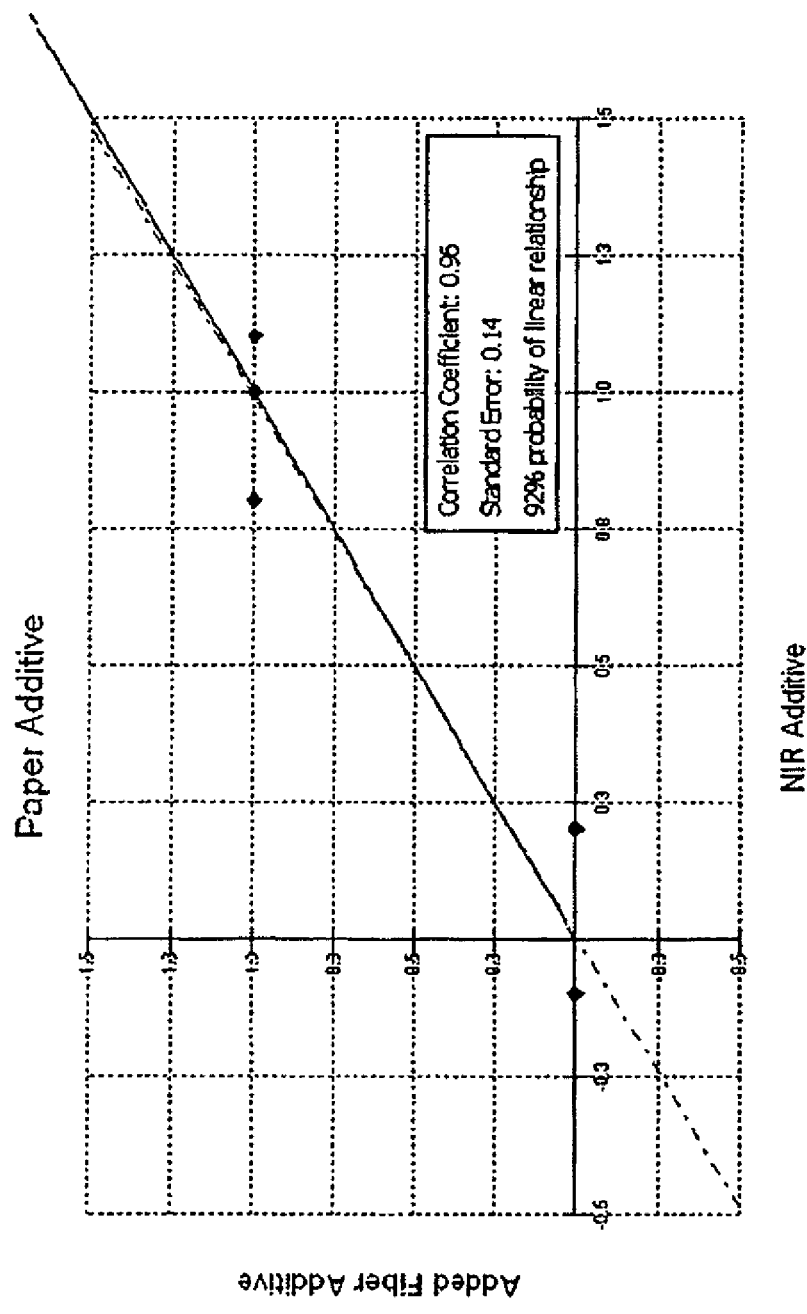
FIG. 25 is a plot of NIR response and amount of EFA added, for a paper evaluation.

Taking this near infrared data and using a multiple linear regression algorithm, a linear relationship was discovered using the two wavelengths. FIG. 25 shows the linear plot generated from this calculation.

VI. F. Conclusions

The following conclusions can be made about the paper application of EFA, based upon the above experiments and analysis:

1. The paper enhancements of EFA occur with very little differences occurring visually (SEM at 800×) in bulk structure between paper with and without EFA.
2. A statistically valid link exists between microfibril production and EFA content. This effect at least partially contributes to the strength building characteristics of EFA.
3. Differences in infrared spectra characteristics are observable, showing that there are chemical differences between EFA and cellulose.
4. Differences in FTIR spectra are real as overtones of these bands are present in NIR correlation analysis.
5. NIR imaging graphically shows EFA localized chemical differences from EFA addition, in the form of "coating" of the paper (cellulose) fibers. This effect contributes to the strength building characteristics of EFA.
6. The spectral differences are large enough to develop an analytical method for EFA in paper using NIR.

VII. Chemical Affinity Probes

Another useful evaluative tool with respect to evaluating EFA characteristics, is chemical affinity probes. Specifically, there are enzyme affinity probes which can be used with transmission electron microscopy (TEM) imaging.

More generally, cytochemical affinity probes can be used to distinguish chemical properties in samples. In particular, a cellulase-gold affinity probe binds selectively to cellulosic material and not cutin and other hydrophobic material.

A reasonable premise for such an investigation is that binding of an affinity gold probe to substrate on the section surface is affected by the hydrophilicity of the wall. This is supported by the observation that walls containing suberin or cutin do not label with cellulase-gold, even though they do contain cellulose. On the other hand, lignified walls such those of xylem elements do label with cellulase-gold. Given the information that the preferred treatment to convert SBF to EFA can remove or modify lignin presence and affect fiber hydrophilicity, a test was conducted to evaluate whether there is a difference detectable by binding using a cellulase-gold probe.

Figure 26:
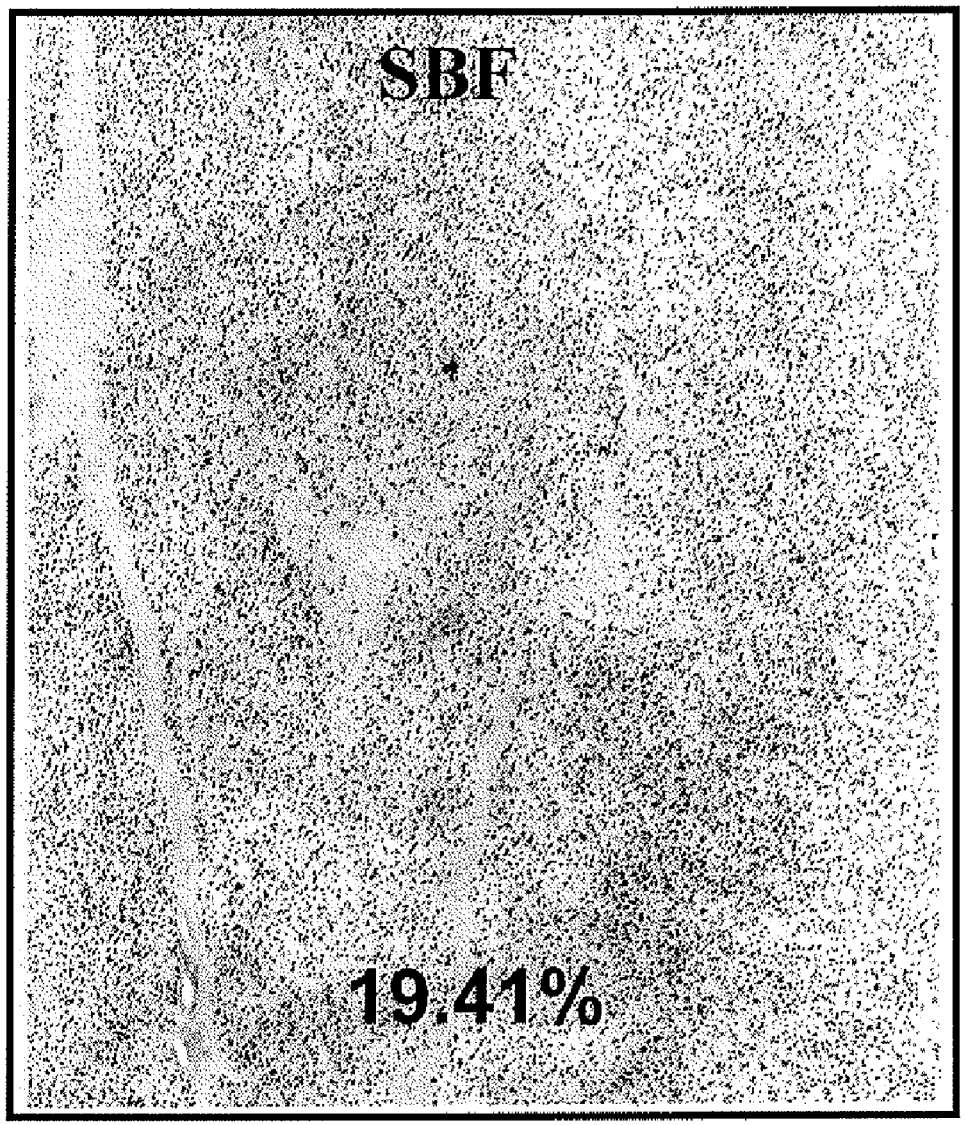
FIG. 26 is a digital printout of a TEM image of an SBF sample, after cellulase-gold imaging.
Figure 27:
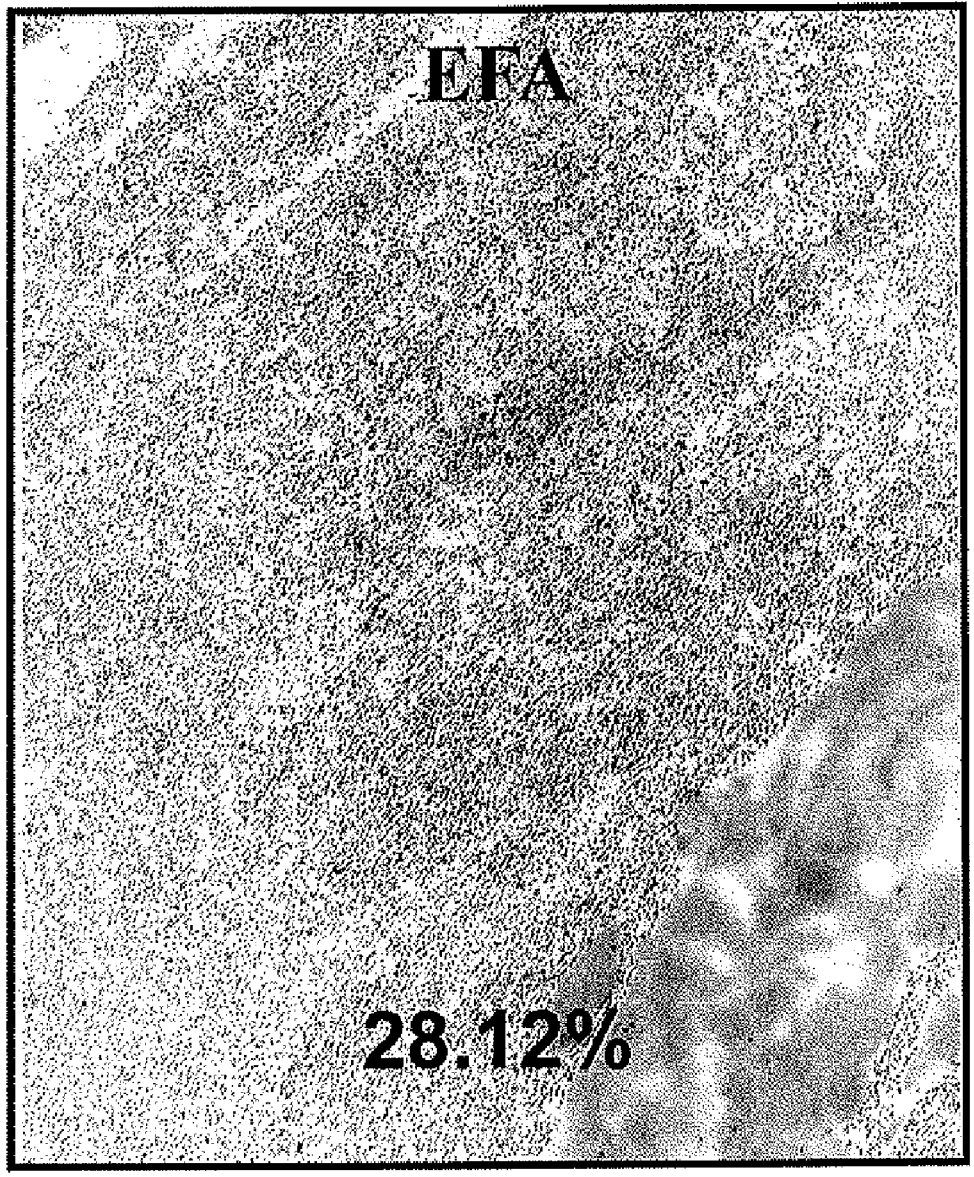
FIG. 27 is a digital printout of a TEM of an EFA sample after cellulase-gold imaging.

In FIG. 26, a digital image of an SBF-Corn sample evaluated by a cellulose-Corn gold affinity probe is depicted. In FIG. 27, a digital image of an EFA-Corn sample similarly treated, is depicted. The higher density of the probe in FIG. 27 indicates that the EFA has been modified in a manner making it more susceptible to the probe. It is theorized that this results from the material being modified to have a greater, more accessible, cellulose and helocellulose character. This is supported by the analysis in Section VIII.

VIII. The Determination of Simple Monosaccharides in Lignocellulosic Materials (i.e., SBF and EFA) by High Performance Anion Exchange Chromatography with Pulsed Amperometric Detection (HPAE-PAD)

The approach characterized in this section can be used to separate and quantify the monosaccharides commonly found in the lignocellulosic components of plants. These components include, but are not limited to arabinan, galactan, glucan, xylan and mannan components. The method involves hydrolysis of the lignocellulosic material with sulfuric acid, followed by direct analysis of the resulting monosaccharides by High Performance Anion Exchange Chromatography with Pulsed Amperometric Detection (HPAE-PAD). This method is an adaptation of procedures published previously in the literature. See K. A. Garlab, L. D. Bourquin, G. C. Fahey, Jr., *J. Agric. Food Chem.*, 37, 1287-1293, 1989; and M. W. Davis, *J. Wood Chem. Technol*, 18(2), 235-252, 1998. The complete disclosure of both of these references being incorporated herein by reference.

Materials

Sodium Hydroxide, 50% (w/w), and concentrated sulfuric acid were purchased from Fisher Scientific. Deionized water (>18 MΩ-cm) was obtained from a Barnstead/Thermolyne NANOpure Infinity water purification system. D-arabinose, D-galactose, D-glucose, D-xylose and D-mannose were purchased from Sigma Chemical Co. All carbohydrates were >99% in purity.

Sample and Standard Preparation

Each sample was dried and milled to pass through a 40-mesh screen. The moisture of each sample was determined using an NIR moisture balance set at 130° C. Samples were hydrolyzed according to TAPPI method T249 cm-85, Tappi Test Methods, Tappi Press, Atlanta, Ga., 1985. (The complete disclosure of this Tappi method being incorporated herein by reference). To summarize, 40-60 milligrams of sample was weighed into a glass test tube. To the material in the tube, exactly 1 ml of 72% sulfuric acid was added. The samples were held in a water bath for 1 hr at 30° C., with occasional stirring using a glass stir rod to facilitate dissolution of the sample material. Hydrolyzates were then diluted to 4% (w/w) sulfuric acid with deionized water and placed in an autoclave at 103±7 kPa for 60 minutes. After hydrolysis, samples were diluted to 1000 ml in a volumetric flask and filtered through a 0.45 micron nylon syringe filter prior to injection. Standard solutions were hydrolyzed in the same manner as the samples.

Chromatographic Conditions

Carbohydrates were separated and quantitated using High Performance Anion Exchange Chromatography with Pulsed Amperometric Detection (HPAE-PAD). The DX-500 chromatography system (Dionex Corporation, Sunnyvale, Calif.) consisted of gradient pump (model GP50), an autosampler (model AS-50) equipped with a Rheodyne injection valve, and an electrochemical detector (model ED-40) with Pulsed Amperometric Detection equipped with a combination pH-Ag/AgCl reference electrode. A CarboPac PA-1 analytical column (250 mm×4 mm i.d.) and guard column (50 mm×4 mm i.d.) were used to separate the carbohydrates. The pulsed amperometric waveform settings E1, E2, E3 and E4 were set at +0.1, −2.0, +0.6 and −0.1 V for durations of 400, 10, 30 and 60 msec, respectively, for a total of 500 msec, in accord with published Dionex Technical Note 21, incorporated hereby reference. Eluents were prepared using filtered, degassed and deionized high purity water and stored under pressurized Helium. To clean the column, 100 mM NaOH was pumped at 1 ml/min for 10 minutes, deionized water was pumped at 1 ml/min for 10 mM to reequilibrate the column, and the carbohydrates were eluted by pumping deionized water at 1 ml/min for 40 minutes. To stabilize the baseline and optimize detector sensitivity, 300 mM NaOH was added postcolumn at 0.6 ml/min., in accord with, Dionex Technical Note 20, incorporated herein by reference. The total run time per sample was 60 minutes.

Results

Response factors (RF) for each monosaccharide were determined by dividing the peak area of each carbohydrate by its corresponding concentration. Analyte concentrations are based on the dry weight of the sample material and reported to the nearest 0.1% as the average of two duplicate determinations using external calculation techniques. All concentrations are based on the anhydrous weight equivalent of each carbohydrate, e.g., 0.88 for arabinose and xylose, and 0.90 for galactose, glucose and mannose. The % figure are reported as a % of total carbohydrate material in the sample.

The sum of the arabinan, galactan, xylan, and mannan presence will be referred to herein as the "hemicellulose factor" or "hemicellulose character". This is because the monosaccharides indicated generally correlate to the presence of hemicellulose in the sample evaluated.

It is not meant to be suggested by the above that the precise percentage of cellulose in the sample or the precise percentage of hemicellulose, specifically correlates to the measured factors. Rather the factors are generally indicative of the relative amounts of these materials present, to one another, and also relative to other carbohydrates that can be found in the sample.

For the experiments indicated above, comparisons can be made between material which has and has not been treated through an acid treatment, acid chlorite treatment and peroxide treatment, in accord with the principles described herein (See Examples 1-3). In particular, seed based fiber-corn (or

| 1. Seed Based Fiber (SBF) Control --(i.e., not processed as described herein.) | | | | | | |
|---|---|---|---|---|---|---|
| | Arabinan | Galactan | Glucan | Xylan | Mannan | Holocellulose Total | Hemicellulose Total |
| Corn[1] (SBF-C) | 14.1-17.0 | 4.0-5.0 | 20.5-29.0 | 24.2-31.1 | 0.6-0.9 | 68.1-77.5 | 43.1-53.0 |
| Soy[2] (SBF-S) | 5.3 | 3.7 | 39.1 | 8.8 | 6.9 | 63.8 | 24.7 |
| Oats[3] (SBF-O) | 3.3-3.7 | 1.2-1.3 | 33.0-35.2 | 29.1-33.0 | 0.1 | 66.7-73.3 | 33.7-38.1 |

[1]The reported results are from analyses of six samples.
[2]The reported results are from an analysis of one sample.
[3]The reported results are from analyses of two samples.

| 2. Enhanced Fiber Additive (EFA) --(i.e., processed generally according to Examples 1-3) | | | | | | |
|---|---|---|---|---|---|---|
| (%) | Arabinan | Galacton | Glucan | Xylan | Mannan | Holocellulose Total | Hemicellulose Total |
| Corn[4] (EFA-C) | 0.2-0.4 | 0.7-0.9 | 64.5-80.9 | 5.3-6.4 | 1.6-2.0 | 73.3-89.0 | 8.1-9.2 |
| Soy[5] (EFA-S) | 1.2-1.8 | 1.1-1.4 | 58.4-63.2 | 11.3-12.5 | 3.4-6.2 | 76.9-83.6 | 18.5-20.4 |
| Oats[6] (EFA-O) | 0.6-0.8 | 0.1 | 68.9-74.3 | 11.3-15.2 | 0.1 | 85.1-86.4 | 12.1-16.2 |

[4]The reported results are based on analyses of seven samples.
[5]The reported results are based on analyses of four samples.
[6]The reported results are based on analyses of two samples.

General Observations Regarding The Analysis

In general, the above characterized analysis is usable to identify and distinguish preferred EFA materials from mere SBF materials, when processed according to the techniques described herein. In particular, herein the arabinan, galactan, glucan, xylan and mannan percents, when evaluated according to the process described and summed, will be considered to identify the "holocellulose factor" or "holocellulose character" of a sample. This factor in generally relates to the total amount of the carbohydrates in the sample which can be correlated to either a hemicellulose or cellulose presence. This is because the monosaccharide values indicated are reflective of the components of cellulose and hemicellulose.

The value obtained for the glucan analysis will be generally characterized herein as the "cellulose factor" or "cellulose character". This is because the glucose monosaccharide that most closely correlates to the presence of cellulose.

SBF-C) is generally a material which has not been acid, acid chlorite or peroxide treated. Enhanced fiber additive-corn (or EFA-C) is the same material, but after treatment in accord with the principles herein, i.e., in general according to Examples 1-3. Similarly in this experiment SBF-Soy was compared to EFA-Soy and SBF-Oats was compared to EFA-Oats.

Certain general observations are readily apparent from the experiment. For example:

1. Conversion from SBF to EFA generally results in an observable increase in measured cellulose factor, as a percentage.

2. SBF materials generally exhibit a total cellulose factor no greater than 45%, typically 20-40%; whereas EFA materials exhibit a total cellulose factor of at least 50%, typically 50-85 percent.

3. SBF materials generally exhibit a hemicellulose factor which is higher than related EFA materials. (By "related" in this context it is meant the same sample but after treated in accord with the processes described herein (Examples 1-3) to convert the sample to EFA).

4. SBF materials generally indicate a total hemicellulose factor of greater than 23%, whereas EFA materials generally indicate a total hemicellulose factor of at least 5% but no more than 23%, typically no greater than 21%.

5. Processing convert SBF to EFA generally increases the total measurable holocellulose factor, as a percentage.

6. With respect to corn, the total cellulose character of SBF-C is typically less than 30%, whereas as the total cellulose character for EFA-C is typically at least 60%, i.e., 64-81%.

7. For corn, the total hemicellulose character for SBF-C is typically at least 40%, i.e., 43-53%, whereas for EFA-C the total hemicellulose character is typically no less than 5%; and typically not more than 15%; i.e, 8-9.2%.

8. For corn, the total holocellulose character for SBF-C is typically in the range of 68-78%, whereas for EFA-C, the total holocellulose character is typically in the range of 73-90%.

9. For SBF-Soy, the typical holocellulose character is below 70%, for example 63.8%, whereas for EFA-Soy, the total holocellulose content is typically at least 70%, for example, 75-85%.

10. For EFA-Soy, a hemicellulose content of no less than 5% is typically found; for example 18.5-20.4%.

11. For soy, the process of converting the SBF to EFA, typically results in a measured total cellulose character that is increased; for example, SBF-soy typically has a total cellulose character in the range of 35-45%, whereas EFA-Soy typically has a total cellulose character of at least 50%, typically within the range of 55-65%.

12. For oats, the SBF-Oats generally exhibits a total cellulose character of less than 40%, typically 30-36%, whereas the EFA oats (EFA-O) typically exhibit a total cellulose character of at least 60%, typically 65-75%.

13. For oats, the process of converting from SBF to EFA generally leads to a reduction in the total hemicellulose character.

14. For SBF-Oats, the total hemicellulose character is typically greater than 25%, i.e., 30-40%, whereas for EFA oats the total hemicellulose character is no less than 5% and typically is no more than 20%, i.e., 10-17%.

15. For oat fiber, the process of converting the SBF oat fiber to the EFA oat fiber leads to a total holocellulose character increase. Typically SBF-Oats has a total holocellulose character of 65-75%, whereas EFA oats typically has a total holocellulose character of at least 80%, typically 84-88%.

When the above observations are furthered considered, certain patterns emerge, for example:

A. Typically, for EFA relative to SBF, the ratio of the total cellulose factor to the total hemicellulose factor is increased. That is, the process of converting a SBF fiber material to EFA fiber material is processing which generates a total cellulose character/total hemicellulose character ratio which increased, while at the same time leaving a hemicellulose character of at least 5%. Typically a ratio of at least 2:1 is reached.

1. For corn the ratio increased from less than 1:1 to at least 5:1, typically at least 7:1.

2. For soy the ratio increased from about 1.5:1 to at least 2:1; typically at least 2.5:1.

3. For oats the ratio increased from about 1:1 to at least 4:1.

B. As a percentage to the total holocellulose character, the total hemicellulose character generally decreases with a processing of SBF to EFA.

1. For corn, the ratio of total hemicellulose character to total holocellulose character decreased from a figure for SBF of greater than 0.5:1 (typically 0.6:1 or larger) to a figure that was typically no more than 0.2:1.

2. For soy, the ratio decreased from a figure that was greater than 0.3:1 to a figure that was typically no more than 0.3:1.

3. For oats, the ratio decreased from a figure that was typically at least 0.45:1 to a figure that was no more than 0.3:1, typically 0.2:1 or less.

C. The process of converting from a SBF to EFA, in accord with the present principles, generally provides corresponding increases the total cellulose character and the ratio of total cellulose character to total holocellulose character. For example:

1. For corn, SBF-C typically exhibits a ratio of total cellulose character to total holocellulose character of no greater than about 0.5:1, whereas EFA corn exhibits a total cellulose character to total holocellulose character which is typically at least 0.7:1.

2. For soy, the ratio of total cellulose character to total holocellulose character for SBF was no greater than about 0.65:1, whereas for EFA soy, the figure was typically no less than about 0.69:1.

3. For oats the ratio of total cellulose character to total holocellulose character, in SBF-O, is typically no greater than about 0.6:1, whereas for EFA-oats the ratio of total cellulose character to total holocellulose character is typically no less than about 0.75:1.

IX. Other Modifications to SBF in Forming EFA

Processing prior to formation of EFA may be conducted to achieve reduction in natural oil levels present in the fibers. One method to remove these natural oils would be by Soxlet extraction. The Soxlet extraction thimble can be charged with SBF material and solvents added to the reservoir and refluxing initiated. Over a 24-hour period, natural oils soluble to the solvent of choice, can be extracted into the solvent fraction. In a procedure used to remove different polarity oils, a series of extractions on the same SBF material can be performed. For instance, a non-polar solvent such as pentane or hexane can be used to remove non-polar oils. After extraction for 24 hours, the pentane or hexane fraction would be removed and the Soxlet charged with a more polar solvent such as dichloromethane. After a 24-hour period, this solvent would be removed and be replaced with a more polar solvent such as methanol. After a 24-hour extraction process this solvent is removed and the SBF material is allowed to dry. The three solvent fractions are evaporated to render fractionated oils specific to the particular solvent system. The SBF material can then be utilized in the process for manufacturing EFA without the contamination from residual natural oils.

Also, because of its hydrophilic and hydrophobic nature, the EFA can be enhanced or fortified with additives, prior to use. For example, it can be bound with a nutraceutical.

It is anticipated that in some instances, additional modifications to the SBF used for forming the EFA, or to the EFA after formation, may be desirable. For example, processing prior to formation of EFA may involve reduction in natural oil levels present in the fibers. Alternatively, the oil levels can be reduced after EFA formation.

What is claimed is:

1. A method of making paper comprising incorporating at least about 0.1% to 10% by weight of acid treated seed based fiber in a papermaking slurry based on the weight of fiber in the pulp mixture, said acid treated seed based fiber having a total cellulose character of at least 50% and a total hemicelluloses character of at least 5%, wherein said acid treated seed based fiber material has been treated at a pH less than 2.5 at a temperature between 110° C. and 140° C. for approximately 30 minutes to approximately 60 minutes; whereby said paper has an increased burst index and/or tensile strength in the machine and/or cross direction relative to paper that is prepared by a process that is otherwise the same but lacking the addition of said seed based fiber.

2. The method according to claim 1, wherein the acid treated seed based fiber is selected from the group consisting of an acid treated corn fiber, an acid treated oat fiber, an acid treated soy fiber, and mixtures thereof.

3. The method according to claim 1, wherein the papermaking process includes preparing a pulp mixture, and incorporating the acid treated seed based fiber in the resultant pulp mixture.

4. The method according to claim 1, wherein the acid treated seed based fiber is incorporated in the pulp mixture in an amount of at least 0.5% based on fiber in the pulp mixture.

5. The method according to claim 1, further comprising subsequently incorporating a cationic starch in the papermaking slurry.

6. The method according to claim 5, wherein the cationic starch is a cationic crosslinked starch.

7. The method of claim 1, wherein said seed based fiber is from corn.

8. The method of claim 7, wherein said seed based fiber is added in an amount that is effective to increase said tensile strength about 110% to 150% in the machine direction.

9. The method of claim 1, wherein said seed based fiber is from soy hulls.

10. The method of claim 1, wherein said seed based fiber is from wheat.

11. The method of claim 1, where the pH is from 1.0 to 2.0.

12. The method according to claim 11, wherein the acid treated seed based fiber is selected from the group consisting of an acid treated corn fiber, an acid treated oat fiber, an acid treated soy fiber, an acid treated wheat fiber, an acid treated hulls fiber, an acid treated rice fiber, and mixtures thereof.

13. The method of claim 12, further comprising subsequently incorporating a cationic starch in the papermaking slurry.

14. The method according to claim 13, wherein the cationic starch is a cationic crosslinked starch.

* * * * *

UNITED STATES PATENT AND TRADEMARK OFFICE
CERTIFICATE OF CORRECTION

PATENT NO. : 8,308,901 B2
APPLICATION NO. : 12/903707
DATED : November 13, 2012
INVENTOR(S) : Kevin R. Anderson et al.

Page 1 of 1

It is certified that error appears in the above-identified patent and that said Letters Patent is hereby corrected as shown below:

In column 21, line 24, after "was", delete "to".

In column 29, line 3, after "minutes", insert -- . --.

In column 34, line 67, after "for 10", delete "mM" and insert -- min --, therefor.

Signed and Sealed this
Twelfth Day of February, 2013

Teresa Stanek Rea
*Acting Director of the United States Patent and Trademark Office*